United States Patent
Kondo

(10) Patent No.: US 10,893,276 B2
(45) Date of Patent: Jan. 12, 2021

(54) IMAGE ENCODING DEVICE AND METHOD

(71) Applicant: SONY CORPORATION, Tokyo (JP)

(72) Inventor: Kenji Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 81 days.

(21) Appl. No.: 15/551,830

(22) PCT Filed: Feb. 22, 2016

(86) PCT No.: PCT/JP2016/055042
§ 371 (c)(1),
(2) Date: Aug. 17, 2017

(87) PCT Pub. No.: WO2016/140090
PCT Pub. Date: Sep. 9, 2016

(65) Prior Publication Data
US 2018/0035117 A1  Feb. 1, 2018

(30) Foreign Application Priority Data

Mar. 4, 2015 (JP) ................... 2015-042248

(51) Int. Cl.
*H04N 19/159* (2014.01)
*H04N 19/176* (2014.01)
(Continued)

(52) U.S. Cl.
CPC ......... *H04N 19/159* (2014.11); *H04N 19/103* (2014.11); *H04N 19/105* (2014.11);
(Continued)

(58) Field of Classification Search
CPC ...... H04N 19/176; H04N 19/61; H04N 19/70; H04N 19/105; H04N 19/593; H04N 19/52;
(Continued)

(56) References Cited

U.S. PATENT DOCUMENTS

2011/0038414 A1* 2/2011 Song .................... H04N 19/105
375/240.12
2011/0194599 A1* 8/2011 Hayase ................ H04N 19/197
375/240.02

FOREIGN PATENT DOCUMENTS

JP  2009-021927 A  1/2009
JP  2011-029962 A  2/2011
(Continued)

OTHER PUBLICATIONS

Lin, et al., "Layer-adaptive mode decision and motion search for scalable video coding with combined coarse granular scalability (CGS) and temporal scalability", ICIP 2007, pp. 289-292.
(Continued)

Primary Examiner — Farhan Mahmud
(74) Attorney, Agent, or Firm — Chip Law Group

(57) ABSTRACT

The present disclosure relates to an image encoding device and method that can improve the encoding speed while the picture quality is maintained. A statistical information calculation unit supplies calculated statistical information to a table selection unit. The table selection unit is further supplied with a picture type and a picture depth of an image from a screen sort buffer and a quantization parameter Qp from a rate controlling unit. The table selection unit determines a mode table to be used from among a plurality of mode tables, which are stored in a table storage unit in response to picture types, picture depths, statistical information, applications, Qp and so forth and in which types of prediction modes that become a selection target are limited. The present disclosure can be applied, for example, to an image processing apparatus that performs encoding.

15 Claims, 26 Drawing Sheets

(51) Int. Cl.
*H04N 19/157* (2014.01)
*H04N 19/103* (2014.01)
*H04N 19/105* (2014.01)
*H04N 19/196* (2014.01)

(52) U.S. Cl.
CPC ......... *H04N 19/157* (2014.11); *H04N 19/176* (2014.11); *H04N 19/196* (2014.11)

(58) Field of Classification Search
CPC ...... H04N 19/11; H04N 19/159; H04N 19/46; H04N 19/30
See application file for complete search history.

(56) References Cited

FOREIGN PATENT DOCUMENTS

| | | |
|---|---|---|
| JP | 2012-160991 A | 8/2012 |
| JP | 2014-204207 A | 10/2014 |
| WO | 2010/047099 A1 | 4/2010 |
| WO | 2014/192244 A1 | 12/2014 |

OTHER PUBLICATIONS

International Search Report and Written Opinion of PCT Application No. PCT/JP2016/055042, dated Apr. 5, 2016, 02 pages of English Translation and 08 pages of ISRWO.

Office Action for JP Patent Application No. 2017-503424, dated Oct. 17, 2019, 07 pages of Office Action and 06 pages of English Translation.

Lin, et al., "Layer-Adaptive Mode Decision and Motion Search for Scalable Video Coding with Combined Coarse Granular Scalability (CGS) and Temporal Scalability", IEEE International Conference on Image Processing, Nov. 12, 2007, 04 pages.

\* cited by examiner

|  | AVC | HEVC |
|---|---|---|
| DIRECTIONAL PREDICTION | 9 DIRECTIONS | 33 DIRECTIONS |
| NON-DIRECTIONAL PREDICTION | Plane (16×16), DC | Planar, DC (IMPROVEMENT) |
| PREDICTION UNIT SIZE | 4×4, 8×8, 16×16 | 4×4, 8×8, 16×16, 32×32 |

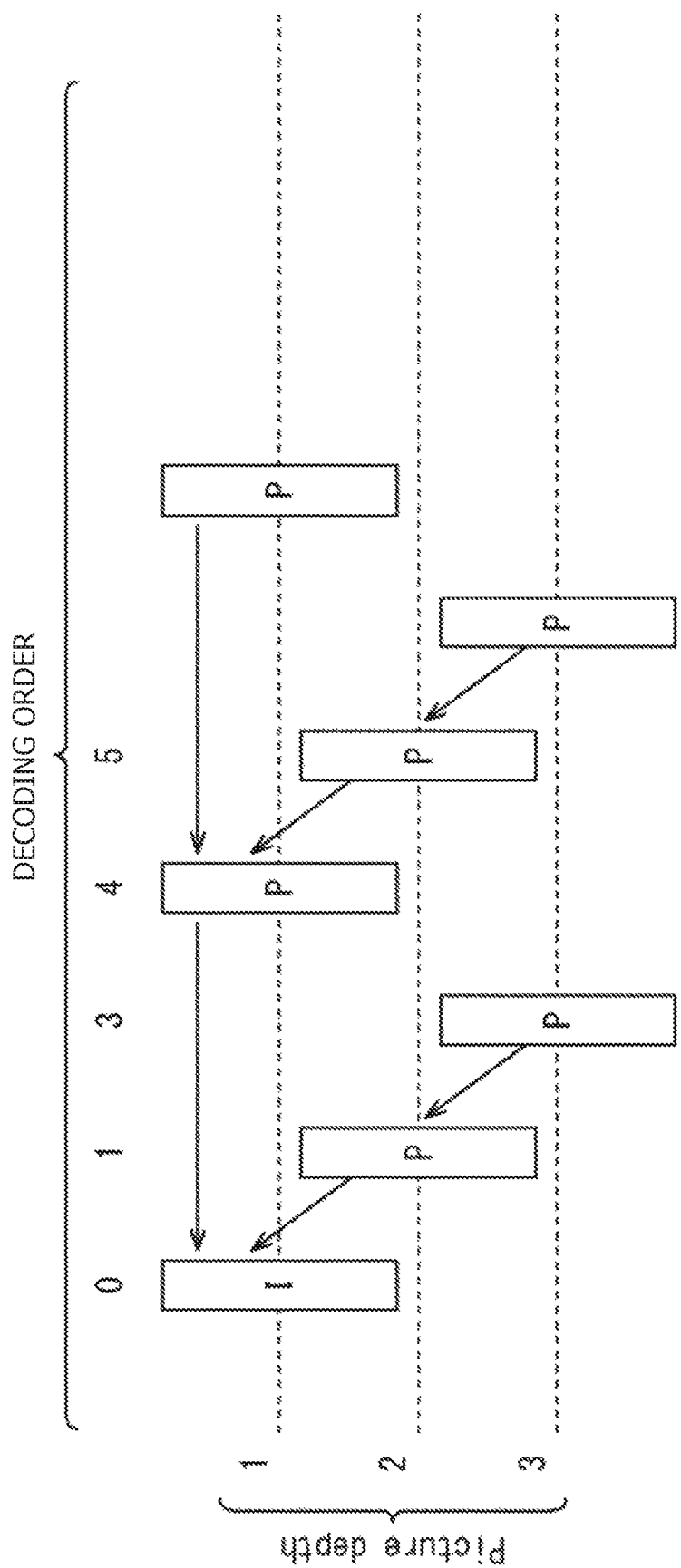

FIG. 16

| APPLICATION | PICTURE QUALITY | PROCESSING SPEED | Picture depth | Picture type | TV | Var | QP | Intra | | | | | Inter | | | | | | | | | | | | |
|---|---|---|---|---|---|---|---|---|---|---|---|---|---|---|---|---|---|---|---|---|---|---|---|---|---|
| | | | | | | | | 64x64 | 32x32 | 16x16 | 8x8 | 4x4 | 64x64 | 64x32 | 32x64 | 32x32 | 32x16 | 16x32 | 16x16 | 16x8 | 8x16 | 8x8 | 8x4 | 4x8 | 4x4 |
| LIVE BROADCAST | LOW | HIGH SPEED | 1 | I | 200 | 200 | 30 | × | × | × | ○ | × | × | × | × | × | × | × | × | × | × | × | × | × | × |
| | | | 2 | P | 200 | 200 | 30 | × | × | × | × | × | × | × | × | × | ○ | × | × | × | × | × | × | × | × |
| INTERNET DISTRIBUTION | | | 2 | P | 200 | 200 | 45 | × | × | × | × | × | × | × | × | × | × | × | × | × | × | × | × | × |
| RECORDING FOR INTERNET DISTRIBUTION | HIGH | LOW SPEED | 1 | I | 200 | 200 | 25 | ○ | ○ | ○ | ○ | ○ | ○ | × | ○ | ○ | ○ | ○ | ○ | ○ | ○ | ○ | ○ | ○ |
| | | | 2 | P | 200 | 200 | 25 | ○ | ○ | ○ | × | ○ | × | ○ | ○ | ○ | ○ | ○ | ○ | ○ | ○ | ○ | ○ | ○ |
| | | | 3 | B | 200 | 200 | 25 | ○ | ○ | ○ | ○ | × | × | ○ | ○ | ○ | ○ | ○ | ○ | ○ | ○ | ○ | ○ | ○ |
| MONITORING CAMERA | MEDIUM | HIGH SPEED | 1 | I | 200 | 200 | 25 | × | × | ○ | ○ | × | × | × | × | × | × | × | × | × | × | × | × | × |
| | | | 2 | P | 200 | 200 | 25 | × | ○ | ○ | ○ | × | × | ○ | ○ | ○ | ○ | ○ | ○ | ○ | ○ | ○ | ○ | ○ |
| | | | 3 | P | 200 | 200 | 25 | × | × | ○ | × | × | × | × | ○ | ○ | ○ | ○ | ○ | ○ | ○ | ○ | × | × |

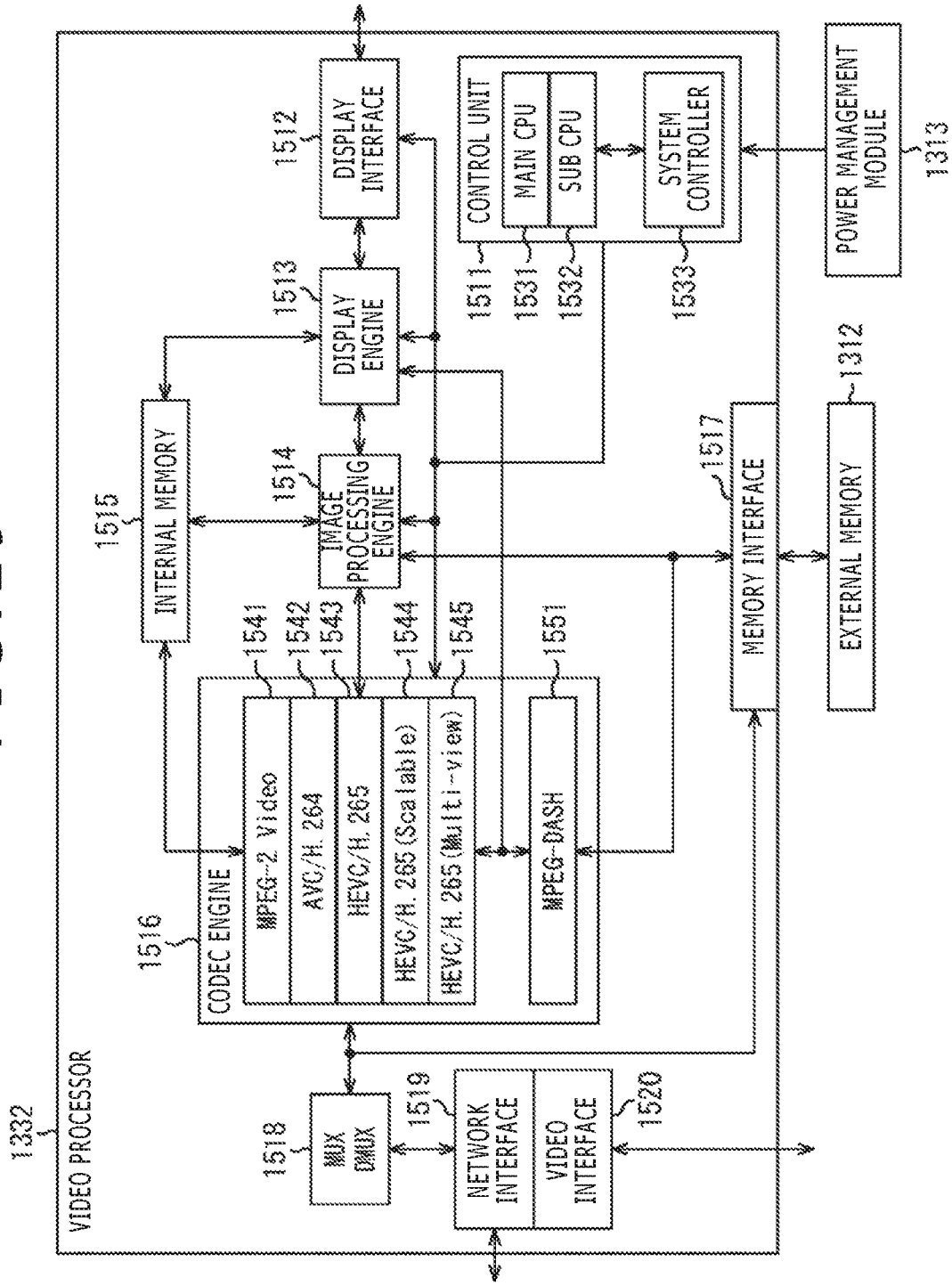

IMAGE ENCODING DEVICE AND METHOD

CROSS REFERENCE TO RELATED APPLICATIONS

This application is a U.S. National Phase of International Patent Application No. PCT/JP2016/055042 filed on Feb. 22, 2016, which claims priority benefit of Japanese Patent Application No. JP 2015-042248 filed in the Japan Patent Office on Mar. 4, 2015. Each of the above-referenced applications is hereby incorporated herein by reference in its entirety.

TECHNICAL FIELD

The present disclosure relates to an image encoding device and method, and particularly to an image encoding device and method that can improve the encoding speed while the picture quality is maintained.

BACKGROUND ART

High efficiency video coding (HEVC) has various encode tools that take into consideration the encoding efficiency. As one of the encode tools, a variety of prediction modes are available.

When a prediction mode is to be determined, generally the product when a bit generation amount is multiplied by a weighting coefficient (that depends upon a quantization parameter Qp) and added to a distortion amount is determined as a cost of the prediction mode, and a prediction mode that indicates the lowest cost is determined and selected as an optimum prediction mode.

It is to be noted that, for example, in PTL 1, arithmetic operation amount reduction for prediction mode selection in the case of H.264 and moving picture experts group (MPEG)-4 Part 10 (advanced video coding, hereinafter referred to as AVC) is proposed.

CITATION LIST

Patent Literature

[PTL 1]
JP 2009-21927 A

SUMMARY

Technical Problem

However, where a very great number of prediction modes in comparison with those in AVC are used for encoding, if the cost in all prediction modes is calculated, then the calculation amount becomes very great, and therefore, it is difficult to use the proposal for an encoder of an application as a low delay encoder or a real time encoder.

The present disclosure has been made in view of such a situation as described above and can achieve improvement in the encoding speed while maintaining the picture quality.

Solution to Problem

An image encoding device according to an aspect of the present disclosure includes a setting unit configured to set a prediction mode to be used when an image is encoded in a state in which types of the prediction mode which become a selection target are limited in response to a picture depth indicative of a reference relationship between pictures of an image, and an encoding unit configured to encode the image for each of recursively divided encoded blocks in accordance with the prediction mode set by the setting unit.

When the picture depth has a low value, the setting unit can set a prediction mode that is used when an image is encoded in a state in which a prediction mode in which the block size is small is a selection target.

When the picture depth is equal to or greater than three, the setting unit can set a prediction mode to be used when an image is encoded in a state in which intra prediction modes are limited.

The setting unit can set a prediction mode to be used when an image is encoded in a state in which prediction modes that become a selection target are limited in response to the picture type of the image.

When the picture type of the image is an intra picture (I picture), the setting unit can set a prediction mode to be used when an image is encoded in a state in which an intra prediction mode is a selection target.

When the picture type of the image is a bidirectionally picture (B picture), the setting unit can set a prediction mode to be used when an image is encoded in a state in which an inter prediction mode is a selection target.

The setting unit can set a prediction mode to be used when an image is encoded in a state in which prediction modes that become a selection target are limited in response to a quantization parameter to be used upon encoding of an image.

When the quantization parameter is to be increased, the setting unit can set a prediction mode to be used when an image is encoded in a state in which prediction modes in which the block size is great are a selection target.

The setting unit can change a correspondence relationship between the picture depth and prediction modes that become a selection target in response to statistical information of the image.

The setting unit can change, for each coding tree block (CTB) that becomes a start point when an encoded block is to be recursively divided, the correspondence relationship between the picture depth and prediction modes that become a selection target.

The statistical information of the image is dispersion information or motion information of the image.

The setting unit can change the correspondence relationship between the picture depth and prediction modes that become a selection target in response to an application.

The setting unit can change the number of prediction modes that become a selection target in response to the application.

The setting unit can change the type of prediction modes that become a selection target in response to the application.

The image encoding device further includes a memory configured to store correspondence relationships between the picture depths and prediction modes that become a selection target in the form of a table, and the setting unit sets a prediction mode using the table stored in the memory.

The image encoding device further includes a learning unit configured to learn a pattern of prediction modes to be limited in response to the prediction mode set by the setting unit, and the setting unit sets a prediction mode in accordance with the pattern learned by the learning unit.

The learning unit learns a pattern of prediction modes to be limited in response to the picture depth of the image or the picture type of the image.

An image encoding method according to the one aspect of the present disclosure is an image encoding method by an image encoding device, including setting a prediction mode to be used when an image is encoded in a state in which types of the prediction mode which become a selection target are limited in response to a picture depth indicative of a reference relationship between pictures of an image, and encoding the image for each of recursively divided encoded blocks in accordance with the set prediction mode.

In the one aspect of the present disclosure, a prediction mode to be used when an image is encoded is set in a state in which types of the prediction mode which become a selection target are limited in response to a picture depth indicative of a reference relationship between pictures of an image. Then, the image is encoded for each of recursively divided encoded blocks in accordance with the set prediction mode.

It is to be noted that the image encoding device described above may be an independent image processing device or may be an internal block that configures one image encoding device.

Advantageous Effect of Invention

According to the one aspect of the present disclosure, an image can be encoded. Especially, the encoding speed can be improved while the picture quality is maintained.

It is to be noted that the effect described here is not necessarily limited, but any of the effects described in the present disclosure may be achieved.

BRIEF DESCRIPTION OF DRAWINGS

FIG. 15 is a view illustrating the picture depth.

FIG. 16 is a view illustrating an example of a mode table.

FIG. 29 is a view depicting another example of a general configuration of the video processor to which the present disclosure is applied.

DESCRIPTION OF EMBODIMENTS

In the following, a mode for carrying out the present disclosure (hereinafter referred to as embodiment) is described. It is to be noted that the description is given in the following order.

0. Outline
1. First Embodiment (Encoding Device)
2. Second Embodiment (Network)
3. Third Embodiment (Computer)
4. Fourth Embodiment (Television Apparatus)
5. Fifth Embodiment (Portable Telephone Set)
6. Sixth Embodiment (Recording and Reproduction Apparatus)
7. Seventh Embodiment (Image Pickup Apparatus)
8. Eighth Embodiment (Other Embodiments)
<Outline>
(Encoding Method)

In the following, the present technology is described taking a case in which it is applied to image encoding and decoding of the HEVC method as an example.
(Block Division)

In existing image encoding methods such as MPEG2 or 264/AVC (hereinafter referred to as AVC), an encoding process is executed in a unit of processing called macro block. The macro block is a block having a uniform size of 16×16 pixels. In contrast, in HEVC, an encoding process is executed in a processing unit called encoding unit (CU). The CU is a block formed by recursively dividing a largest coding unit (LCU) and having a variable size. The largest size of the CU which can be selected is 64×64 pixels. The smallest size of the CU which can be selected is 8×8 pixels. The CU of the smallest size is called smallest coding unit (SCU).

Since the CU having a variable size is adopted, in HEVC, it is possible to adaptively adjust the picture quality and the encoding efficiency in response to the substance of an image. A prediction process for prediction encoding is executed in a processing unit called prediction unit (PU). The PU is formed by dividing a CU by one of several division patterns. Further, an orthogonal transformation process is executed in a processing unit called transform unit (TU). The TU is formed by dividing a CU or a PU to a certain depth.

(Recursive Division of Block)

Figure 1:
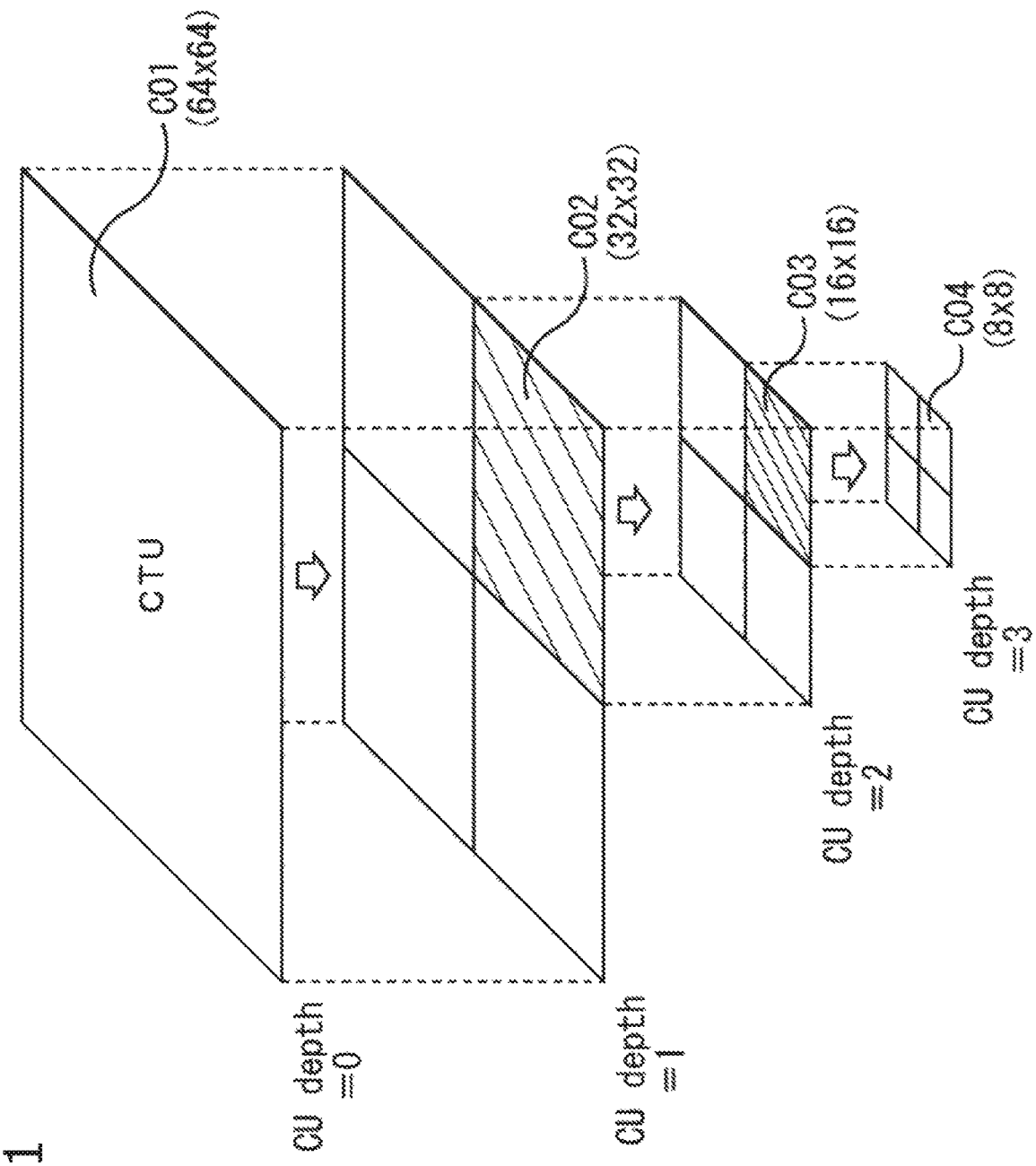
FIG. 1 is an explanatory view illustrating an outline of recursive block division of a coding unit (CU) in HEVC.

FIG. 1 is an explanatory view illustrating an outline of recursive block division of a CU in HEVC. Block division of a CU is performed by recursively repeating division of one block into four (=2×2) sub blocks, and as a result, a tree structure in the form of a quad-tree (Quad-Tree) is formed. The entirety of one quad-tree is called CTB, and a logical unit corresponding to the CTB is called coding tree unit (CTU).

At an upper region in FIG. 1, C01 that is a CU having a size of 64×64 pixels is depicted. The depth of C01 is equal to zero. This signifies that C01 is the root of the CTU and corresponds to the LCU. The LCU size can be designated by a parameter encoded in a sequence parameter set (SPS) or a picture parameter set (PPS). C02 that is a CU is one of four CUs divided from C01 and has a size of 32×32 pixels. The depth of division of C02 is equal to one. C03 that is a CU is one of four CUs divided from C02 and has a size of 16×16 pixels. The depth of C03 is equal to two. C04 that is a CU is one of four CUs divided from C03 and has a size of 8×8. The depth of C04 is equal to three. In this manner, a CU is formed by recursively dividing an image to be encoded. The depth of the division is variable. For example, in a flat image region like a region of the blue sky, a CU of a comparatively large size (namely, of a comparatively small depth) can be set. On the other hand, in a steep image region that includes many edges, a CU of a comparatively small size (namely, of a comparatively great depth) can be set. Further, each of the set CUs becomes a processing unit in an encoding process.

(Setting of PU to CU)

Figure 2:
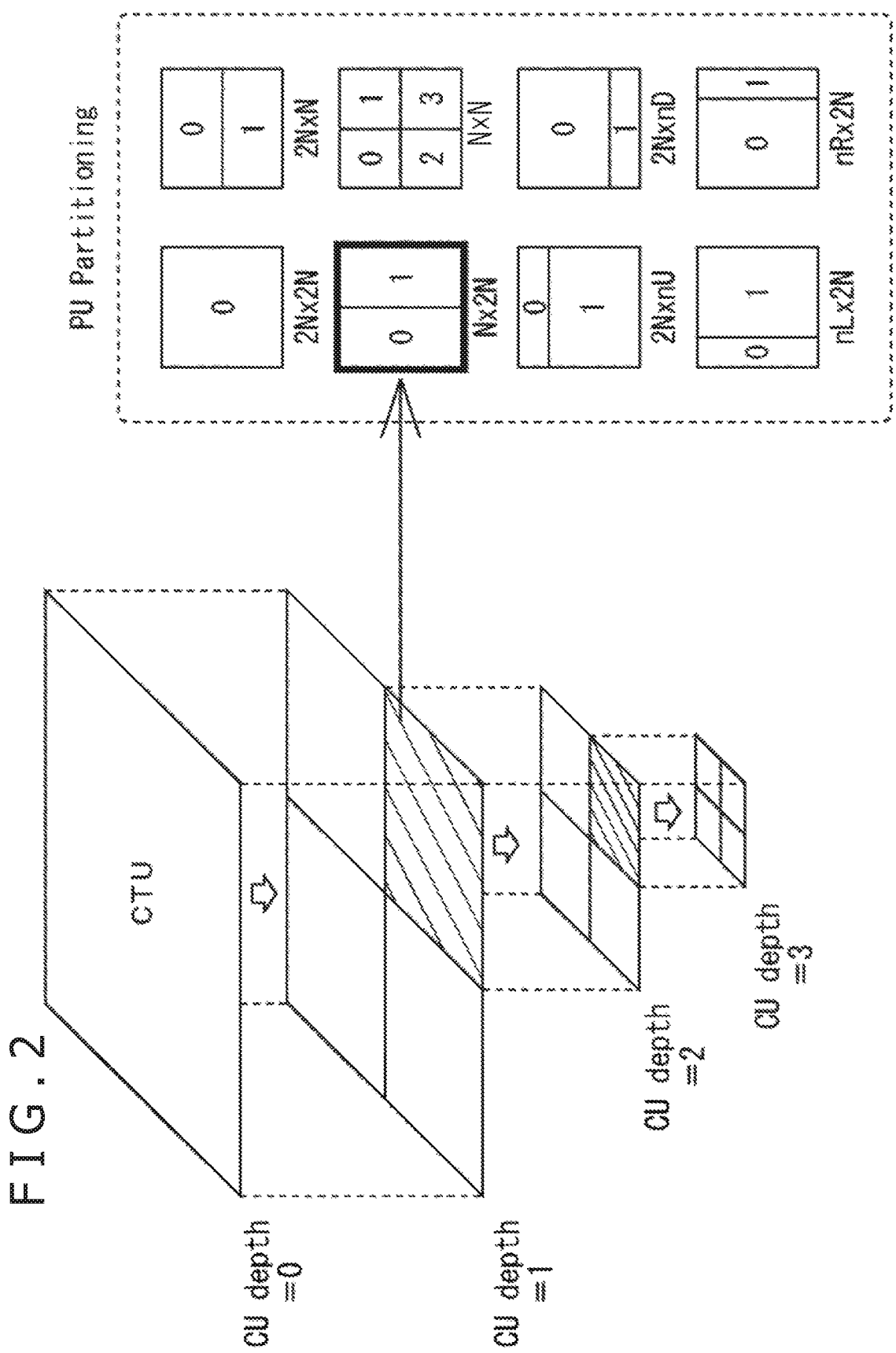
FIG. 2 is an explanatory view illustrating setting of a prediction unit (PU) to a CU depicted in FIG. 1.

The PU is a processing unit in a prediction process including intra prediction and inter prediction. A PU is formed by dividing a CU in one of several division patterns. FIG. 2 is an explanatory view illustrating setting of a PU to a CU illustrated in FIG. 1. At the right side in FIG. 2, eight different division patterns of 2N×2N, 2N×N, N×2N, N×N, 2N×nU, 2N×nD, nL×2N, and nR×2N are illustrated. In the intra prediction, it is possible to select two division patterns of 2N×2N and N×N from among the eight division patterns (N×N is selectable only for the SCU). On the other hand, in the inter prediction, where asymmetrical motion division is enabled, all of the eight division patterns are selectable.

(Setting of TU to CU)

Figure 3:
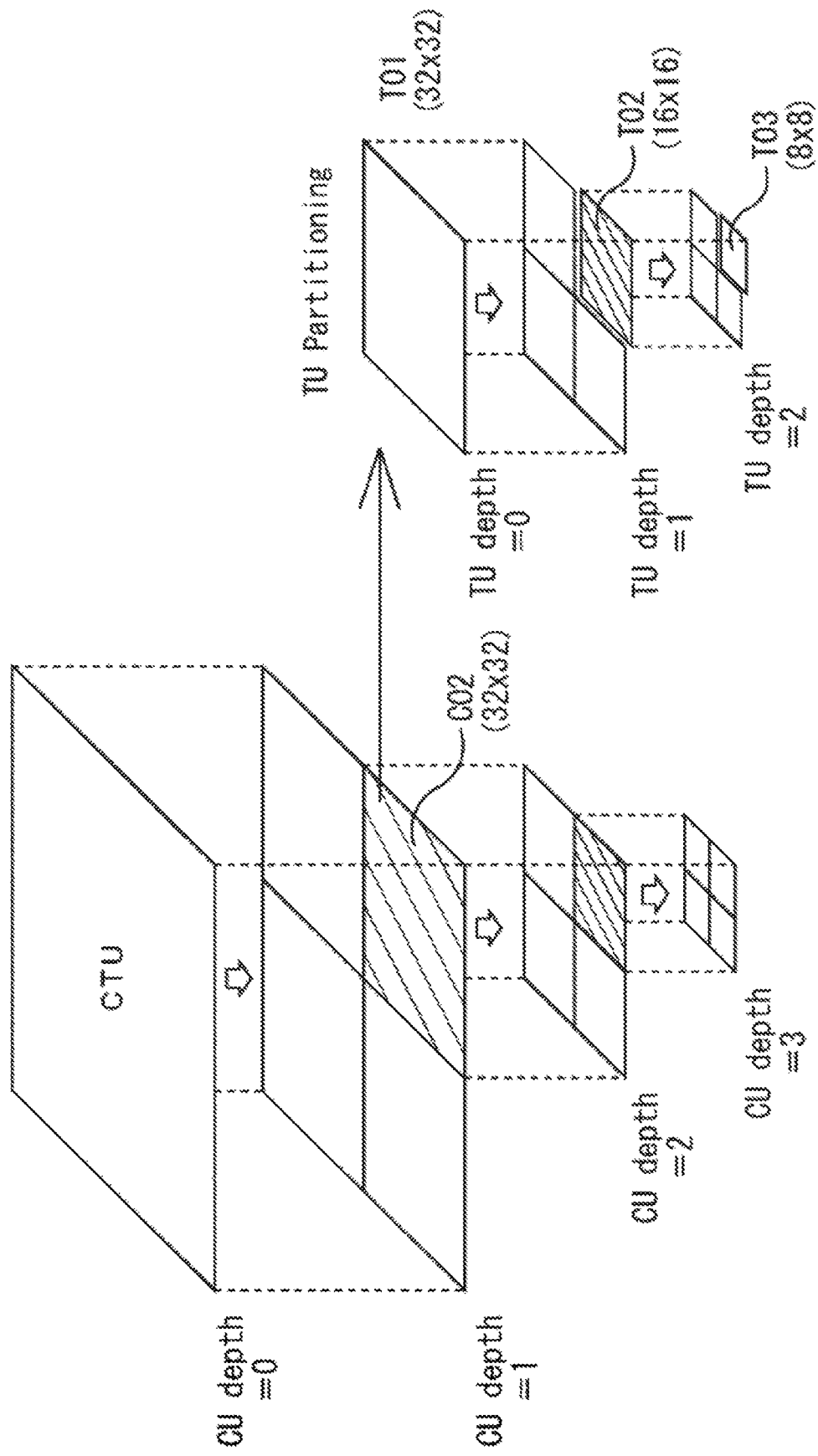
FIG. 3 is an explanatory view illustrating setting of a transform unit (TU) to a CU depicted in FIG. 1.

The TU is a processing unit for an orthogonal transformation process. A TU is formed by dividing a CU (regarding an intra CU, each PU in a CU) to a certain depth. FIG. 3 is an explanatory view illustrating setting of a TU to a CU illustrated in FIG. 1. On the right side in FIG. 3, one or more TUs that can be set to C02 is illustrated. For example, T01 that is a TU has a size of 32×32 pixels, and the depth of TU division of the same is equal to zero. T02 that is a TU has a size of 16×16 pixels, and the depth of TU division of the same is equal to one. T03 that is a TU has a size of 8×8 pixels, and the depth of TU division of the same is equal to two.

What block division is to be performed in order to set such a block as a CU, a PU, or a TU as described above to an image is determined typically on the basis of comparison in cost that affects the encoding efficiency. An encoder compares the cost, for example, between one CU of 2M×2M pixels and four CUs of M×M pixels, and determines, if the encoding efficiency is higher where four CUs of M×M pixels are set, then the encoder determines to divide a CU of 2M×2M into four CUs of M×M pixels.

However, the number of types of block sizes that can be selected in HEVC is very great in comparison with that in old-fashioned image encoding methods. That the number of types of block sizes that can be selected is great signifies that the number of combinations of block sizes between which the cost is to be compared in order to search for an optimum block size is great. In contrast, the block size of a macro block (that is a processing unit in an encoding process) in AVC is limited to 16×16 pixels. Although the block size of a prediction block in AVC is variable, the upper limit to the size is 16×16 pixels. The block size of a conversion block in AVC is 4×4 pixels or 8×8 pixels. Increase of the number of block sizes that can be selected in HEVC imposes, on the encoder, a requirement that a greater amount of information must be processed at a higher speed within a limited period of time and increases the implementation cost of the encoder.

(Scanning Order of CUs/PUs)

Figure 4:
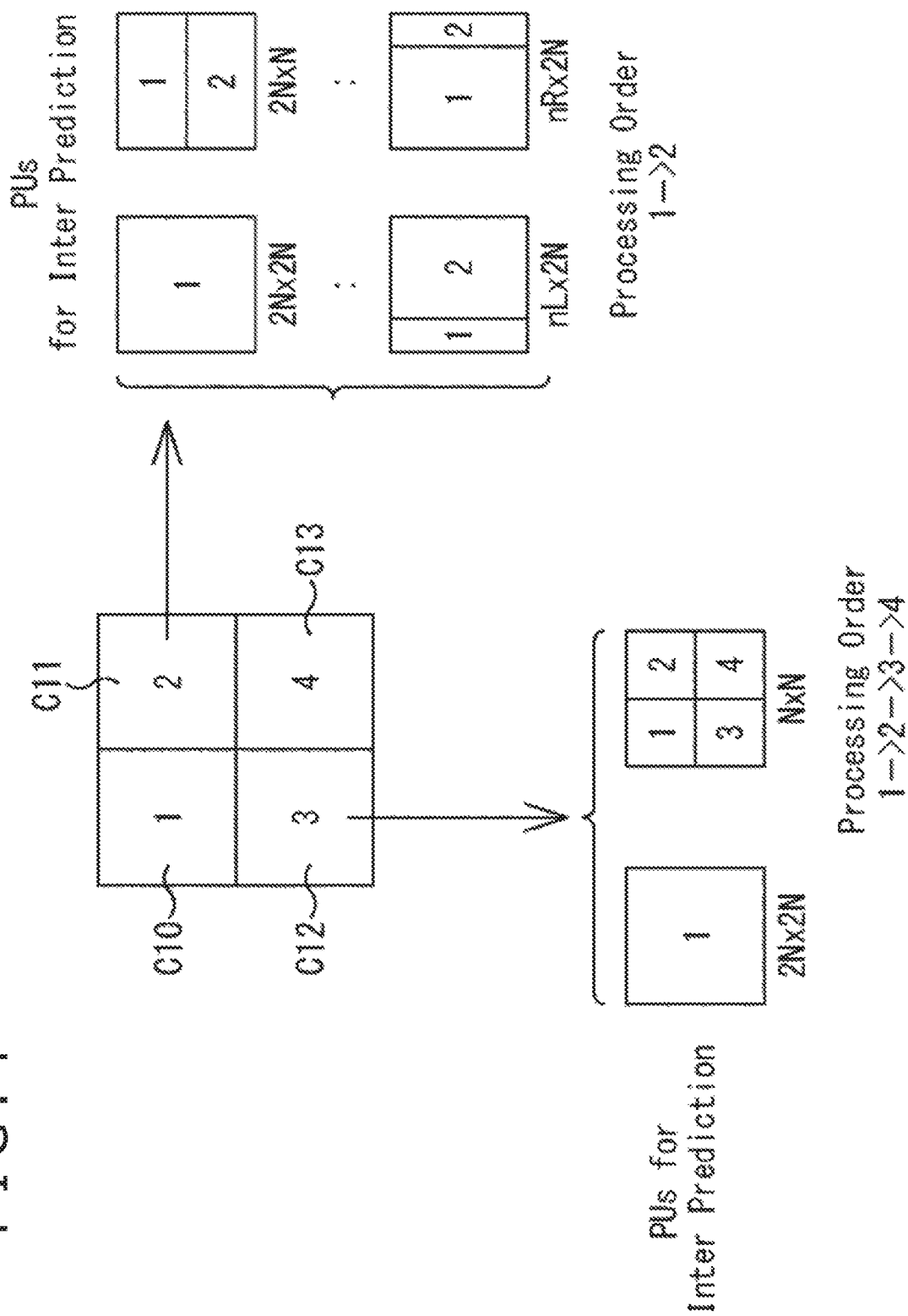
FIG. 4 is an explanatory view illustrating a scanning order of CUs/PUs.

When an image is to be encoded, a CTB (or an LCU) set in a lattice pattern in an image (or a slice or a tile) is scanned in a raster scan order. Within one CTB, CUs are scanned such that the quad-tree is traced from the left to the right and from the top to the bottom. When a current block is to be processed, information of upper and left neighboring blocks is utilized as input information. FIG. 4 is an explanatory view illustrating a scanning order of CUs/PUs. At a left upper portion in FIG. 4, C10, C11, C12, and C13 that are four CUs that can be included in one CTB are illustrated. A numeral in a frame of each CU represents an order number in processing. The encoding process is executed in the order of C10 that is the left upper CU, C11 that is the right upper CU, C12 that is the left lower CU, and C13 that is the right lower CU. At a right portion in FIG. 4, one or more PUs for inter prediction that can be set to C11 that is a CU are illustrated. At a lower portion in FIG. 4, one or more PUs for intra prediction which can be set to C12 that is a CU are illustrated. As indicated by numerals in frames of the PUs, also the PUs are scanned such that they are traced from the left to the right and from the top to the bottom. If one block is divided into a greater number of sub blocks, then the number of sub blocks to be scanning serially increases, and as a result, the clock of the processing circuit becomes tight and also the number of times of memory access increases. Therefore, also such block division into blocks of a smaller size can make a cause of increase of performance requirements for the encoder.

(Reference to Neighboring Block)

Figure 5:
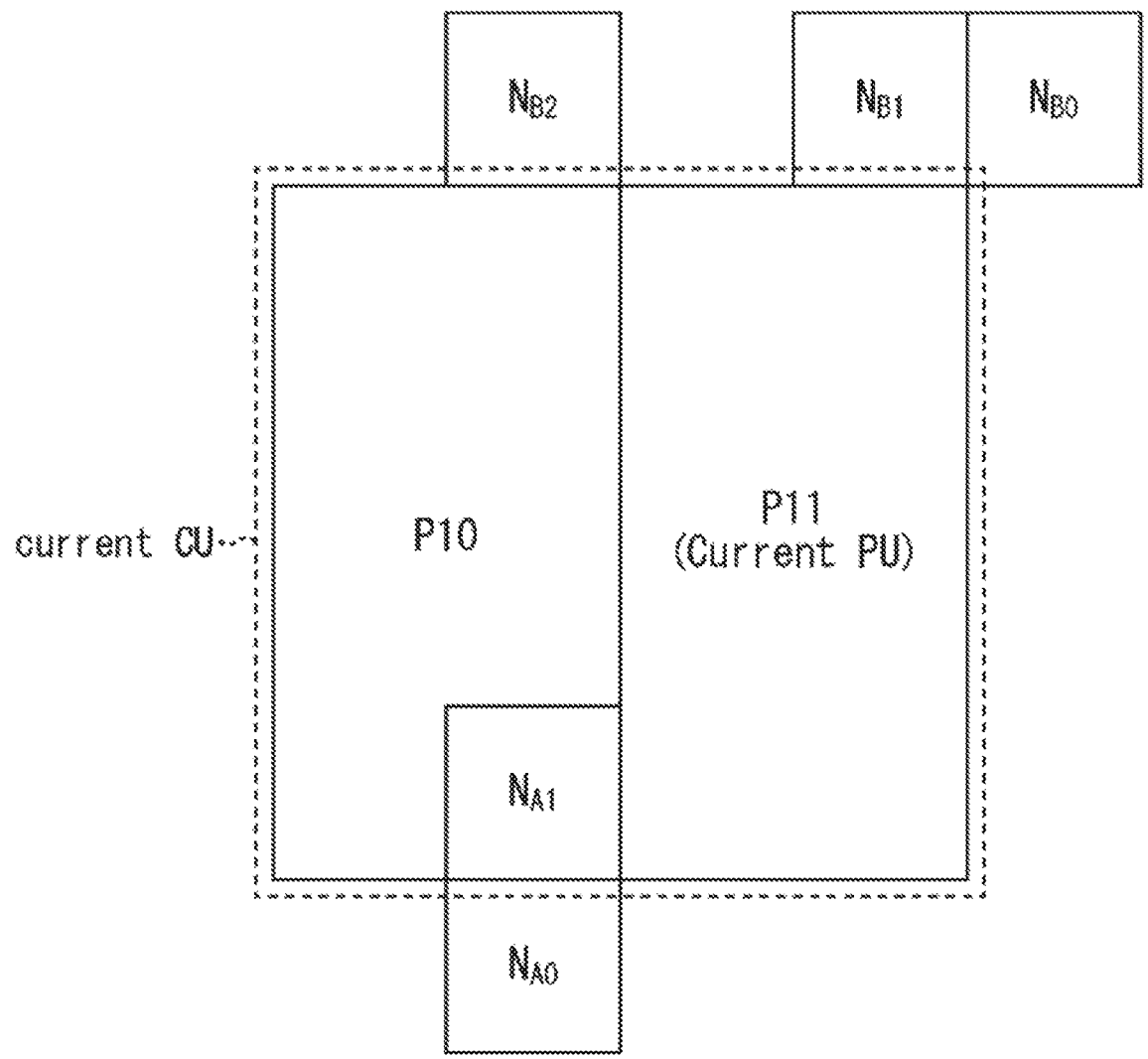
FIG. 5 is an explanatory view illustrating reference to a neighboring PU in an inter prediction process.

The inter prediction of HEVC has a mechanism called adaptive motion vector prediction (AMVP). In AMVP, in order to reduce the code amount of motion vector information, motion vector information of a current PU is prediction encoded on the basis of motion vector information of neighboring PUs. FIG. 5 is an explanatory view illustrating reference to neighboring PUs in an inter prediction process. In the example of FIG. 5, P10 and P11 that are two PUs are set for a current CU. P11 that is a PU is the current PU. In AMVP of an inter prediction process for P11 that is a PU, motion vectors set to leftwardly neighboring blocks $N_{A0}$ and $N_{A1}$ and upwardly neighboring $N_{B0}$, $N_{B1}$, and $N_{B2}$ are referred to as candidates for a prediction motion vector. Accordingly, an inter prediction process for P11 that is a PU is executed after waiting the inter prediction process for the upwardly and leftwardly neighboring blocks comes to an end.

Figures 6, 7:
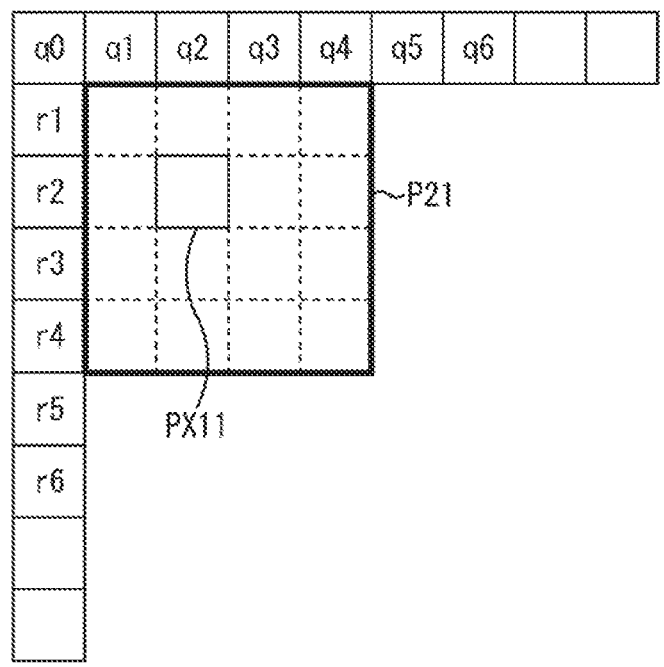
FIG. 6 is an explanatory view illustrating reference to a neighboring PU in an intra prediction process.
FIG. 7 is a view illustrating a difference in in-screen prediction between the AVC and the HEVC.

In intra prediction of HEVC, a prediction pixel value of a current PU is calculated using reference pixel values of neighboring PUs. FIG. 6 is an explanatory view illustrating reference to neighboring PUs in an intra prediction process. In the example of FIG. 6, the PU P21 is a current PU. A pixel PX11 is a pixel belonging to the PU P21. Meanwhile, pixels q0 to q6 are reference pixels belonging to upwardly neighboring PUs, and pixels r1 to r6 are reference pixels belonging to leftwardly neighboring PUs. For example, the prediction pixel value of the pixel PX11 in intra DC prediction is equal to an average value of pixels values of reference pixels q1, q2, q3, q4, r1, r2, r3, and r4.

Also the reference relationships between blocks described hereinabove with reference to FIGS. 5 and 6 are a factor of increase of performance requirements for an encoder where one block is divided into a greater number of blocks. For example, as a result when a process of a current block cannot be started till an end of processing of a neighboring block, the clock of the processing circuit becomes tight. Further, the number of times of accessing to a buffer that retains pixel values of neighboring blocks can rely upon the number of times by which the reference pixels are utilized.

(Mode Selection)

Incidentally, in order to achieve a higher encoding efficiency in AVC and HEVC encoding methods, selection of an appropriate prediction mode is significant.

As an example of such a selection method as just described, a method incorporated in reference software for AVC called joint model (JM) (laid open by http://iphome.hhi.de/suehring/tml/index.htm) can be listed.

According to JM, it is possible to select two different mode decision methods of High Complexity Mode and Low Complexity mode. Both of them calculate a cost function value relating to individual prediction modes Mode and the prediction mode that minimizes the cost function value is selected as an optimum mode for the block and macro block.

The cost function in the High Complexity Mode is represented as given by the following expression (1).

$$\text{Cost}(\text{Mode} \in \Omega) = D + \lambda * R \quad (1)$$

Here, $\Omega$ is a whole set of candidate modes for encoding the block and macro block, and D is difference energy between a decoded image and an input image where the prediction mode is used for encoding. $\lambda$ is a Lagrange undetermined multiplier given as a function of a quantization parameter. R is a total code amount where the mode is used for encoding including an orthogonal transformation coefficient.

In particular, in order to perform encoding in the High Complexity Mode, since the parameters D and R described above are calculated, it necessary to perform a temporary encoding process once for all candidate modes and a greater arithmetic operation amount is required.

The cost function in the Low Complexity Mode is represented by the following expression (2).

$$\text{Cost}(\text{Mode} \in \Omega) = D + QP2\text{Quant}(QP) * \text{HeaderBit} \quad (2)$$

Here, different from the case of the High Complexity Mode, D is difference energy between a prediction image and an input image. Qp2Quant (QP) is given as a function of the quantization parameter Qp, and HeaderBit is a code amount that relates to information that does not include an orthogonal transformation coefficient and relates to information belonging to the Header such as a motion vector and a mode.

In particular, although, in the Low Complexity Mode, it is necessary to perform a prediction process relating to individual candidate modes, since no decoded image is required, there is no necessity to perform an encoding process. Therefore, it is possible to implement the Low Complexity Mode with a smaller arithmetic operation amount than that by the High Complexity Mode.

(Inter-Screen Prediction)

According to a motion compensation process in HEVC, a motion compensation process for a luminance single can be performed with a ¼ pixel accuracy, and a motion compensation process for a color difference signal can be performed with a ⅛ pixel accuracy similarly as in the case AVC.

It is to be noted that, while, in AVC, a filter of six taps is used for a luminance signal and motion compensation is performed by linear interpolation is performed for a color difference signal, in HEVC, a filter of eight or seven taps is used for a luminance signal and a filter of four taps is used for a color difference signal to perform motion compensation. In other words, in HEVC, the tap length is increased and besides the arithmetic operation accuracy is improved to 16 bits in comparison with AVC.

Furthermore, not such a process of two stages that a product sum arithmetic operation is performed in a horizontal direction and then a rounding process is performed and that a product sum arithmetic operation is performed in a vertical direction and a rounding process is performed is performed, but a rounding process is performed only once after a product sum arithmetic operation is performed in a horizontal direction and a vertical direction thereby to decrease an arithmetic operation error and implement a higher encoding efficiency.

Further, in HEVC, also it is possible to use, in addition to motion compensation partition by symmetrical division (a single CU is divided upwardly and downwardly or leftwardly and rightwardly into PU shapes of a uniform size), motion compensation partition by asymmetrical division (a single CU is divided upwardly and downwardly or leftwardly and rightwardly into PU shapes having non-uniform sizes), by which the encoding efficiency is further improved.

(In-Screen Prediction)

FIG. 7 is a view illustrating differences in in-screen prediction between AVC and HEVC. In HEVC, in order to improve the compression ratio utilizing a correlation between neighboring pixels, in-screen prediction encoding using pixel values decoded already is performed. In the case of the in-screen prediction, prediction is performed in a unit of a TU of a square shape and four sizes of 4×4, 8×8, 16×16, and 32×32 are available. The in-screen prediction of HEVC is improved in various points as given below in comparison with in-screen prediction of AVC.

First, since filtering is applied to reference pixels neighboring with an encoding target block with a condition, the prediction efficiency is improved by noise removal, and especially at a place far from the reference pixel, the prediction efficiency is improved. Further, in the filter process described above, a special filter process for improving depending upon a condition.

As regards directional prediction, while it is performed for nine directions in AVC, in HEVC, it is performed for 33 directions and the directional prediction can be designated more finely, and high efficiency prediction is possible at a delicate angle.

Further, in HEVC, DC prediction and horizontal and vertical prediction that are involved also in AVC are improved, and Planar prediction of a higher performance is introduced in place of Plane prediction of AVC.

Although AVC utilizes in-screen prediction block sizes of 4×4, 8×8, and 16×16, HEVC utilizes also an in-screen prediction block size of 32×32 in addition to them. Further, the types of prediction are common among all block sizes.

As described above, in HEVC, an in-screen prediction mode number (predModeIntra) is applied to each PU among numbers 0 to 34 for two different non-directional predictions and 33 different directional predictions. A TU has a square shape of a size equal to or smaller than that of a PU, and encoding-decoding and in-screen prediction are performed in a unit of a TU. For each TU in a PU, same predModeIntra is used.

In the following, three different types of in-screen prediction processes are described. It is to be noted that a prediction pixel value generated in a TU is represented as preSamples[x][y].

1. Planar Prediction (where predModeIntra=0)

In Planar prediction, a prediction pixel value is generated smoothly using four reference pixel values. The prediction pixel value of Planar prediction is represented by the following expression (3).

[Expression 1]

$$predSamples[x][y]=((N-1-x)p[-1][y]+(x+1)p[N][-1]+(N-1-y)p[x][-1]+(y+1)p[-1][N]+N)/(2N) \quad (3)$$

Figure 8:
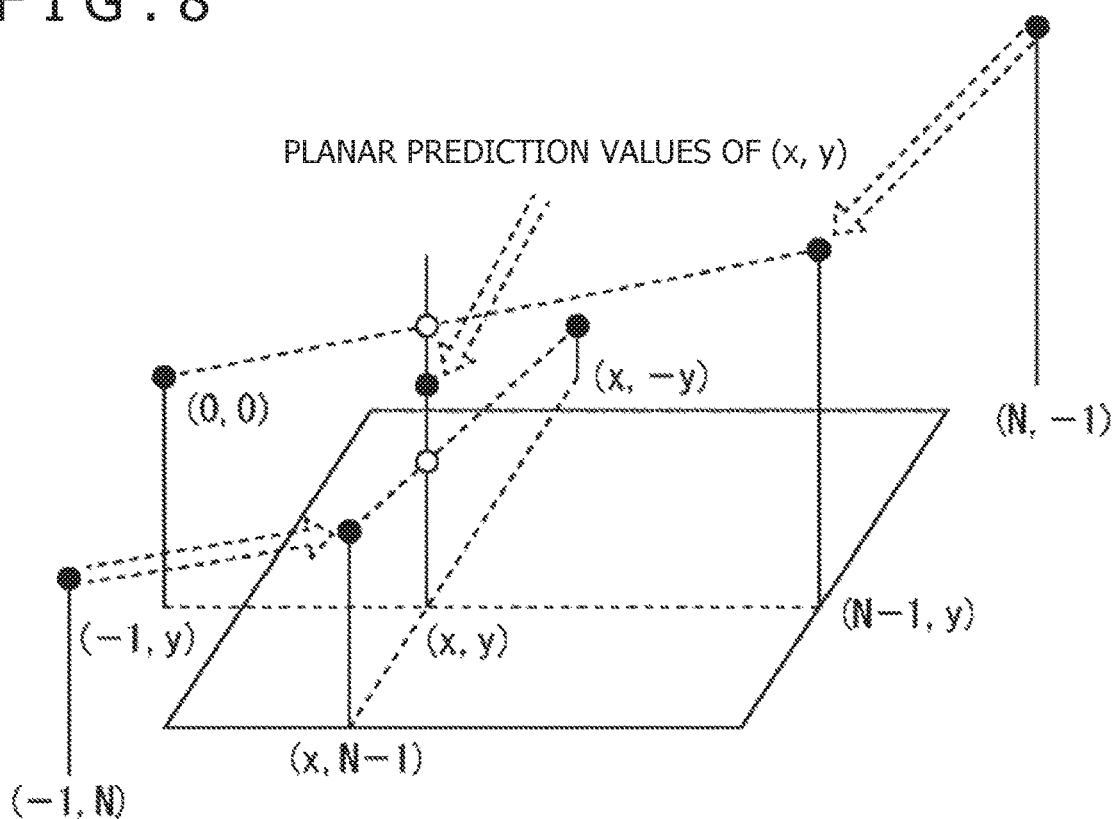
FIG. 8 is a view illustrating Planar prediction.

FIG. 8 is a view illustrating Planar prediction. In Planar prediction, enumerating that p[N][−1] is positioned not at (N,y) but at (N+1,y) and that p[−1][N] is positioned at (x,N−1), an average of values (○) obtained by horizontal/vertical linear interpolation becomes an interpolation value.

In other words, although, in plane prediction of AVC, a prediction image is produced on a least squares plane, in Planar prediction of EVC, a prediction image is a curved face.

2. Direct Current (DC) Prediction (Where predModeIntra=1)

Figure 9:
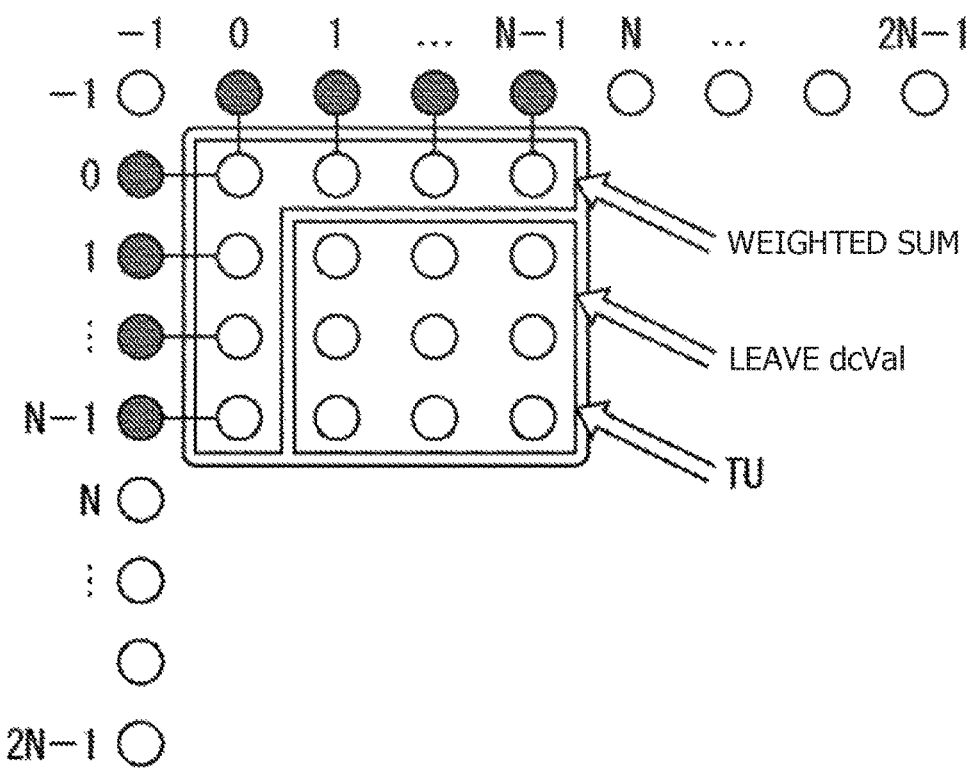
FIG. 9 is a view illustrating direct current (DC) prediction.

A prediction image is generated by filling up a TU with average values (dcVal) of reference pixels (2N pixels) indicated by black circles in FIG. 9. A prediction pixel value of DC prediction is represented by the following expression (4).

[Expression 2]

$$dcVal = \left(\sum_{t=0}^{N-1}(p[-1][t]+p[t][-1])+N\right)/(2N) \quad (4)$$

$$predSamples[x][y] = dcVal(x, y = 0 \ldots N-1)$$

It is to be noted, however, that, where the TU size (N) in a luminance signal is lower than 32, for pixels on an upper edge and a left edge of a TU, if they are weighted averaged with a reference image at the nearest position (prediction pixels indicated by blank circles and reference pixels indicated by black circles in FIG. 9 linked by a broken line), then the pixel value variation in the broken line direction can be reduced.

In particular, as indicated by the expressions (5) given below, although, in DC prediction of AVC, a prediction image is produced with reference pixel average values, in DC prediction of HEVC, a process for acclimating portions neighboring with reference pixels to the reference pixels is added.

[Expression 3]

$$predSamples[0][0]=(p[-1][0]+2dcVal+p[0][-1]+2)/4$$

$$predSamples[x][0]=(p[x][-1]+3dcVAL+2)/4, (x=1 \ldots N-1)$$

$$predSamples[0][y]=(p[-1][y]+3dcVal+2)/4, (y=1 \ldots N-1) \quad (5)$$

It is to be noted that, for pixels other than those on the edges, deVal is left as it is.

3. Directional Prediction (Where predModeIntra=2 to 34)

Inclination in Reference Direction

Figure 10:
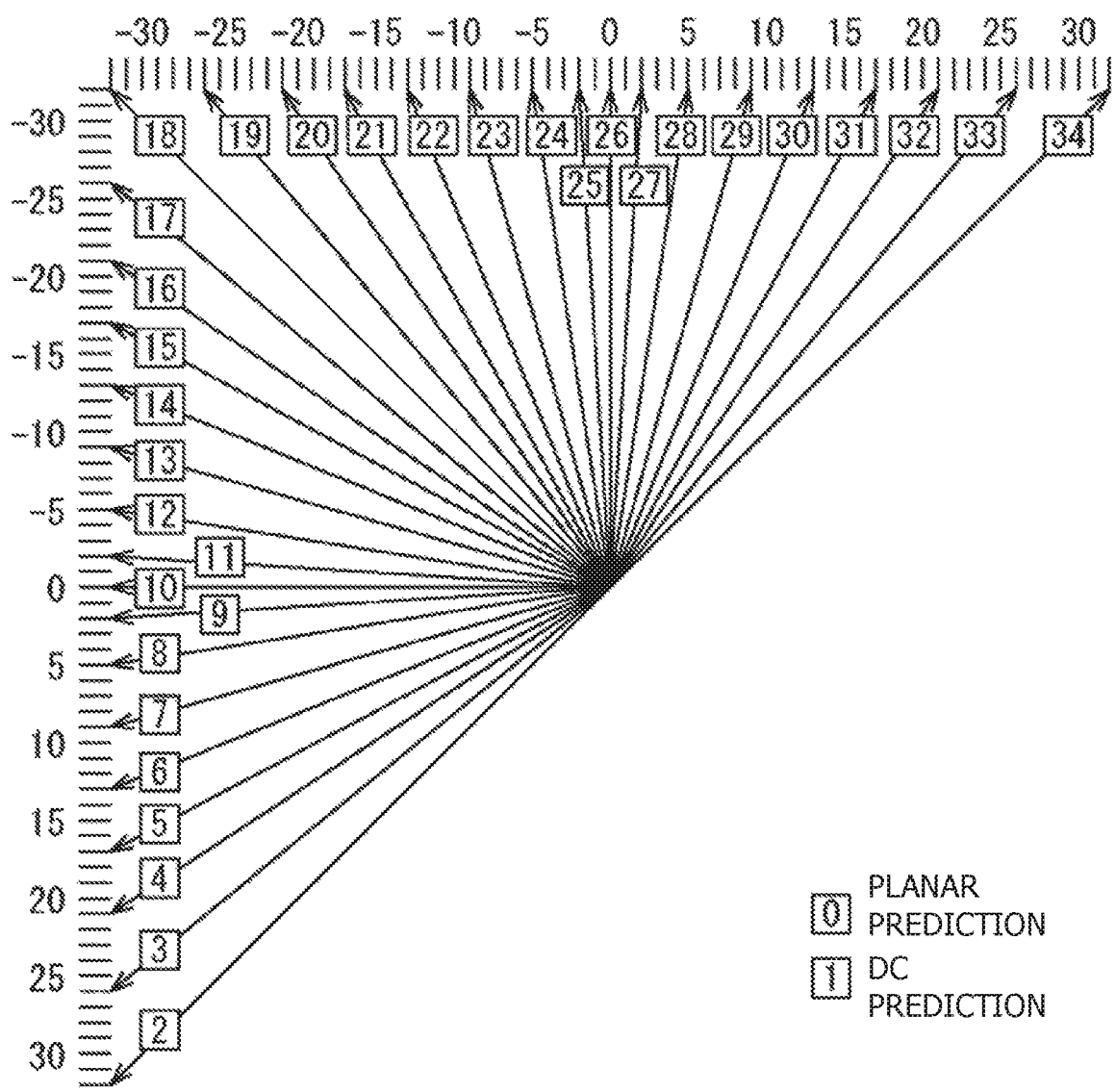
FIG. 10 is a view illustrating predModeIntra and a reference direction.

FIG. 10 is a view illustrating predModeIntra and a reference direction. An arrow mark in FIG. 10 represents a pixel value reference direction in directional prediction (33 directions where predModeIntra=2 to 34). If a numeral at the destination of an arrow mark is checked, then an inclination of the reference direction can be found. For example, where predModeIntra=10, the reference is performed in a horizontal direction (because the variation in the y direction is zero); where predModeIntra=13, the reference is performed in a direction of an inclination of −9/32 (because the variation in the x direction is −32 and the variation in the y direction is −9); and where predModeIntra=22, the reference is performed in a direction of an inclination of 32/13 (because the variation in the x direction is −13 and the variation in the y direction is −32).

Prediction by Internal Division Value

Figure 11:
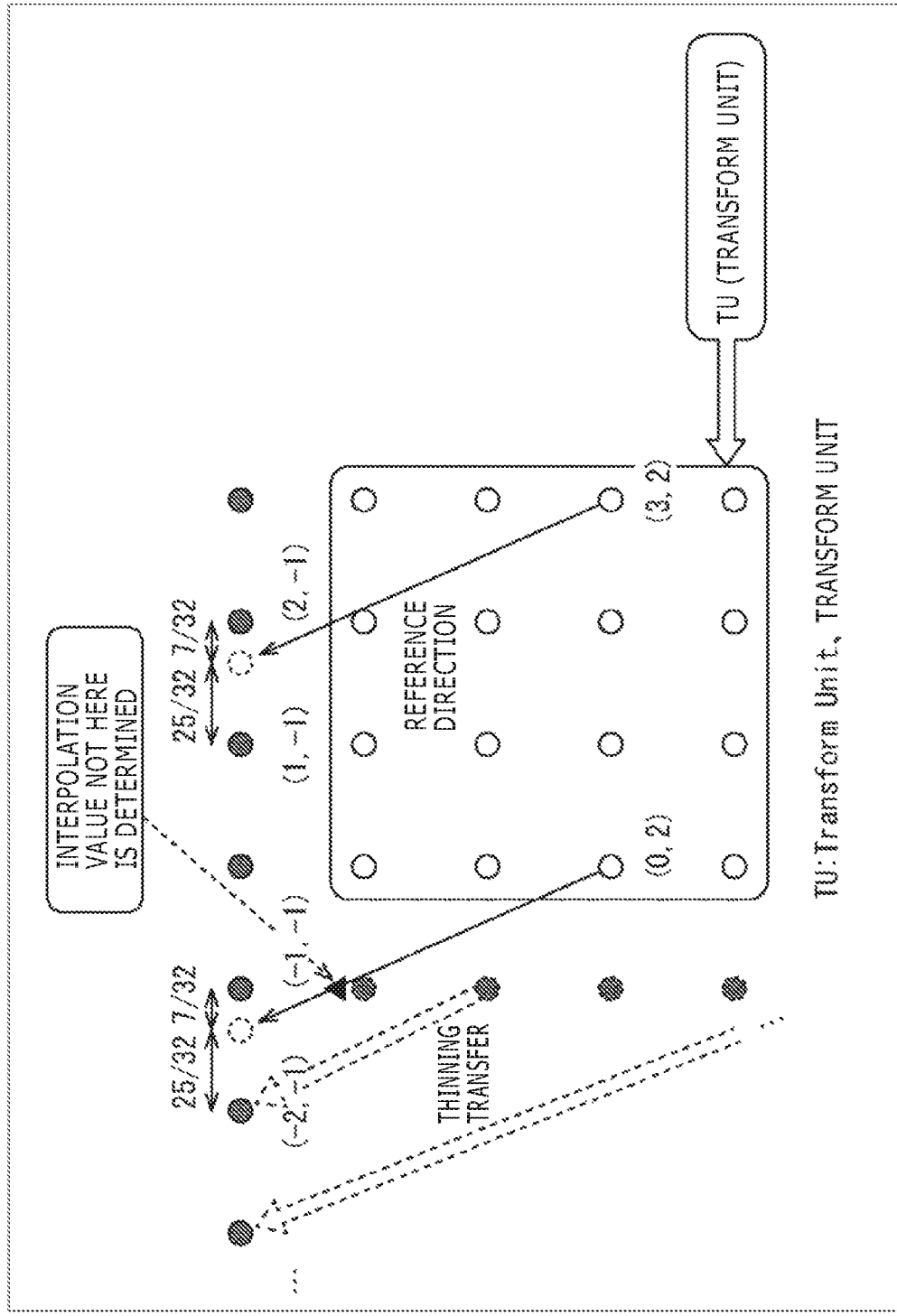
FIG. 11 is a view illustrating an example of prediction where preModeIntra=22.

FIG. 11 is a view illustrating an example of prediction where predModeIntra=22. It is to be noted that, in FIG. 11, a coordinate system same as that in the case of FIG. 9 is used. When the position of (3,2) where predModeIntra=22 is to be determined, since the inclination of the reference direction is 32/13, if the position is moved by −3 in the y direction to a line on which the reference pixel exists, it is displaced by 13/32*3=39/32. In particular, actually the pixel value at a position (broken line round mark in FIG. 11) displaced by 25/32 from (1,−1) and by 7/32 from (2,−1) is determined virtually.

In HEVC, this value is determined by internal division calculation according to the distance from a reference pixel. In particular, the in-screen prediction value of the position of (3,2) is given by the expression (6) given below. It is to be noted that, if the reference destination is an integer pixel position, then the internal division calculation is not performed and the reference pixel value of the position is made a prediction value as it is.

[Expression 4]

$$predSamples[3][2]=(7p[1][-1]+25p[2][-1]+16)/32 \quad (6)$$

Thinning Transfer and Prediction Using invAngle

When a prediction value of the position of (0,2) is to be determined in FIG. 11, in AVC, a pixel value at the position of the triangle is determined from the left reference pixel column, in HEVC, prior to calculation of an interpolation value, thinning transfer is performed which uses a value called invAngle (inverse angle parameter, a value obtained by multiplying a reciprocal number of a numeral (integer of −2 to 32) indicated by an arrow mark in FIG. 10 by 8192 (=$2^{13}$) and rounding the product to an integer) that is designated such that reference pixels are juxtaposed on a linear line (in this case (predModeIntra=22>18), a horizontal linear line. When predModeIntra is lower than 18, a vertical linear line). This thinning transfer is represented by the following expression (7).

[Expression 5]

$$p'[x-1][-1]=p[-1][-1+((x*invAngle+128)/256)] \quad (7)$$

Where predModeIntra=22, since invAngle=−630, thinning transfer is performed as indicated by the following expression (8).

[Expression 6]

$$p'[-2][-1]=p[-1][1],$$

$$p'[-3][-1]=p[-1][4],$$

$$p'[-4][-1]=p[-1][6],$$

$$p'[-5][-1]=p[-1][9], \quad (8)$$

Thereafter, an interpolation value is determined quite similarly as in the case of (3,2) described hereinabove as indicated by the following expression (9).

[Expression 7]

$$predSamples[0][2]=(7p[-2][-1]+25p[-1][-1]+16)/32 \quad (9)$$

Exceptional Process of Prediction Value

Further, where N<32 in a luminance signal, the following exceptional process is performed.

Where predModeIntra=10 (reference in the horizontal direction), one row at the upper end of the prediction image is predicted as predSampes[x][0]=Clip(p[-1][0]+((p[x][-1]-p[-1][-1])>>1)) (x=0 ... N-1) and where predModeIntra=26 (reference in the vertical direction), one row at the left end is predicted as predSampes[0][y]=Clip(p[0][-1]+((p[-1][y]-p[-1][-1])>>1)) (y=0 ... N-1). It is to be noted that Clip( ) is a function that clipping (falling within upper and lower limit) an argument to a value (where 8 bits image, 0 to 255) which a luminance signal can take.

As described above, HEVC has a very great number of prediction modes even in comparison with AVC and also has an increased calculation amount as a result of the improvement to increase the encoding efficiency. Accordingly, if the cost for all modes is calculated using the expression (1) or the expression (2) given hereinabove, then the calculation amount becomes very great, resulting in difficulty in using HEMV as an encoder, for example, for a low delay application or a real time application.

Although the encoding time period can be reduced by simply restricting the number of modes that are made a candidate, there is the possibility that the encoding efficiency may be deteriorated thereby. The encoding efficiency is also called compression ratio, and if the encoding efficiency deteriorates, then where the picture quality (corresponding to the distortion amount (difference energy) described above) is same, the size of compressed data becomes great, and in the case of the same data size, the picture quality deteriorates. Accordingly, this is not desirable from the purpose that the data size is reduced with good picture quality.

Therefore, in the present technology, a prediction mode is set which is used when an image is to be encoded in a state in which the types of prediction modes that become a target of selection in response to the picture depth that is information indicative of a reference relationship between image pictures are limited. Then, the image is encoded for each of recursively divided encoded blocks of the image in accordance with the set prediction mode.

In the following, application examples of the present technology having such a configuration as described above to particular apparatus are described.

First Embodiment (Example of Configuration of First Embodiment of Encoding Device)

Figure 12:
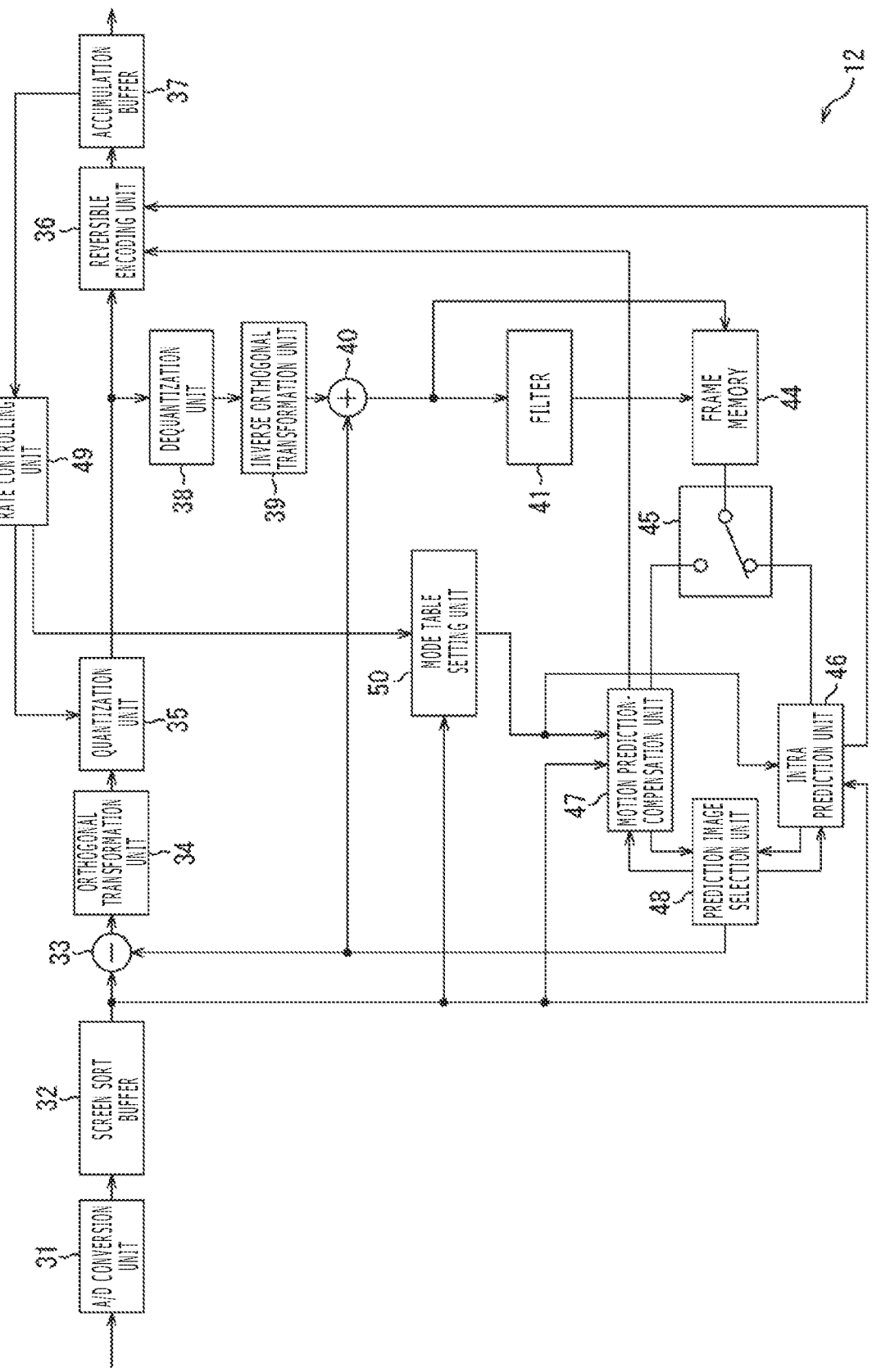
FIG. 12 is a block diagram depicting an example of a configuration of an embodiment of an encoding device to which the present technology is applied.

FIG. 12 is a block diagram depicting an example of a configuration of the first embodiment of the encoding device to which the present technology is applied.

An encoding device 12 of FIG. 12 includes an analog-to-digital (A/D) conversion unit 31, a screen sort buffer 32, an arithmetic operation unit 33, an orthogonal transformation unit 34, a quantization unit 35, a reversible encoding unit 36, an accumulation buffer 37, a dequantization unit 38, an inverse orthogonal transformation unit 39, and an addition unit 40. Further, the encoding device 12 includes a filter 41, a frame memory 44, a switch 45, an intra prediction unit 46, a motion prediction-compensation unit 47, a prediction image selection unit 48, a rate controlling unit 49, and a mode table setting unit 50.

The A/D conversion unit 31 of the encoding device 12 performs A/D conversion for an image in a unit of a frame inputted as an encoding target. The A/D conversion unit 31 outputs and stores an image that is a digital signal after the conversion to and into the screen sort buffer 32.

The screen sort buffer 32 sorts images in a unit of a frame of the stored order for displaying into an order for encoding in response to a group of pictures (GOP) structure. The screen sort buffer 32 outputs the images after the sorting to the arithmetic operation unit 33, the intra prediction unit 46, the motion prediction-compensation unit 47, and the mode table setting unit 50. Further, the screen sort buffer 32 outputs a picture type of each image as information of a type of the image and a picture depth of the image as information indicative of a reference relationship between images to the mode table setting unit 50.

The arithmetic operation unit 33 subtracts a prediction image supplied from the prediction image selection unit 48 from an image supplied thereto from the screen sort buffer 32 to perform encoding. The arithmetic operation unit 33 outputs an image obtained as a result of the encoding as residual information (difference) to the orthogonal transformation unit 34. It is to be noted that, where a prediction image is not supplied from the prediction image selection unit 48, the arithmetic operation unit 33 outputs the image read out from the screen sort buffer 32 as residual information as it is to the orthogonal transformation unit 34.

The orthogonal transformation unit 34 performs an orthogonal transformation process for the residual information from the arithmetic operation unit 33 in a unit of a TU. The orthogonal transformation unit 34 supplies an orthogonal transformation process result after the orthogonal transformation process to the quantization unit 35.

The quantization unit 35 quantizes the orthogonal transformation process result supplied from the orthogonal transformation unit 34. The quantization unit 35 supplies a quantization value obtained as a result of the quantization to the reversible encoding unit 36.

The reversible encoding unit 36 acquires information indicative of an optimum intra prediction mode (hereinafter referred to as intra prediction mode information) from the intra prediction unit 46. Further, the reversible encoding unit 36 acquires the information indicative of an optimum inter prediction mode (hereinafter referred to as inter prediction mode information), a motion vector, information for specifying a reference image and so forth from the motion prediction-compensation unit 47. The reversible encoding unit 36 also acquires offset filter information relating to an offset filter from the filter 41.

The reversible encoding unit 36 performs reversible encoding such as variable length encoding or arithmetic encoding for the quantization value supplied from the quantization unit 35.

Further, the reversible encoding unit 36 performs reversible encoding for intra prediction mode information or for inter prediction mode information, a motion vector, information for specifying a reference image, offset filter information and so forth as encoded information relating to encoding. The reversible encoding unit 36 supplies the encoded information and quantization value after the reversible encoding as encoded data to the accumulation buffer 37 so as to be accumulated.

It is to be noted that the encoded information after reversible encoding may be used as header information (for example, slice header) of the quantization value after reversible encoding.

The accumulation buffer 37 temporarily stores the encoded data supplied from the reversible encoding unit 36. Further, the accumulation buffer 37 supplies the stored encoded data as an encoded stream to a transmission unit 13.

Meanwhile, a quantization value outputted from the quantization unit 35 is inputted also to the dequantization unit 38. The dequantization unit 38 dequantizes the quantization value. The dequantization unit 38 supplies an orthogonal transformation process result obtained as a result of the dequantization to the inverse orthogonal transformation unit 39.

The inverse orthogonal transformation unit 39 performs an inverse orthogonal transformation process for the orthogonal transformation process result supplied from the dequantization unit 38 in a unit of a TU. As a method of inverse orthogonal transformation, for example, inverse discrete cosine transformation (IDCT) and inverse discrete sine transformation (IDST) are available. The inverse orthogonal transformation unit 39 supplies residual information obtained as a result of the inverse orthogonal transformation process to the addition unit 40.

The addition unit 40 adds the residual information supplied from the inverse orthogonal transformation unit 39 and a prediction image supplied from the prediction image selection unit 48 to each other to perform decoding. The addition unit 40 supplies a decoded image to the filter 41 and the frame memory 44.

The filter 41 performs a filter process for the decoded image supplied from the addition unit 40. In particular, the filter 41 performs a deblocking filter process and an adaptive offset filter (sample adaptive offset (SAO)) process in order. The filter 41 supplies an encoded picture after the filter process to the frame memory 44. Further, the filter 41 supplies a type of the performed adaptive offset filter process and information indicative of the offset as offset filter information to the reversible encoding unit 36.

The frame memory 44 accumulates images supplied from the filter 41 and images supplied from the addition unit 40. Images neighboring with a PU from among images that are accumulated in the frame memory 44 but with regard to which the filter process is not performed are supplied as peripheral images to the intra prediction unit 46 through the switch 45. On the other hand, an image that is accumulated in the frame memory 44 and for which the filter process is performed is outputted as a reference image to the motion prediction-compensation unit 47 through the switch 45.

The intra prediction unit 46 performs an intra prediction process for all intra prediction modes that become a candidate using the peripheral images read out from the frame memory 44 through the switch 45 in a unit of a PU.

Further, the intra prediction unit 46 calculates a cost function value (details are hereinafter described) for an intra prediction mode that is indicated by information supplied from the mode table setting unit 50 and is capable of being used on the basis of the image read out from the screen sort buffer 32 and a prediction image generated as a result of the intra prediction process. Further, the intra prediction unit 46 determines an intra prediction mode by which the cost function value is minimized as an optimum intra prediction mode.

The intra prediction unit 46 supplies a prediction image generated in the optimum intra prediction mode and a corresponding cost function value to the prediction image selection unit 48. Where a notification of selection of the prediction image generated in the optimum intra prediction mode is received from the prediction image selection unit 48, the intra prediction unit 46 supplies the intra prediction mode information to the reversible encoding unit 36. It is to be noted that the intra prediction mode is a mode representative of a size of a PU, a prediction direction and so forth.

The motion prediction-compensation unit 47 performs a motion prediction-compensation process of an inter prediction mode that is indicated by the information supplied from the mode table setting unit 50 and is capable of being used. In particular, the motion prediction-compensation unit 47 detects a motion vector of the inter prediction mode that is indicated by the information supplied from the mode table setting unit 50 and is capable of being used in a unit of a PU on the basis of an image supplied from the screen sort buffer 32 and a reference image read out from the frame memory 44 through the switch 45. Further, the motion prediction-compensation unit 47 performs a compensation process for the reference image in a unit of a PU on the basis of the motion vector to generate a prediction image.

At this time, the motion prediction-compensation unit 47 calculates a cost function value for the inter prediction mode that is indicated by the information supplied from the mode table setting unit 50 and is capable of being used on the basis of the image supplied from the screen sort buffer 32 and the prediction image, and determines an inter prediction mode by which the cost function value is minimized as an optimum inter prediction mode. Further, the motion prediction-compensation unit 47 supplies the cost function value of the optimum inter prediction mode and a corresponding prediction image to the prediction image selection unit 48. Further, where a notification of selection of the prediction image generated in the optimum inter prediction mode is received from the prediction image selection unit 48, the motion prediction-compensation unit 47 outputs the inter prediction mode information, corresponding motion vector, information for specifying the reference image and so forth to the reversible encoding unit 36. It is to be noted that the inter prediction mode is a mode representing a size of a PU and so forth.

The prediction image selection unit 48 determines a mode in which the corresponding cost function value is lower from between the optimum intra prediction mode and the optimum inter prediction mode as an optimum prediction mode on the basis of the cost function values supplied from the intra prediction unit 46 and the motion prediction-compensation unit 47. Further, the prediction image selection unit 48 supplies a prediction image of the optimum prediction mode to the arithmetic operation unit 33 and the addition unit 40. Further, the prediction image selection unit 48 issues a notification of selection of the prediction image of the optimum prediction mode to the intra prediction unit 46 or the motion prediction-compensation unit 47.

The rate controlling unit 49 controls the rate of quantization action of the quantization unit 35 such that overflow or underflow does not occur on the basis of the encoded data accumulated in the accumulation buffer 37. Further, the rate controlling unit 49 supplies the quantization parameter Qp to the mode table setting unit 50.

The mode table setting unit 50 includes a plurality of mode tables in which it is indicated which prediction mode can be used or which prediction mode cannot be used (namely, a state in which a type of a prediction mode that becomes a selection target is limited) in accordance with at least one of the picture type and picture depth, statistical information, application, quantization parameter Qp and so forth. In other words, the mode tables represent corresponding relationships between the information described above and the prediction modes that are a selection target in the form of a table.

The mode table setting unit 50 performs a mode table selection process, for example, for each CTB. In particular, the mode table setting unit 50 calculates statistical information from an original image read out from the screen sort buffer 32 and determines a mode table to be used from among the plurality of mode tables in response to the calculated statistical information, picture type and picture depth from the screen sort buffer 32, quantization parameter Qp from the rate controlling unit 49 and so forth, and then determines a prediction mode that can be used. The mode table setting unit 50 supplies information of the determined prediction mode that can be used to the intra prediction unit 46 and the motion prediction-compensation unit 47. For example, if the number of prediction modes that can be used is one, then this prediction mode is determined as the prediction mode of the CTB of a processing target. In other words, the prediction mode determined by the prediction image selection unit 48 is one of the prediction modes that are determined as being capable of being used by the mode table setting unit 50.

Figure 13:
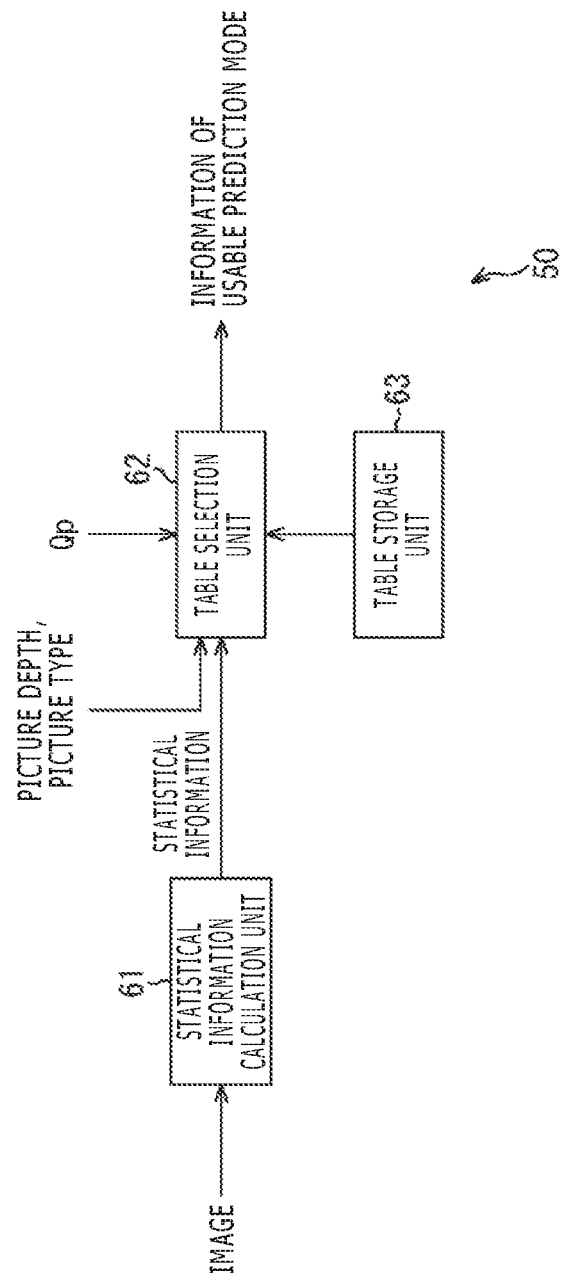
FIG. 13 is a block diagram depicting an example of a configuration of a mode table setting unit.

FIG. 13 is a block diagram depicting an example of a configuration of the mode table setting unit 50.

The mode table setting unit 50 of FIG. 13 is configured so as to include a statistical information calculation unit 61, a table selection unit 62, and a table storage unit 63.

The statistical information calculation unit 61 calculates statistical information from an original image read out from the screen sort buffer 32. As statistical information, for example, Variance64×64 and SAD64×64 are available. They are individually represented by the following expressions (10) and (11):

[Expression 8]

$$\text{Variance } 64 \times 64 = \frac{1}{64} \sum_{n=1}^{64} (x_n - \bar{x})^2 \quad (10)$$

$x_n$: luminance value of a frame at a certain point of time
$\bar{x}$: average luminance value of the frame within the certain period of time

[Expression 9]

$$\text{SAD } 64 \times 64 = \frac{1}{64} \sum_{n=1}^{64} (x_n - y_n)^2 \quad (11)$$

$y_n$: luminance value of the frame at a point of time different from that of $X_n$ Here, not only Variance64×64 and SAD64×64 but also statistical information by which Complexity or a motion can be estimated may be used as the statistical information. For example, as Complexity, Total Variation, or mean absolute deviation (MAD: average absolute deviation) may be used. Further, while 64×64 is used as an example also for a unit for determining statistical information, the statistical information may be calculated in a unit of 8×8, 16×16, or 32×32 or may be calculated using an average value in one of the units.

It is to be noted that, as an example in which statistical information is used, it is decided whether a region is a gradation area, a fast edge area or a normal area other than the areas in response to whether or not the picture type is an I slice or whether the statistical information is higher or lower than a predetermined threshold value, and a mode table corresponding to each area is selected. It is to be noted that the fast edge area is an area in which, for example, there is a quickly moving edge such as a profile of a passing person whose image is picked up, for example, by a monitoring camera or the like.

In particular, where the picture type is an I slice and Variance is equal to or lower than a threshold value Th_var_flat, it is decided that the area is a gradation area.

Further, in the case where the picture type is other than the I slice and the SAD is equal to or higher than a threshold value Th_sad_low and is equal to or lower than a threshold value Th_sad_high (Th_sad_low<Th_sad_high) (namely, a certain degree of motion is included) and besides where the Variance is equal to or lower than the threshold value Th_var_flat, it is decided that the area is a gradation area.

On the other hand, in the case where the picture type is any other than the I slice and the SAD is equal to or higher than the threshold value Th_sad_low and besides is equal to or lower than the threshold value Th_sad_high (Th_sad_low<Th_sad_high) (namely, where a certain degree of motion is involved) and besides where the Variance is higher than the threshold value Th_var_flat and is equal to or higher than a threshold value Th_var_edge_low and is a threshold value Th_var_edge_high (namely, where a certain degree of complexity is involved), it is decided that the area is a fast edge area. It is to be noted that Th_var_flat<Th_var_edge_low<Th_var_edge_high.

In any other case, it is decided that the area is a normal area. In particular, in the case where the picture type is the I slice and the Variance is higher than the threshold value Th_var_flat, it is decided that the area is a normal area. In the case where the picture type is any other than the I slice and the SAD is equal to or higher than the threshold value Th_sad_low and is equal to or lower than the threshold value Th_sad_high (Th_sad_low<Th_sad_high) and besides the Variance is higher than the threshold value Th_var_flat but is equal to or lower than the threshold value Th_var_edge_low or is equal to or higher than the threshold value Th_var_edge_high, it is decided that the area is a normal area.

Also in the case where the picture type is any other than the I slice and the SAD is lower than the threshold value Th_sad_low or is higher than the threshold value Th_sad_high (Th_sad_low<Th_sad_high), it is decided that the area is a normal area.

It is to be noted that the threshold value Th_var_flat, the threshold value Th_sad_low, the threshold value Th_sad_high, the threshold value Th_var_edge_low, and the threshold value Th_var_edge are threshold values that vary in value in accordance with the quantization parameter Qp. This is a generation amount increment countermeasure in the case where the parameter Qp is high. Since the region is adjusted thereby, the generation amount increment in the case where Qp is high can be suppressed.

In the case of the gradation area and the case of the fast edge area, for example, a table that takes subjective picture quality into consideration is selected as a corresponding table. In the case of the normal area other than the areas described above, a table that takes encoding efficiency maximization into consideration is selected as a corresponding table.

It is to be noted that, since, for example, a mode table generated taking subjective picture quality into consideration is influenced in picture quality if a size greater than 8×8 is selected, the size greater than 8×8 is not selected. In a table that takes encoding efficiency maximization into consideration, since the degree of importance of the distortion amount in calculation of a cost function value increases as the quantization parameter Qp decreases, the inter prediction mode or the intra prediction mode of 4×4 with which the distortion amount is small can be used generally. On the other hand, since the degree of importance of the bit generation amount in calculation of the cost function value increases as the quantization parameter Qp increases, an inter prediction mode or an intra prediction mode of a great size with which the encoding efficiency is high such as a great size such as a size of 64×64 can be used.

Further, generally at a flat portion, there is a tendency that the encoding efficiency increases if the inter prediction mode or the intra prediction mode of 64×64 is selected. In contrast, even in the same flat portion, there is a tendency that, in a smooth gradation area, if an inter prediction mode or an intra prediction mode having a small size such as 4×4 is selected for a fast edge area that includes an edge such as a profile of a person or an object, then the encoding efficiency increases subjectively similarly. Selection of a table is performed on the basis of such tendencies as just described.

The statistical information calculation unit 61 supplies the calculated statistical information (Variance64×64 or SAD64×64) to the table selection unit 62. Further, the picture type and the picture depth of an image from the screen sort buffer 32 and the quantization parameter Qp from the rate controlling unit 49 are supplied to the table selection unit 62.

The table selection unit 62 determines a mode table to be used from among a plurality of mode tables, which are stored in the table storage unit 63 and are in a state in which the type of prediction modes that become a selection target is limited in response to the picture type, the picture depth, the statistical information, the application, the Qp and so forth.

Further, the table selection unit 62 acquires a prediction mode capable of being used from within the determined table (namely, in a state in which the type of prediction modes that are a selection target is limited). It is to be noted that a state in which use is limited signifies a state in which use cannot be performed, and, in other words, the number of modes capable of being used is narrowed down from among all of the prediction modes. The table selection unit 62 supplies the acquired information of the prediction mode capable of being used to the intra prediction unit 46 and the motion prediction-compensation unit 47.

The table storage unit 63 is configured from a memory or the like, and stores a plurality of mode tables in which it is indicated which prediction mode can be used and which prediction mode cannot be used (namely, a state in which the type of prediction modes that become a selection target is limited) in response to the picture type, the picture depth, the statistical information, the application, the quantization parameter Qp and so forth.

Now, the picture depth is described with reference to FIGS. 14 and 15. Inter prediction is used for encoding of a moving image. In the inter prediction, a block of an encoding target at the current point of time is predicted using a picture encoded already. Therefore, an order and a reference relationship of pictures to be encoded are significant. The picture depth is information indicative of a reference relationship between pictures (GOP structure) of an image, and particularly, the picture depth is used for grouping pictures, which are placed in the same situations in the reference relationship, for example, to 1 to 5.

Figure 14:
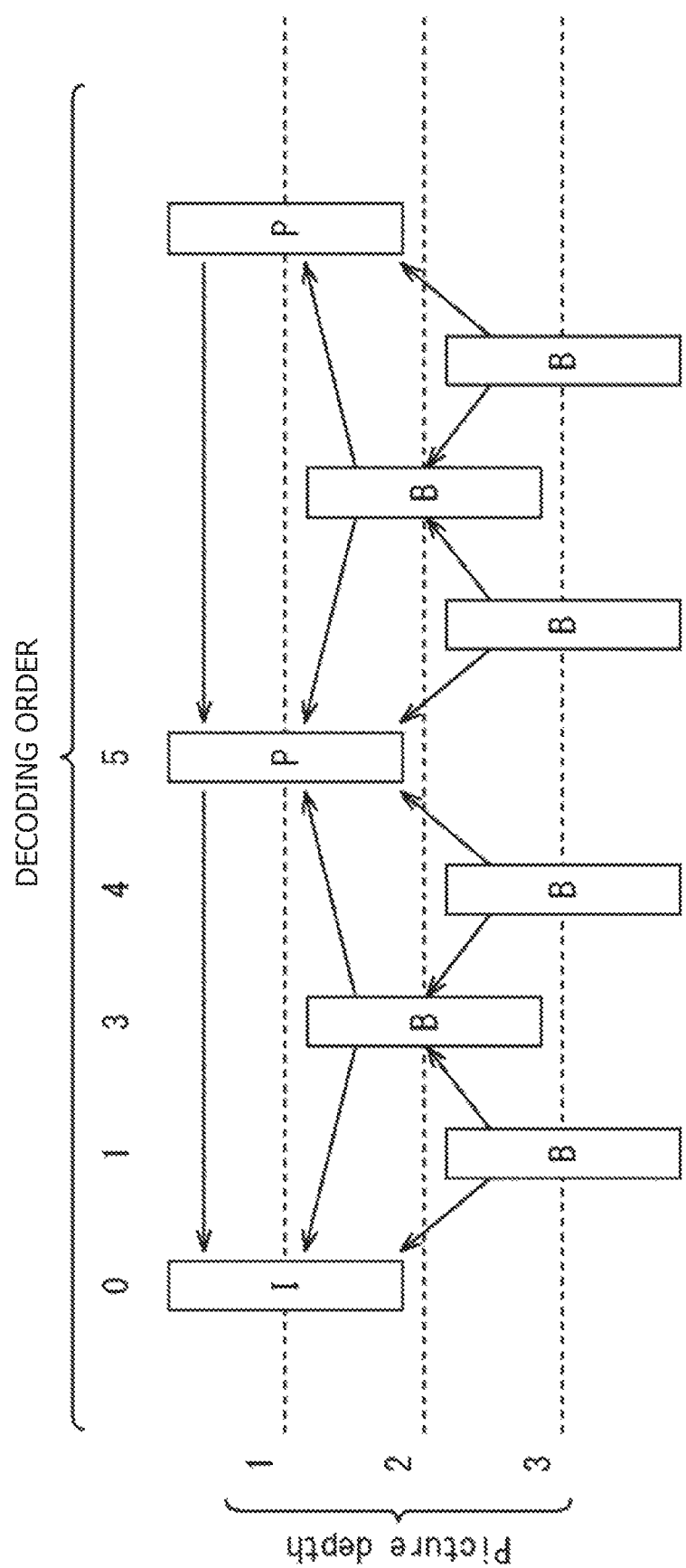
FIG. 14 is a view illustrating a picture depth.

In the examples of FIGS. 14 and 15, a horizontal direction represents time of a decoding order and a rectangle represents a picture, and reference characters I, B, and P in rectangles represent that the picture types are an I picture, a B picture, and a predictive picture (P picture), respectively. Further, an arrow mark from each picture represents a picture referred to in order to perform inter prediction.

An I picture and a P picture are included in a picture depth 1. The I picture of the picture depth 1 refers to nothing. The P picture at the left side in the picture depth 1 refers to the I picture in the picture depth 1. The P picture at the right side in the picture depth 1 refers to the left P picture.

B pictures that refer to pictures in the picture depth 1 are included in a picture depth 2. A B picture at the left side in the picture depth 2 refers to the I picture and the left P picture in the picture depth 1. A B picture at the right side in the picture depth 2 refers to the left P picture and the right P picture in the picture depth 1.

B pictures that refer to a picture in the picture depth 1 in one direction and refer to a B picture in the picture depth 2 in the other one direction are included in a picture depth 3. The leftmost B picture in the picture depth 3 refers to the I picture in the picture depth 1 and the B picture at the left side in the picture depth 2. The second B picture from the left in the picture depth 3 refers to the B picture at the left side in the picture depth 2 and the left P picture in the picture depth 1.

The third B picture from the left in the picture depth 3 refers to the left P picture in the picture depth 1 and the B picture at the right side in the picture depth 2. The fourth B picture from the left in the picture depth 3 refers to the B picture at the right side in the picture depth 2 and the right P picture in the picture depth 1.

In particular, in the example of FIG. 14, it is depicted that the B pictures in the picture depth 2 refer to the pictures in the picture depth 1. Since the pictures that have a same picture depth have reference relationships similar to each other, also conditions for implementing increase of the speed are similar to each other and therefore make one condition in the mode table.

In the example of FIG. 15, in the picture depth 1, pictures each of which is referred to by two pictures including a picture in the same depth and a picture in a lower depth are included. The I picture in the picture depth 1 refers to nothing. A left P picture in the picture depth 1 refers to the I picture in the picture depth 1. A right P picture in the picture depth 1 refers to the left P picture.

The P pictures each referred to only by a picture in the lower depth is included in the picture depth 2. The P picture at the left side in the picture depth 2 refers to the I picture in the picture depth 1. The P picture at the right side in the picture depth 2 refers to the left P picture in the picture depth 1.

P pictures each of which is not referred to by any other picture are included in the picture depth 3. The P picture at the left side in the picture depth 3 refers to the left P picture in the picture depth 2. The P picture at the right side in the picture depth 3 refers to the right P picture in the picture depth 2.

It is recognized that, also in the example of FIG. 15, the reference relationships of the pictures in a same picture depth are similar to each other.

It is to be noted here that the relationship between the picture depths in FIGS. 14 and 15 and λ of the expression (1) is described. The quality of the P pictures is influenced by the peak signal-to-noise ratio (PSNR) of the I picture. In particular, the fact that the PSNR of the I picture is good is connected to the fact that the prediction performance of P pictures is increased.

There is a tendency that the average performance of the entire pictures becomes better if allocation of a bit stream is changed to improve the quality of the I picture while the quality of the P pictures is gradually deteriorated rather than that where the I, P, and P pictures have the same quality.

In particular, to improve the quality of the I picture signifies to improve the PSNR in the expression (1), namely, to decrease λ in the expression (1). This signifies that, in the expression (1), R may be disregarded rather than D. In other words, this signifies that the bitrate of the I picture may be increased with respect to that of the P pictures, and, in a result of calculation of the cost function in such a condition as just described, there is a tendency that a prediction mode of a small block tends to be selected.

Accordingly, a mode table is selected by which, where the picture depth is a small number such as 1 or 2, generally a prediction mode of a small block size is used while use of a prediction mode of a great block size is limited.

(Example of Mode Table)

FIG. 16 is a view illustrating an example of a mode table. In the example of FIG. 16, as a candidate for intra prediction, prediction modes of 64×64, 32×32, 16×16, 8×8, and 4×4 are available and, as a candidate for inter prediction, prediction modes of 64×64, 64×32, 32×64, 32×32, 32×24, 32×16, 32×8, 24×32, 16×32, 8×32, 16×16, 16×12, 16×8, 16×4, 12×16, 8×16, 4×16, 8×8, 8×4, 4×8, and 4×4 are available. Further, in the example of FIG. 16, a round mark indicates a mode that can be used and a cross mark indicates a mode that cannot be used.

In the example of FIG. 16, totaling nine types of mode tables are indicated in order from above including three types of mode tables for a live broadcast Internet distribution application (also called live broadcasting Internet distribution), three types of mode tables for an Internet distribution recording application (also called Internet distribution recording), and three types of mode tables for a monitoring camera application (also called monitoring camera).

Since, in the live broadcast Internet distribution, an image is picked up and encoded by equipment that can be easily carried and then is distributed content through the Internet, it is necessary to raise the processing speed while the picture quality is sacrificed (namely, to decrease the processing amount). The prediction modes for calculating the cost function in the expression (1) is reduced as far as possible.

In particular, in the case of the live broadcast Internet distribution, the picture quality is low, and it is necessary to increase the processing speed. Accordingly, all of the three types of mode tables for live broadcast Internet distribution indicate examples in each of which only one type of prediction mode can be used.

First, where the picture depth is 1 and the picture type is the I picture while total variation (TV) is 200 and Variance (dispersion) is 200 and besides QP is 30, the mode table in which only the intra 8×8 prediction mode can be used is selected. It is to be noted that, in this case, since the picture type is the I picture and can be used only in the intra mode, a mode table that indicates one mode in the intra mode is selected.

Meanwhile, where the picture depth, picture type, total variation (TV), Variance (dispersion), and QP are 2, P picture, 200, 200, and 30, respectively, the mode table in which only the inter 16×16 prediction mode can be used is selected. It is to be noted that, in this case, while the P picture can be used in both the intra mode and the inter mode, since the live broadcast Internet distribution is intended, only the inter 16×16 prediction mode is selected giving priority to the speed.

Further, where the picture depth, picture type, total variation (TV), Variance (dispersion), and QP are 2, P picture, 200, 200, and 45, respectively, the mode table in which only the inter 32×32 prediction mode can be used is selected. It is to be noted that, in this case, since the bitrate is decreased (QP is increased), in order to decrease the overhead, only a great size can be used.

Further, in the case of Internet distribution recording, since data recorded once is distributed through the Internet and is recorded and accumulated once into and in a storage unit such as a hard disk drive (HDD), the processing speed may be low. On the other hand, since data is distributed through the Internet, high picture quality (high compression) is demanded.

In particular, in the case of Internet distribution recording, the picture quality is high while the processing speed may be low. Accordingly, all of the three types of mode tables for Internet distribution recording indicate examples in which a plurality of prediction modes can be used and cost functions are calculated, compared with each other, and used.

First, where the picture depth, picture type, total variation (TV), Variance (dispersion), and QP are 1, I picture, 200, 200, and 25, respectively, the mode table in which the intra prediction modes of 64×64, 32×32, 16×16, 8×8, and 4×4 can be used is selected. It is to be noted that, in this case, since the picture type is the I picture, it can be used only in the intra mode, and a mode table configured from an intra mode is selected.

Further, where the picture depth, picture type, total variation (TV), Variance (dispersion), and QP are 2, P picture, 200, 200, and 25, respectively, the mode table is selected in which the intra prediction modes of 32×32, 16×16, 8×8, and 4×4 and all inter prediction modes can be used. It is to be noted that, in this case, since the P picture can be used in both the intra mode and the inter mode, both the intra prediction mode and the inter prediction mode can be used.

Further, where the picture depth, picture type, total variation (TV), Variance (dispersion), and QP are 3, B picture, 200, 200, and 25, respectively, the mode table is selected in which the intra prediction modes of 64×64, 32×32, and 16×16 and the inter prediction modes of 32×64, 32×32, 32×24, 32×16, 32×8, 24×32, 16×32, 8×32, 16×16, 16×12, 16×8, 16×4, 12×16, 8×16, 4×16, 8×8, 8×4, 4×8, and 4×4 can be used. It is to be noted that, since bidirectional prediction can be used for the B picture, the performance of the inter prediction is high. Accordingly, in this case, since the performance of the intra prediction is relatively low, the number of intra prediction modes capable of being used is decreased.

Finally, in the case of the monitoring camera, an image of the monitoring camera is distributed with a delay that is reduced as far as possible and, in order to decrease the delay of an image during monitoring, only the P picture is used. In particular, in the case of the monitoring camera, a medium degree of the picture quality and a high processing speed are demanded.

First, where the picture depth, picture type, total variation (TV), Variance (dispersion), and QP are 1, I picture, 200, 200, and 25, respectively, the mode table is selected in which the intra prediction modes of 32×32, 16×16, and 8×8 can be used. It is to be noted that, in this case, since the picture type is the I picture, only the intra mode can be used, a mode table configured from the intra mode is selected.

Meanwhile, where the picture depth, picture type, total variation (TV), Variance (dispersion), and QP are 2, P picture, 200, 200, and 25, respectively, the mode table is selected in which the intra prediction modes of 32×32, 16×16, and 8×8, and the inter prediction modes other than those of 64×64 and 4×4 can be used. It is to be noted that, in this case, since the P picture can be used in both the intra mode and the inter mode, both the intra prediction mode and the inter prediction mode can be used.

Further, where the picture depth, picture type, total variation (TV), Variance (dispersion), and QP are 3, P picture, 200, 200, and 25, respectively, the mode table is selected in which the intra prediction mode of 16×16 and the inter prediction modes of 32×64, 32×32, 32×24, 32×16, 32×8, 24×32, 16×32, 8×32, 16×16, 16×12, 16×8, 16×4, 12×16, 8×16, 4×16, 8×8, and 8×4 can be used. Where the picture depth changes from 2 to 3, the number of times by which a picture is referred to decreases, and therefore, priority is given to the speed to limit the intra prediction modes such that some of them are not used.

It is to be noted that, in the mode tables described above, the number of prediction modes to be limited can be changed in response to an encoding application. Also the type of prediction modes to be limited is changed in response to an encoding application. Here, the application is an object of use or a form of a used service. Further, the application includes also a parameter that links with an encoding tool such as a bit rate, a resolution, or a picture frame of a bit stream.

(Description of Process of Encoding Device)

Figure 17:
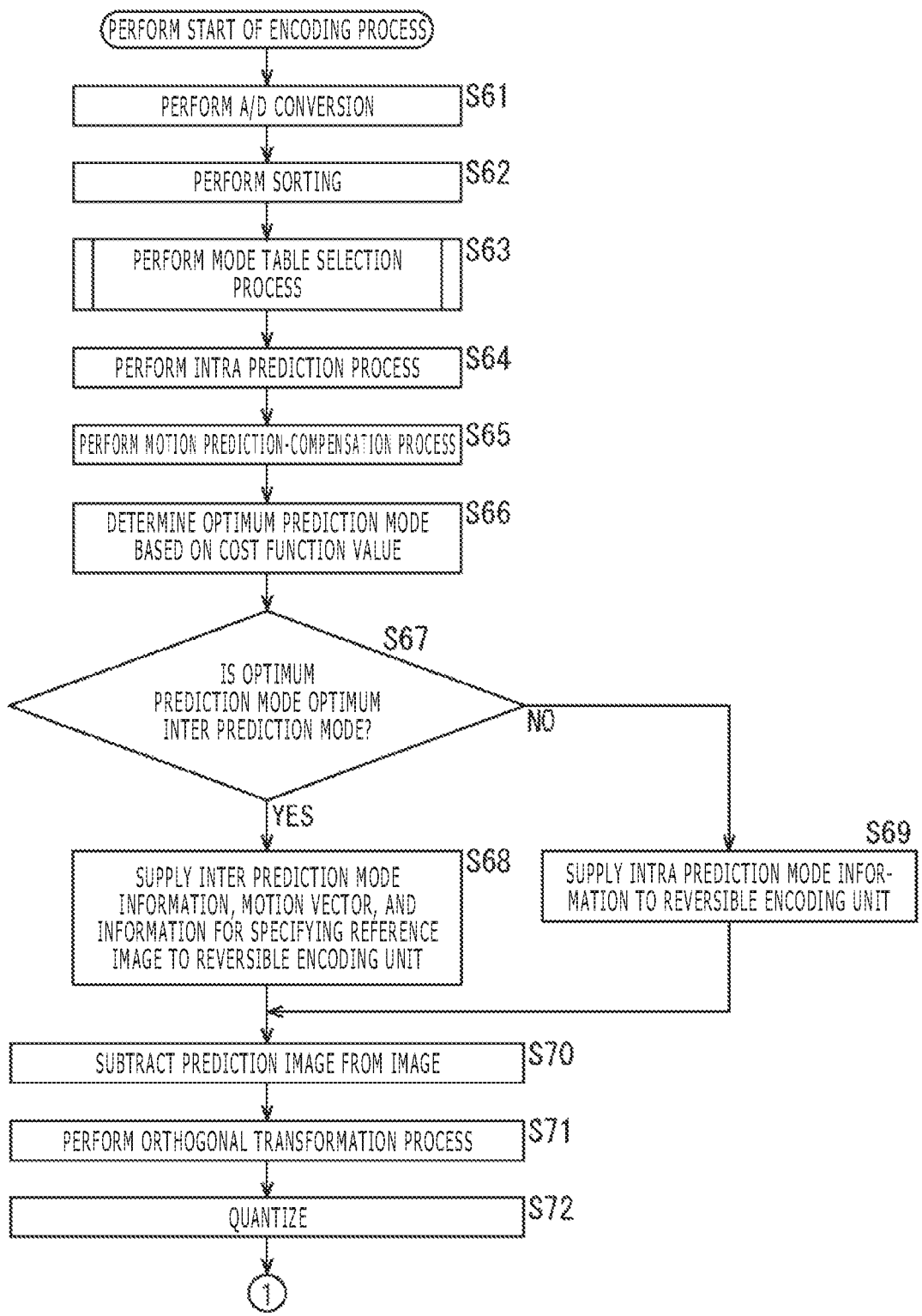
FIG. 17 is a flow chart illustrating an encoding process.
Figure 18:
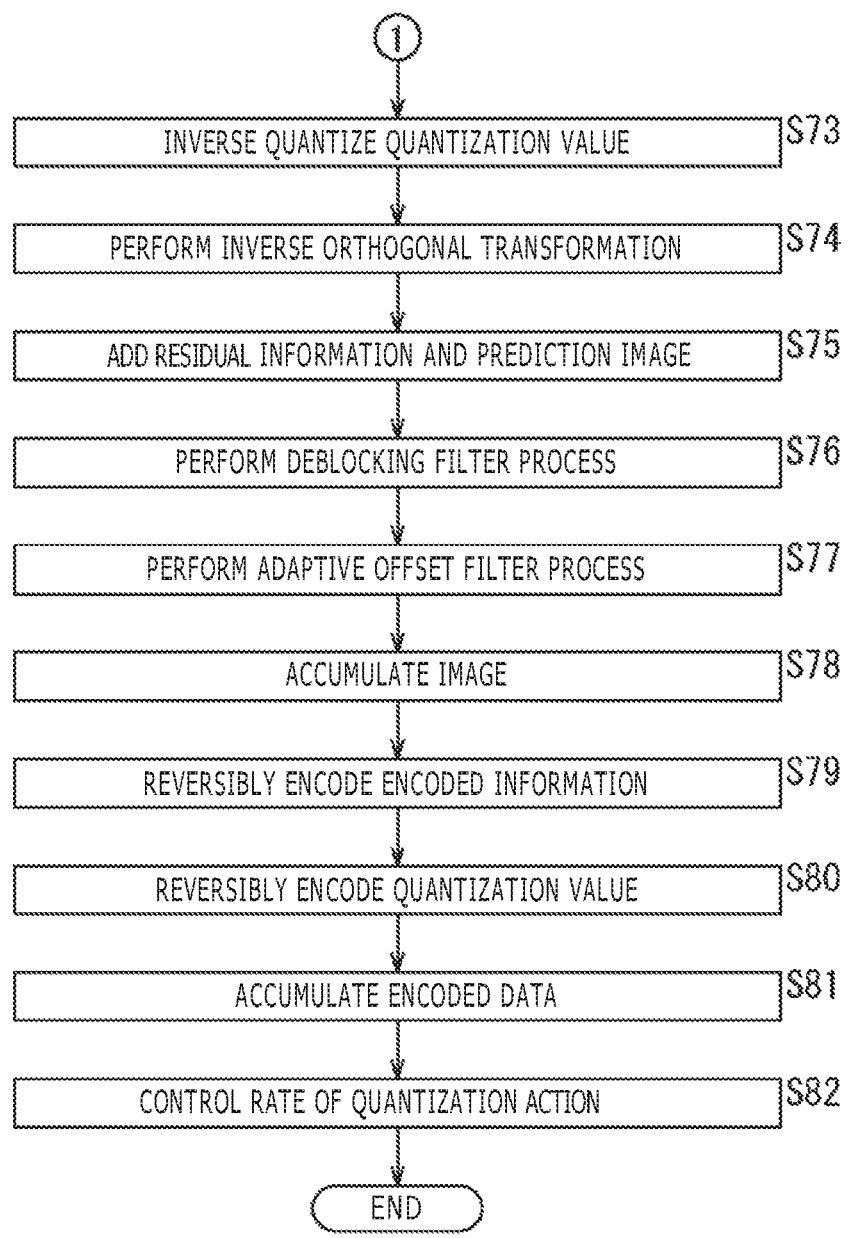
FIG. 18 is a flow chart illustrating the encoding process.

FIGS. 17 and 18 are flow charts illustrating an encoding process of the encoding device 12 of FIG. 12.

At step S61 of FIG. 17, the A/D conversion unit 31 (FIG. 12) of the encoding device 12 performs A/D conversion of images in a unit of a frame inputted as an encoding target. The A/D conversion unit 31 outputs images in the form of a digital signal after conversion to the screen sort buffer 32 so as to be stored.

At step S62, the screen sort buffer 32 sorts the images of the frames in a displaying order stored therein into an order for encoding in response to the GOP structure. The screen sort buffer 32 supplies the images in a unit of a frame after the sorting to the arithmetic operation unit 33, the intra prediction unit 46, the motion prediction-compensation unit 47, and the mode table setting unit 50. Further, the screen sort buffer 32 outputs a picture type of each image to the mode table setting unit 50.

At step S63, the mode table setting unit 50 performs a mode table selection process. Details of the mode table selection process are hereinafter described with reference to FIG. 19. In particular, the mode table setting unit 50 calculates statistical information from an original image read out from the screen sort buffer 32 and determines a mode table to be used from among a plurality of mode tables in response to the calculated statistical information, the picture type and the picture depth from the screen sort buffer 32, the quantization parameter Qp from the rate controlling unit 49 and so forth, and then determines a prediction mode capable of being used. The mode table setting unit 50 supplies information of the determined prediction mode capable of being used to the intra prediction unit 46 and the motion prediction-compensation unit 47.

At step S64, the intra prediction unit 46 performs an intra prediction process of the intra prediction mode which is indicated by the information supplied from the mode table setting unit 50 and can be used in a unit of a PU. In particular, the intra prediction unit 46 calculates a cost function value in the intra prediction mode that is indicated by the information supplied from the mode table setting unit 50 and can be used on the basis of the image read out from the screen sort buffer 32 and a prediction image generated as a result of the intra prediction process. Further, the intra prediction unit 46 determines an intra prediction mode by which the cost function value is minimized as an optimum intra prediction mode. The intra prediction unit 46 supplies the prediction image generated in the optimum intra prediction mode and the corresponding cost function value to the prediction image selection unit 48.

Further, the motion prediction-compensation unit 47 performs, at step S65, a motion prediction-compensation process of the inter prediction mode that is indicated by the information supplied from the mode table setting unit 50 and can be used in a unit of a PU. Further, the motion prediction-compensation unit 47 calculates a cost function value in the inter prediction mode that is indicated by the information supplied from the mode table setting unit 50 and can be used on the basis of the image and the prediction image supplied from the screen sort buffer 32, and determines an inter prediction mode by which the cost function value is minimized as an optimum inter prediction mode. Further, the motion prediction-compensation unit 47 supplies the cost function value of the optimum inter prediction mode and a corresponding prediction image to the prediction image selection unit 48.

At step S66, the prediction image selection unit 48 determines the mode in which the cost function value is minimized from between the optimum intra prediction mode and the optimum inter prediction mode as an optimum prediction mode on the basis of the cost function values supplied from the intra prediction unit 46 and the motion prediction-compensation unit 47. Then, the prediction image selection unit 48 supplies the prediction image of the optimum prediction mode to the arithmetic operation unit 33 and the addition unit 40.

At step S67, the prediction image selection unit 48 decides whether the optimum prediction mode is the optimum inter prediction mode. If it is decided at step S67 that the optimum prediction mode is the optimum inter prediction mode, then the prediction image selection unit 48 issues a notification of selection of the prediction image generated in the optimum inter prediction mode to the motion prediction-compensation unit 47.

Then, at step S68, the motion prediction-compensation unit 47 supplies inter prediction mode information, motion vector, and information that specifies a reference image to the reversible encoding unit 36 and advances the process to step S70.

On the other hand, if it is decided at step S67 that the optimum prediction mode is not the optimum inter prediction mode, namely, if the optimum prediction mode is the optimum intra prediction mode, then the prediction image selection unit 48 issues a notification of selection of the prediction image generated in the optimum intra prediction mode to the intra prediction unit 46. Further, at step S69, the intra prediction unit 46 supplies intra prediction mode information to the reversible encoding unit 36 and advances the process to step S70.

At step S70, the arithmetic operation unit 33 subtracts the prediction image supplied from the prediction image selection unit 48 from the image supplied from the screen sort buffer 32 to perform encoding. The arithmetic operation unit 33 outputs an image obtained as a result of the encoding as residual information to the orthogonal transformation unit 34.

At step S71, the orthogonal transformation unit 34 performs an orthogonal transformation process for the residual information in a unit of a TU. The orthogonal transformation unit 34 supplies a result of the orthogonal transformation process after the orthogonal transformation process to the quantization unit 35.

At step S72, the quantization unit 35 quantizes the orthogonal transformation process result supplied from the orthogonal transformation unit 34. The quantization unit 35 supplies a quantization value obtained as a result of the quantization to the reversible encoding unit 36 and the dequantization unit 38.

At step S73, the dequantization unit 38 performs dequantization for the quantization value from the quantization unit 35. The dequantization unit 38 supplies a result of the orthogonal transformation process obtained as a result of the dequantization to the inverse orthogonal transformation unit 39.

At step S74, the inverse orthogonal transformation unit 39 performs an inverse orthogonal transformation process for the orthogonal transformation process result supplied from the dequantization unit 38 in a unit of a TU. The inverse orthogonal transformation unit 39 supplies residual information obtained as a result of the inverse orthogonal transformation process to the addition unit 40.

At step S75, the addition unit 40 adds the residual information supplied from the inverse orthogonal transformation unit 39 and the prediction image supplied from the prediction image selection unit 48 to each other to perform decoding. The addition unit 40 supplies the decoded image to the filter 41 and the frame memory 44.

At step S76, the filter 41 performs a deblocking filter process for the decoded image supplied from the addition unit 40.

At step S77, the filter 41 performs an adaptive offset filter process for the image after the deblocking filter. The filter 41 supplies an image obtained as a result of the adaptive offset filter process to the frame memory 44. Further, the filter 41 supplies the offset filter information to the reversible encoding unit 36 for each LCU.

At step S78, the frame memory 44 accumulates the image supplied from the filter 41 and the image supplied from the addition unit 40. An image neighboring with the PU from among images that are accumulated in the addition unit 40 and for which the filter process is not performed is supplied as a peripheral image to the intra prediction unit 46 through the switch 45. On the other hand, an image that is accumulated in the frame memory 44 and for which the filter process is performed is outputted as a reference image to the motion prediction-compensation unit 47 through the switch 45.

At step S79, the reversible encoding unit 36 performs reversible encoding for the intra prediction mode information or the inter prediction mode information, the motion vector, the information for specifying the reference image, the offset filter information and so forth as encoded information.

At step S80, the reversible encoding unit 36 performs reversible encoding for the quantization value supplied from the quantization unit 35. Further, the reversible encoding unit 36 generates encoded data from the encoded information for which the reversible encoding is performed and the quantization value for which the reversible encoding is performed by the process at step S78 and supplies the generated encoded data to the accumulation buffer 37.

At step S81, the accumulation buffer 37 temporarily accumulates the encoded data supplied from the reversible encoding unit 36.

At step S82, the rate controlling unit 49 controls the rate of quantization action of the quantization unit 35 such that overflow or underflow does not occur on the basis of the encoded data accumulated in the accumulation buffer 37. At this time, the rate controlling unit 49 supplies the quantization parameter Qp to the mode table setting unit 50. Then, the encoding process is ended.

Now, details of the mode table selection process at step S63 of FIG. 17 are described with reference to a flow chart of FIG. 19. It is to be noted that the process is performed, for example, in a unit of a CTB.

An original image read out from the screen sort buffer 32 is supplied to the statistical information calculation unit 61 of the mode table setting unit 50. Information indicative of the picture type and the picture depth from the screen sort buffer 32 and the quantization parameter Qp from the rate controlling unit 49 are supplied to the table selection unit 62 of the mode table setting unit 50. Also information of the application is supplied from an inputting unit or the like by a utilizer or the like not depicted.

At step S91, the statistical information calculation unit 61 calculates statistical information, for example, Variance64× 64 or Total Variation, from the original image read out from the screen sort buffer 32. The statistical information calculation unit 61 supplies the calculated statistical information (Variance64×64 or Total Variation) to the table selection unit 62.

At step S92, the table selection unit 62 selects a mode table, for example, depicted in FIG. 16 in response to the application, the picture type, the picture depth, the statistical information, and the Qp. Further, at step S93, the table selection unit 62 selects (acquires) only a prediction mode capable of being used from within the selected mode table and supplies information indicative of the selected mode to an intra prediction unit 94 and a motion prediction-compensation unit 95. Thereafter, the mode table selection process is ended and the process returns to step S63 of FIG. 17.

Figure 19:
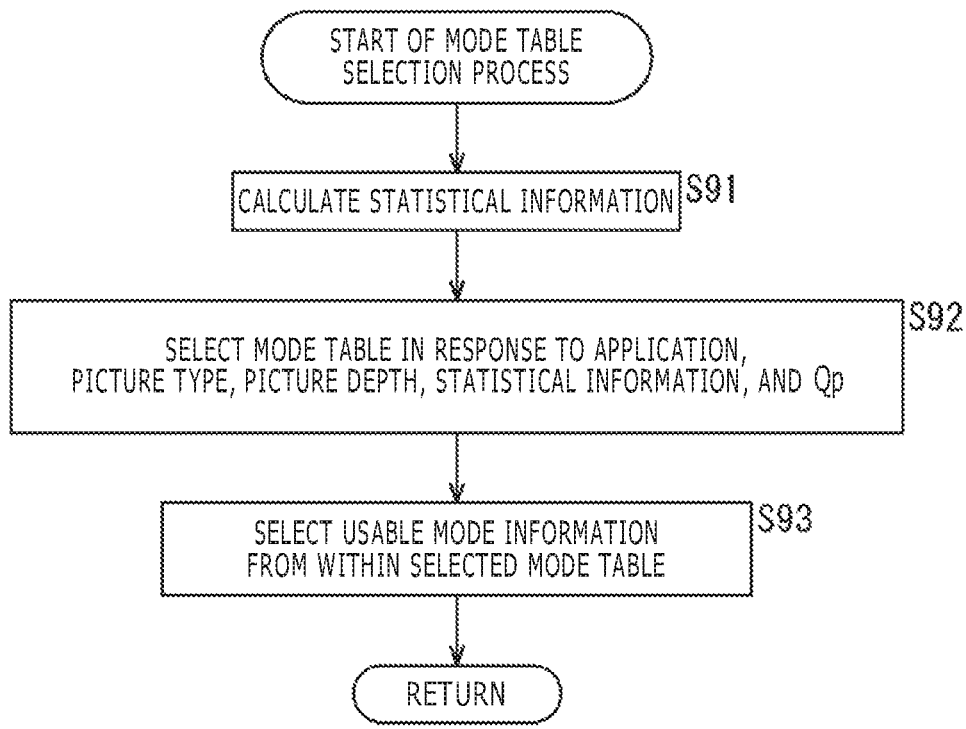
FIG. 19 is a flow chart illustrating details of a mode table selection process.

It is to be noted that, after step S93 of FIG. 19, the substance of the mode table may be updated with the application, the picture type, the picture depth, the statistical information, and the Qp as well as the mode table selected in response to them.

As described above, since the processing amount in encoding can be decreased by the present technology, the period of time required for encoding can be reduced.

Since the prediction mode is reduced not simply but the cost function for prediction modes that are selected but in low probability are not performed depending upon the picture depth, picture type, TV, Variance, Qp and so forth, the image quality is maintained and deterioration of the encoding efficiency can be reduced.

Further, since a prediction mode to be omitted (limited) is defined finally at a stage at which a mode table is generated, the degree of increase of the speed that can be expected is determined. Therefore, such a situation does not occur that increase of the speed can be achieved in some cases but cannot be achieved in other cases depending upon such a condition as a speed increasing technique called Early termination. This is an effective effect where a real-time process is demanded.

It is to be noted that, where a table is prepared in advance, a portion that relies upon the substance of a moving image is basically not configured as a suitable table. In this case, by updating the table in the course of encoding, increase of the speed suitable for the moving image can be implemented. However, increase of the speed cannot be performed during processing that is performed for updating the table.

In the embodiment described above, a method that complies with HEVC is used as the encoding method. However, the present technology is not limited to this, and some other encoding method/decoding method can be applied.

It is to be noted that, while an example in which mode tables are generated in advance and a mode table is selected from among the generated mode tables is described in the foregoing description, another method may be applied by which, without using the mode tables, a prediction mode in the present situation is learned from statistical information of an original image and prediction modes selected in the past to predict a prediction mode. At this time, for example, the present technology can take a configuration of cloud computing in which one function is shared and processed cooperatively by a plurality of apparatus through a network.

Second Embodiment (Example of Configuration for Cloud Computing to which Present Technology is Applied)

Figure 20:
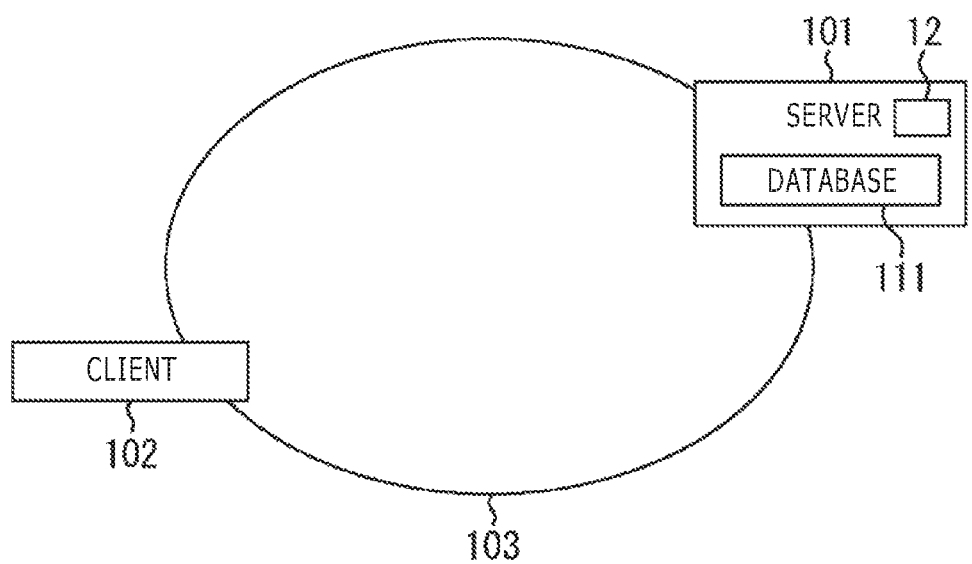
FIG. 20 is a view depicting an example of a configuration of an embodiment of a cloud computing system.

FIG. 20 is a view depicting an example of a configuration of an embodiment of a cloud computing system to which the present technology is applied.

As depicted in FIG. 20, a cloud computing system 100 is configured such that a server 101 is connected to a client 102 through a network 103 such as the Internet.

The server 101 includes the encoding device 12 of FIG. 12 and a database 111 for statistical information described above and prediction modes selected in the past. The encoding device 12 includes, in place of the mode table setting unit 50 of FIG. 13, a mode table setting unit 50 of FIG. 21 having a function for learning prediction modes selected in the past.

The encoding device 12 (mode table setting unit 50) receives an image, a picture type, a picture depth, Qp, and statistical information of the image from the client 102 or the like. Where an image is received, the encoding device 12 calculates the statistical information using an image uploaded from the client 102 or the like to the server 101.

The encoding device 12 selects a prediction mode in the present situation from the prediction modes selected in the past using the image, the picture type, the picture depth, the Qp, and the statistical information of the image calculated or received from the client 102 by learning through a neural network, a Cable News Network (CNN) or the like, and registers the information of the learned prediction mode into the database 111.

Alternatively, if statistical information from the client 102 is received, then the encoding device 12 selects the prediction mode using the database 111 and registers and learns the information of the selected prediction mode into the database 111.

After the learning, the encoding device 12 may provide the information of the selected prediction mode to the client 102 or may encode an image using the selected prediction mode and accumulate the image so as to be provided to the client 102.

The database 111 has stored therein the picture type, the picture depth, the Qp, the statistical information and so for as well as prediction modes selected in the past. For example, the database 111 stores the information just described and the prediction modes selected in the past in an associated relationship with each other.

The client 102 is configured, for example, from a portable terminal or the like. The client 102 transmits the statistical information calculated on the basis of picked up image information and statistical information calculated on the basis of the image information to the server 101 through the network 103. If information of the prediction mode is received from the server 101, then the client 102 encodes the image information.

It is to be noted that, while only one server 101 is depicted in the example of FIG. 20, the cloud computing system includes a plurality of servers 101. Similarly, while only one client 102 is depicted in FIG. 20, the cloud computing system includes a plurality of clients 102.

Figure 21:
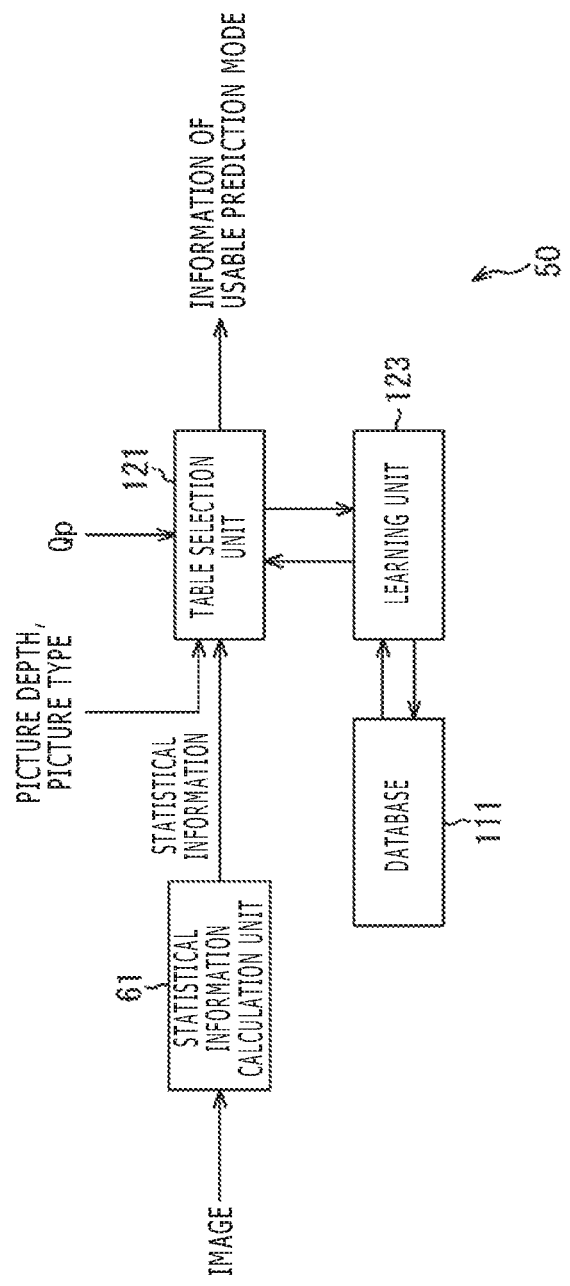
FIG. 21 is a block diagram depicting another configuration of the mode table setting unit.

FIG. 21 is a block diagram depicting an example of a configuration of the mode table setting unit 50 of FIG. 20.

The mode table setting unit 50 is common to the mode table setting unit 50 of FIG. 13 in that it includes the statistical information calculation unit 61 of FIG. 13. The mode table setting unit 50 is different in that it includes a table selection unit 121 in place of the table selection unit 62 and includes a learning unit 123 and a database 111 in place of the table storage unit 63.

The statistical information calculation unit 61 supplies calculated statistical information to the table selection unit 121. The table selection unit 121 supplies a prediction mode selected by learning by the learning unit 123 as information of the prediction mode capable of being used to the intra prediction unit 46, the motion prediction-compensation unit 47, or the client 102. Further, the table selection unit 121 supplies the statistical information, the picture type, and the picture depth as well as the Qp from the statistical information calculation unit 61 to the learning unit 123.

The learning unit 123 learns a prediction mode in the present situation from prediction modes selected in the past using the statistical information, the picture type, and the Qp from table selection unit 121 and the database 111 by a neural network, a CNN or the like, and registers the information of the learned prediction mode into the database 111.

While the cloud computing system is not limited to the cloud computing system 100 as described above, it is possible to configure it such that, in an environment in which a great amount of machine power can be expected, the prediction mode is learned and predicted every time without having the mode table.

It is to be noted that the present technology can be applied to an image encoding device that is used when image information (bit stream) compressed by orthogonal transformation such as discrete cosine transform and motion compensation as in the case of the HEVC method or the like is received through a network medium such as a satellite broadcast, a cable television, the Internet, or a portable telephone set. Further, the present disclosure can be applied to an image encoding device that is used when a process is performed in a storage medium such as an optical disk, a magneto-optical disk, or a flash memory.

Third Embodiment (Description of Computer to which Present Disclosure is Applied)

While the series of processes described above can be executed by hardware, it may otherwise be executed by software. Where the series of processes is executed by software, a program that constructs the software is installed into a computer. Here, the computer includes a computer incorporated in hardware for exclusive use, a personal computer for universal use that can execute various functions and so forth by installing the various programs.

Figure 22:
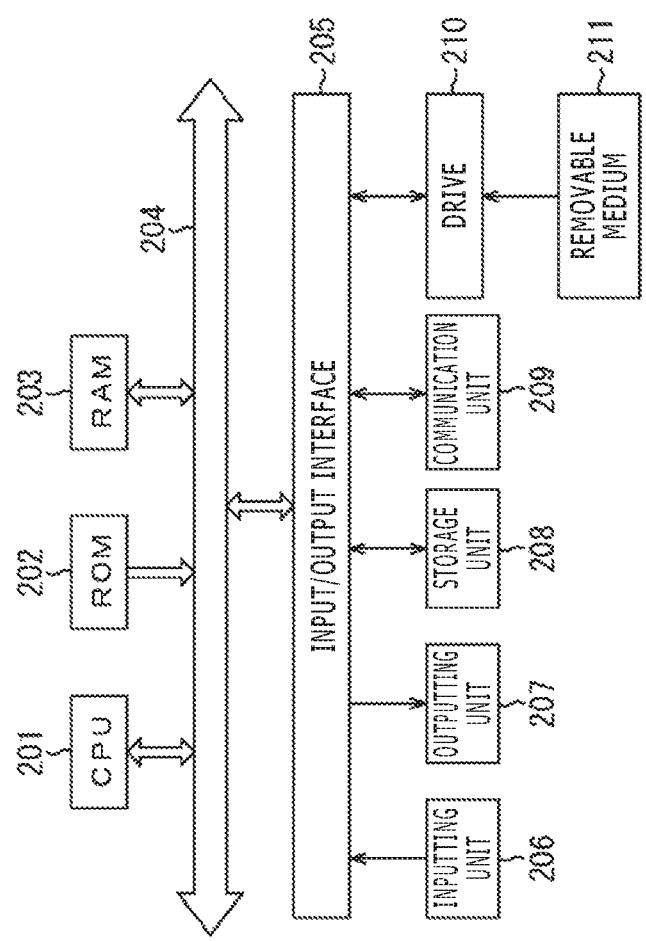
FIG. 22 is a block diagram depicting an example of a configuration of hardware of a computer.

FIG. 22 is a block diagram depicting an example of a configuration of hardware of a computer that executes the series of processes described above in accordance with a program.

In the computer, a central processing unit (CPU) 201, a read only memory (ROM) 202, and a random access memory (RAM) 203 are connected to each other by a bus 204.

To the bus 204, an input/output interface 205 is connected further. To the input/output interface 205, an inputting unit 206, an outputting unit 207, a storage unit 208, a communication unit 209, and a drive 210 are connected.

The inputting unit 206 is configured from a keyboard, a mouse, a microphone and so forth. The outputting unit 207 is configured from a display unit, a speaker and so forth. The storage unit 208 is configured from a hard disk, a nonvolatile memory or the like. The communication unit 209 is configured from a network interface and so forth. The drive 210 drives a removable medium 211 such as a magnetic disk, an optical disk, a magneto-optical disk, a semiconductor memory or the like.

In the computer configured in such a manner as described above, the CPU 201 performs the series of processes described hereinabove by loading the program stored, for example, in the storage unit 208 into the RAM 203 through the input/output interface 205 and the bus 204 and executing the program.

The program executed by the computer (CPU 201) can be recorded into and provided as a removable medium 211, for example, in the form of a package medium or the like. Further, it is possible to provide the program through a wire or wireless transmission medium such as a local area network, the Internet, or a digital satellite broadcast.

In the computer, by loading a removable medium 211 into the drive 210, the program can be installed into the storage unit 208 through the input/output interface 205. Further, the program can be received by the communication unit 209 through a wire or wireless transmission medium and installed into the storage unit 208. Alternatively, the program can be installed in advance into the ROM 202 or the storage unit 208.

It is to be noted that the program to be executed by the computer may be a program in accordance with which processes are executed in a time series in accordance with an order described in the present specification or may be program in accordance with which processes are executed in parallel or executed at a necessary timing such as a point of time at which the program is called or the like.

Fourth Embodiment (Example of Configuration of Television Apparatus)

Figure 23:
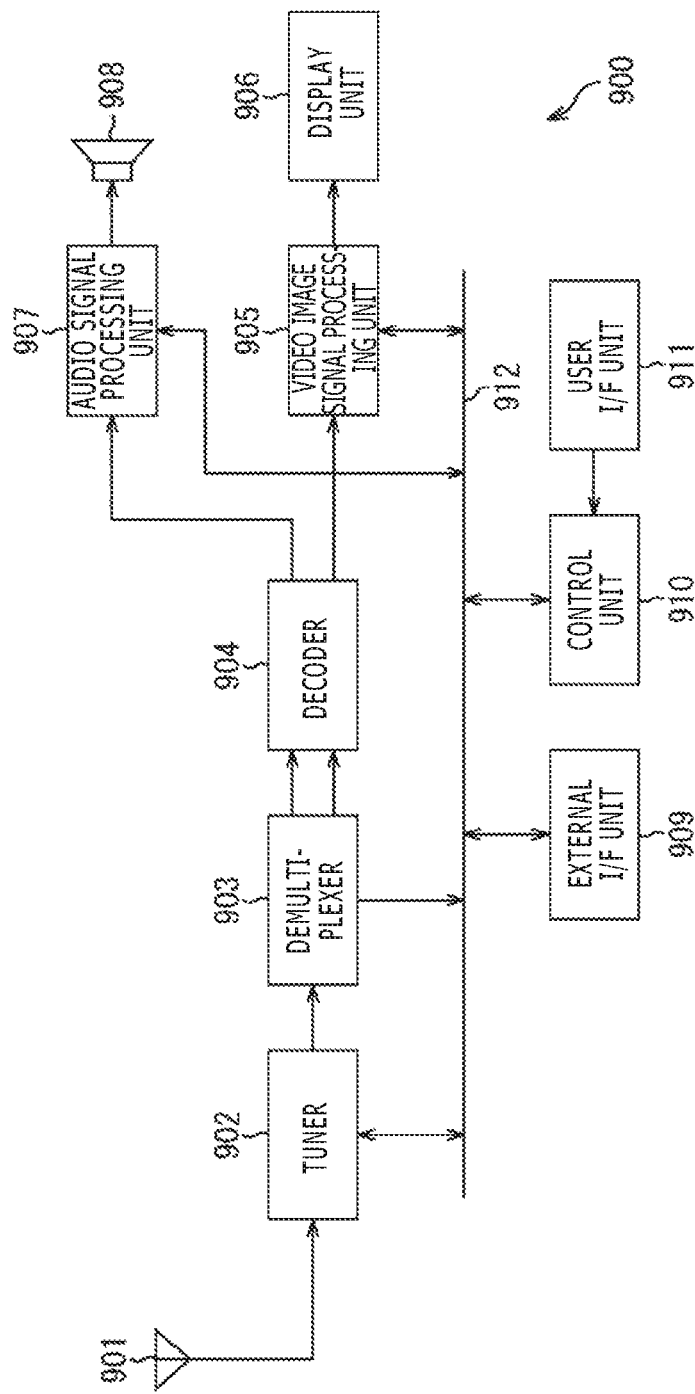
FIG. 23 is a view depicting an example of a general configuration of a television apparatus to which the present disclosure is applied.

FIG. 23 exemplifies a general configuration of a television apparatus to which the present technology is applied. A television apparatus 900 includes an antenna 901, a tuner 902, a demultiplexer 903, a decoder 904, a video image signal processing unit 905, a display unit 906, an audio signal processing unit 907, a speaker 908, and an external interface unit 909. Further, the television apparatus 900 includes a control unit 910, a user interface unit 911 and so forth.

The tuner 902 selects a desired channel from among broadcasting wave signals received by the antenna 901 to perform demodulation and outputs a resulting encoded bit stream to the demultiplexer 903.

The demultiplexer 903 extracts a packet of a video image and an audio of a program that is a viewing target from the encoded bit stream and outputs data of the extracted packet to the decoder 904. Further, the demultiplexer 903 supplies a packet of data of an electronic program guide (EPG) or the like to the control unit 910. It is to be noted that, where the data is in a scrambled state, descrambling is performed by the demultiplexer or the like.

The decoder 904 performs a decoding process for the packet and outputs video image data and audio data generated by the demultiplexing process to the video image signal processing unit 905 and the audio signal processing unit 907, respectively.

The video image signal processing unit 905 performs noise removal, video image processing according to a user setting and so forth for video image data. The video image signal processing unit 905 generates video image data of a program to be displayed on the display unit 906, image data by a process based on an application supplied thereto through a network and so forth. Further, the video image signal processing unit 905 generates video image data for displaying a menu screen image for selection of an item or the like and superimposes the video image data on video image data of the program. The video image signal processing unit 905 generates a driving signal on the basis of the video image data generated in this manner to drive the display unit 906.

The display unit 906 drives a display device (for example, a liquid crystal display element or the like) on the basis of the driving signal from the video image signal processing unit 905 to display a video image of a program or the like.

The audio signal processing unit 907 performs a predetermined process such as noise removal for audio data, performs a digital-to-analog (D/A) conversion process and an amplification process for the audio data after the process and supplies the resulting audio data to the speaker 908 to perform sound outputting.

The external interface unit 909 is an interface for connecting to an external apparatus or a network and performs data transmission and reception of video image data, audio data and so forth.

The user interface unit 911 is connected to the control unit 910. The user interface unit 911 is configured from an operation switch, a remote control signal reception unit and so forth and supplies an operation signal according to a user operation to the control unit 910.

The control unit 910 is configured using a CPU, a memory and so forth. The memory stores a program to be executed by the CPU, various types of data necessary for the CPU to perform processing, EPG data, data acquired through a network and so forth. The program stored in the memory is read out and executed at a predetermined timing such as upon activation of the television apparatus 900 by the CPU. By executing the program, the CPU controls the components of the television apparatus 900 such that the television apparatus 900 acts in response to a user operation.

It is to be noted that the television apparatus 900 includes a bus 912 for connecting the tuner 902, the demultiplexer 903, the video image signal processing unit 905, the audio signal processing unit 907, the external interface unit 909 and so forth and the control unit 910 to each other.

In the television apparatus configured in such a manner as described above, a function of a decoding device (decoding method) for decoding an encoded stream encoded in such a manner as described above is provided. Accordingly, deterioration of the encoding efficiency can be reduced.

Fifth Embodiment (Example of Configuration of Portable Telephone Set)

Figure 24:
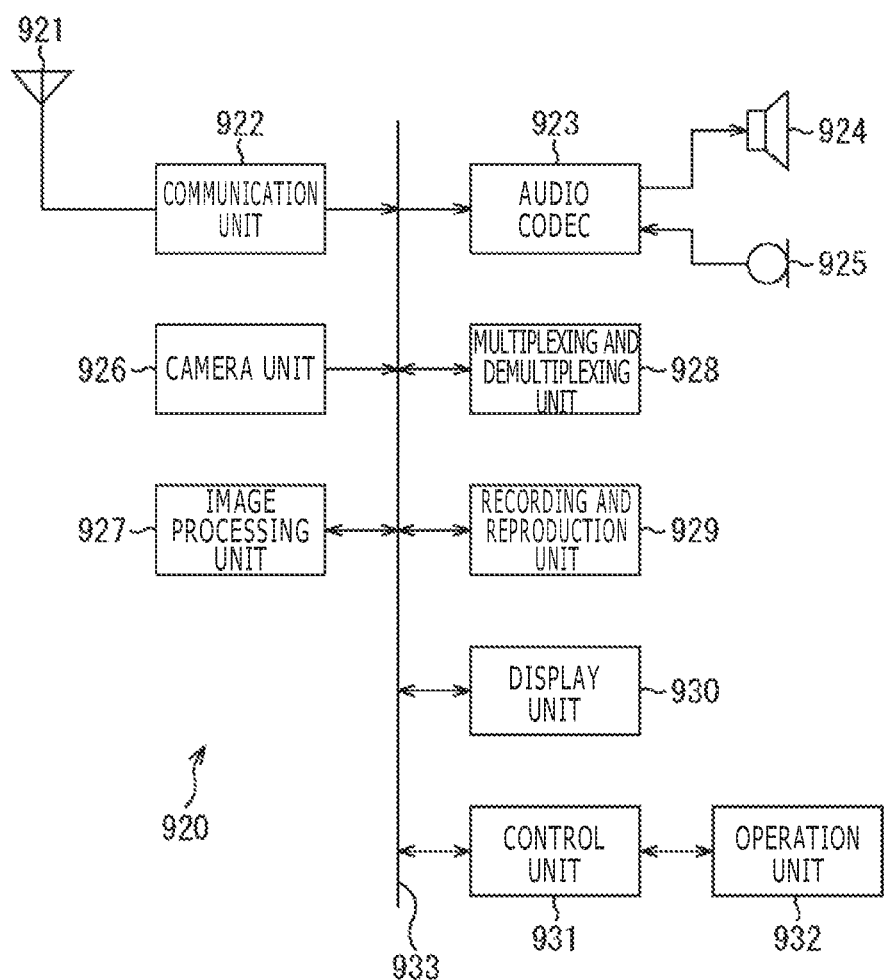
FIG. 24 is a view depicting an example of a general configuration of a portable telephone set to which the present disclosure is applied.

FIG. 24 exemplifies a general configuration of a portable telephone set to which the present disclosure is applied. A portable telephone set 920 includes a communication unit 922, an audio codec 923, a camera unit 926, an image processing unit 927, a multiplexing and demultiplexing unit 928, a recording and reproduction unit 929, a display unit 930, and a control unit 931. The components are connected to each other through a bus 933.

Further, an antenna 921 is connected to the communication unit 922, and a speaker 924 and a microphone 925 are connected to the audio codec 923. Further, an operation unit 932 is connected to the control unit 931.

The portable telephone set 920 performs various actions such as transmission and reception of an audio signal, transmission and reception of an electronic mail and image data, image pickup, data recording or the like in various modes such as a voice communication mode and a data communication mode.

In the voice communication mode, a sound signal generated by the microphone 925 is subjected to conversion into audio data and data compression by the audio codec 923 and supplied to the communication unit 922. The communication unit 922 performs a modulation process, a frequency conversion process and so forth for the audio data to generate a transmission signal. Further, the communication unit 922 supplies the transmission signal to the antenna 921 so as to be transmitted to a base station not depicted. Further, the communication unit 922 performs amplification, a frequency conversion process, a demodulation process and so forth for a reception signal received by the antenna 921 and supplies resulting audio data to the audio codec 923. The audio codec 923 performs data decompression and conversion into an analog audio signal for the audio data and outputs the resulting analog audio signal to the speaker 924.

On the other hand, when mail transmission is to be performed in the data communication mode, the control unit 931 accepts character data inputted by an operation of the operation unit 932 and displays the inputted character on the display unit 930. Further, the control unit 931 generates mail data on the basis of a user instruction on the operation unit 932 or the like and supplies the mail data to the communication unit 922. The communication unit 922 performs a modulation process, a frequency conversion process and so forth for the mail data and transmits a resulting transmission signal from the antenna 921. Further, the communication unit 922 performs amplification, a frequency conversion process, a demodulation process and so forth for a reception signal received by the antenna 921 to restore mail data. The communication unit 922 supplies the mail data to the display unit 930 to perform display of the substance of the mail.

It is to be noted that, in the portable telephone set 920, also it is possible to store received mail data into a recording medium by the recording and reproduction unit 929. The storage medium is an arbitrary rewritable storage medium. For example, the storage medium is a semiconductor memory such as a RAM or a built-in type flash memory, or a removable medium such as a hard disk, a magnetic disk, a magneto-optical disk, an optical disk, a universal serial bus (USB) memory, a memory card or the like.

When image data is to be transmitted in the data communication mode, image data generated by the camera unit 926 is supplied to the image processing unit 927. The image processing unit 927 performs an encoding process for the image data to generate encoded data.

The multiplexing and demultiplexing unit 928 multiplexes encoded data generated by the image processing unit 927 and audio data supplied from the audio codec 923 by a predetermined method and supplies the multiplexed data to the communication unit 922. The communication unit 922 performs a modulation process, a frequency conversion process and so forth for the multiplexed data and transmits a resulting transmission signal from the antenna 921. Further, the communication unit 922 performs amplification, a frequency conversion process, a demodulation process and so forth for a reception signal received by the antenna 921 to restore multiplexed data. This multiplexed data is supplied to the multiplexing and demultiplexing unit 928. The multiplexing and demultiplexing unit 928 performs demultiplexing of the multiplexed data and supplies resulting encoded data and audio data to the image processing unit 927 and the audio codec 923, respectively. The image processing unit 927 performs a decoding process for the encoded data to generate image data. This image data is supplied to the display unit 930 such that display of the received image is performed. The audio codec 923 converts the audio data into an analog audio signal and supplies the analog audio signal to the speaker 924 such that the received audio is outputted from the speaker 924.

In the portable telephone apparatus configured in this manner, functions of the encoding device (encoding method) of the present technology and a decoding device (decoding method) for decoding an encoded stream encoded in such a manner as described above are provided in the image processing unit 927. Therefore, the time required for encoding can be reduced. Further, deterioration of the encoding efficiency can be reduced.

Sixth Embodiment (Example of Configuration of Recording and Reproduction Apparatus)

Figure 25:
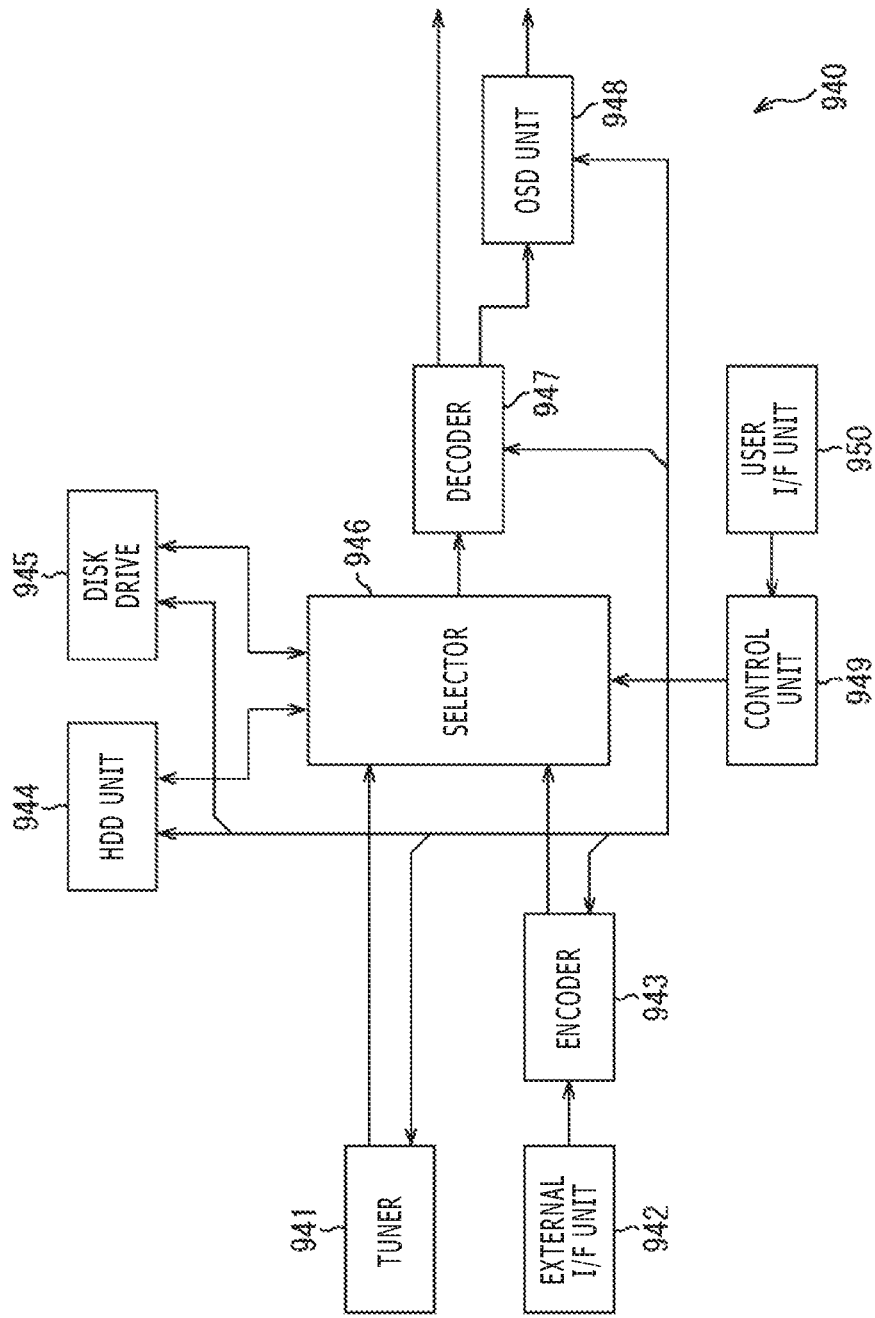
FIG. 25 is a view depicting an example of a general configuration of a recording and reproduction apparatus to which the present disclosure is applied.

FIG. 25 exemplifies a general configuration of a recording and reproduction apparatus to which the present disclosure is applied. A recording and reproduction apparatus 940 records, for example, audio data and video data of a received broadcasting program into a recording medium and provides the recorded data to a user at a timing according to an instruction by the user. Also it is possible for the recording and reproduction apparatus 940 to acquire audio data or video data, for example, from a different apparatus and cause the acquired audio data or video data to be recorded into a recording medium. The recording and reproduction apparatus 940 decodes and outputs the audio data and video data recorded in the recording medium such that sound outputting and image display can be performed by a monitor apparatus or the like.

The recording and reproduction apparatus 940 includes a tuner 941, an external interface unit 942, an encoder 943, an HDD unit 944, a disk drive 945, a selector 946, a decoder 947, an on-screen display (OSD) unit 948, a control unit 949, and a user interface unit 950.

The tuner 941 selects a desired channel from among broadcasting signals received by an antenna not depicted. The tuner 941 outputs an encoded bit stream obtained by demodulating a reception signal of the desired channel to the selector 946.

The external interface unit 942 is configured from at least one of an Institute of Electrical and Electronics Engineers (IEEE) 1394 interface, a network interface unit, a USB interface, a flash memory interface and so forth. The external interface unit 942 is an interface for connecting to an external apparatus, a network, a memory card or the like and performs data reception of video image data, audio data and so forth to be recorded.

The encoder 943 performs, when video image data or audio data supplied thereto from the external interface unit 942 is not in an encoded form, encoding of the video data or audio data by a predetermined method and outputs a resulting encoded bit stream to the selector 946.

The HDD unit 944 records content data of a video image, an audio and so forth, various programs, other data and so forth on a built-in hard disk and reads out them, upon reproduction or the like, from the hard disk.

The disk drive 945 performs recording and reproduction of a signal on and from an optical disk mounted thereon. The optical disk is, for example, a digital versatile disk (DVD) disk (DVD-Video, DVD-RAM, DVD-R, DVD-RW, DVD+R, DVD+RW or the like), a Blu-ray (registered trademark) disk or the like.

Upon recording of a video image or an audio, the selector 946 selects an encoded bit stream from one of the tuner 941 and the encoder 943 and supplies the encoded bit stream to one of the HDD unit 944 and the disk drive 945. On the other hand, upon reproduction of a video image or an audio, the selector 946 supplies the encoded bit stream outputted from the HDD unit 944 or the disk drive 945 to the decoder 947.

The decoder 947 performs a decoding process for the encoded bit stream. The decoder 947 supplies video image data generated by performing the decoding process to the OSD unit 948. Further, the decoder 947 outputs audio data generated by performing the decoding process.

The OSD unit 948 generates video image data for displaying a menu screen image for selection of an item or the like and outputs the generated video image data in a superimposed relationship with the video image data outputted from the decoder 947.

The user interface unit 950 is connected to the control unit 949. The user interface unit 950 is configured from an operation switch, a remote control signal reception unit and so forth and supplies an operation signal according to a user operation thereof to the control unit 949.

The control unit 949 is configured using a CPU, a memory and so forth. The memory stores a program to be executed by the CPU and various types of data necessary for the CPU to perform processing. The program stored in the memory is read out and executed by the CPU at a predetermined timing such as upon activation of the recording and reproduction apparatus 940. By executing the program, the CPU controls the associated units such that the recording and reproduction apparatus 940 operates in response to a user operation.

In the recording and reproduction apparatus configured in this manner, a function of the encoding device (encoding method) of the present technology is provided in the encoder 943. Further, a function of a decoding device (decoding method) for decoding an encoded stream encoded in such a manner as described above is provided in the decoder 947. Accordingly, the period of time required for encoding can be reduced. Further, deterioration of the encoding efficiency can be reduced.

Seventh Embodiment (Example of Configuration of Image Pickup Apparatus)

Figure 26:
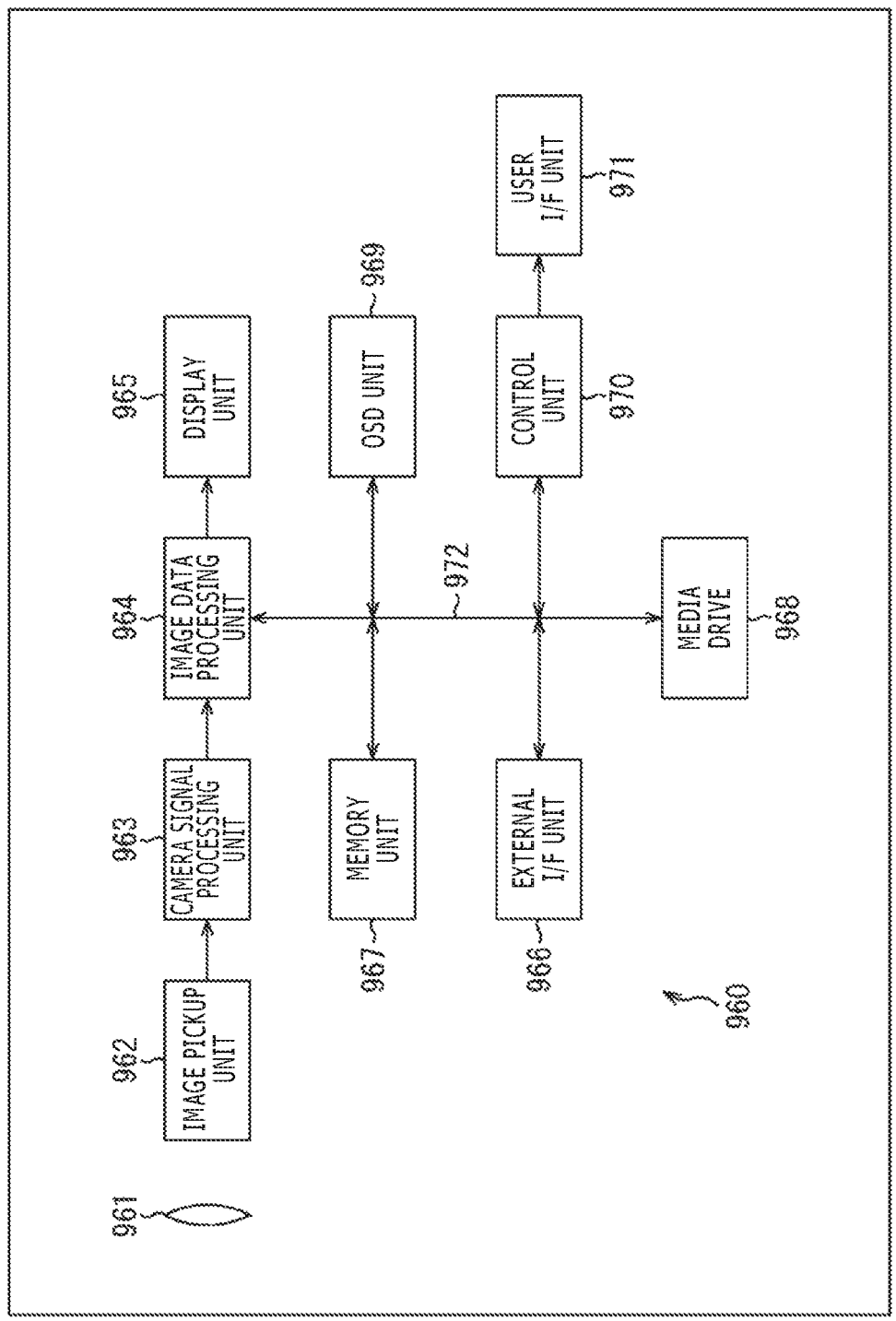
FIG. 26 is a view depicting an example of a general configuration of an image pickup apparatus to which the present disclosure is applied.

FIG. 26 exemplifies a general configuration of an image pickup apparatus to which the present disclosure is applied. The image pickup apparatus 960 picks up an image pickup object and causes the image of the image pickup object to be displayed on a display unit or to be recorded as image data into a recording medium.

An image pickup apparatus 960 includes an optical block 961, an image pickup unit 962, a camera signal processing unit 963, an image data processing unit 964, a display unit 965, an external interface unit 966, a memory unit 967, a media drive 968, an OSD unit 969, and a control unit 970. Further, a user interface unit 971 is connected to the control unit 970. Furthermore, the image data processing unit 964, the external interface unit 966, the memory unit 967, the media drive 968, the OSD unit 969, the control unit 970 and so forth are connected to each other through a bus 972.

The optical block 961 is configured using a focus lens, a diaphragm mechanism and so forth. The optical block 961 forms an optical image of an image pickup object on an image pickup face of the image pickup unit 962. The image pickup unit 962 is configured using a charge-coupled device (CCD) or complementary metal oxide semiconductor (CMOS) image sensor, and generates an electric signal according to an optical image by photoelectric conversion and supplies the electric signal to the camera signal processing unit 963.

The camera signal processing unit 963 performs various camera signal processes such as knee correction, gamma correction, and color correction for the electric signal supplied thereto from the image pickup unit 962. The camera signal processing unit 963 supplies the image data after the camera signal processes to the image data processing unit 964.

The image data processing unit 964 performs an encoding process of the image data supplied thereto from the camera signal processing unit 963. The image data processing unit 964 supplies encoded data generated by performing the encoding process to the external interface unit 966 and the media drive 968. Further, the image data processing unit 964 performs a decoding process for encoded data supplied thereto from the external interface unit 966 or the media drive 968. The image data processing unit 964 supplies the image data generated by performing the decoding process to the display unit 965. Further, the image data processing unit 964 performs a process for supplying image data supplied from the camera signal processing unit 963 to the display unit 965 and a process for supplying displaying data acquired from the OSD unit 969 in a superimposed relationship with the image data to the display unit 965.

The OSD unit 969 generates displaying data of a menu screen image configured from a symbol, a character, or a figure, an icon and so forth and outputs the displaying data to the image data processing unit 964.

The external interface unit 966 is configured, for example, from USB input/output terminals and is connected to a printer when printing of an image is to be performed. Further, as occasion demands, a drive is connected to the external interface unit 966, and a removable medium such as a magnetic disk, an optical disk or the like is suitably mounted on the drive and a computer program read out from the removable medium is installed as occasion demands. Furthermore, the external interface unit 966 has a network interface to be connected to a predetermined network such as a local area network (LAN), the Internet or the like. The control unit 970 reads out, for example, in accordance with an instruction from the user interface unit 971, encoded data from the media drive 968 and can cause the encoded data to be supplied from the external interface unit 966 to a different apparatus connected through the network. Further, the control unit 970 can acquire encoded data and image data supplied from the different apparatus through the network via the external interface unit 966 and supply the encoded data and image data to the image data processing unit 964.

As the recording medium to be driven by the media drive 968, an arbitrary readable/writable removable medium such as, for example, a magnetic disk, a magneto-optical disk, an optical disk, a semiconductor memory or the like. Further, also the removable medium is of an arbitrary type, and the removable medium may be a tape device, may be a disk or may be a memory card. Naturally, the removable medium may be a non-contact integrated circuit (IC) card or the like.

Further, the media drive 968 and the recording medium may be integrated with each other such that they are configured from a non-portable recording medium like, for example, a built-in type hard disk drive, a solid state drive (SSD) or the like.

The control unit 970 is configured using a CPU. The memory unit 967 stores a program to be executed by the control unit 970, various types of data necessary for the control unit 970 to perform processing and so forth. The program stored in the memory unit 967 is read out and executed at a predetermined timing such as upon activation of the image pickup apparatus 960 by the control unit 970. By executing the program, the control unit 970 can control the associated elements such that the image pickup apparatus 960 acts in response to a user operation.

In the image pickup apparatus configured in this manner, functions of the encoding device (encoding method) of the present application and a decoding device (decoding method) for decoding an encoded stream encoded in such a manner as described above are provided in the image data processing unit 964. Accordingly, the period of time required for encoding can be reduced. Further, deterioration of the encoding efficiency can be reduced.

Eighth Embodiment

Other Embodiments

While examples of an apparatus, a system and so forth to which the present disclosure is applied are described above, the present disclosure is not limited to this but can be carried out as any component to be incorporated in such an apparatus or a system as described above, for example, as a processor as a system large scale integration (LSI) or the like, a module that uses a plurality of processors or the like, a unit that uses a plurality of modules or the like, a set in which a different function is added to a unit and so forth (namely, as some of components of an apparatus).

(Example of Configuration of Video Set)

Figure 27:
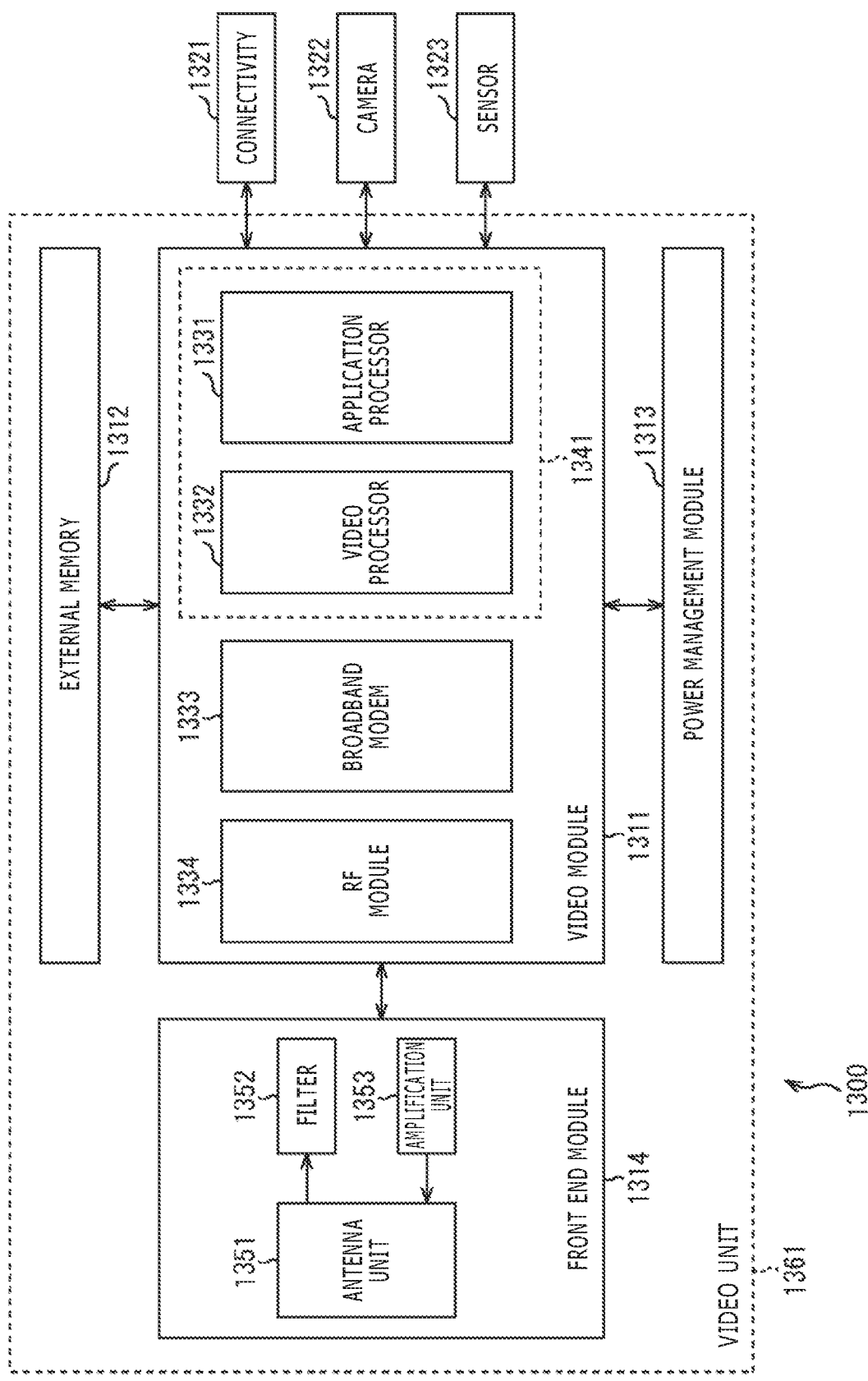
FIG. 27 is a view depicting an example of a general configuration of a video set to which the present disclosure is applied.

An example in a case in which the present disclosure is carried out as a set is described with reference to FIG. 27. FIG. 27 depicts an example of a general configuration of a video set to which the present disclosure is applied.

In recent years, multifunctionality of electronic equipment is advancing, and where some of components of the electronic equipment are carried out as sales, provision or the like in development or manufacture of electronic equipment, not only a case in which the part is carried out as a component having one function but also another case in which the part is carried out by combining a plurality of components having functions related to each other as one set having the plurality of functions have become noticed frequently.

A video set 1300 depicted in FIG. 27 has such a multifunctioned configuration and is a combination of a device having functions relating to encoding and/or decoding of an image (one of or both encoding and decoding may be involved) and a device having a different function relating to the functions.

As depicted in FIG. 27, the video set 1300 includes a module group including a video module 1311, an external memory 1312, a power management module 1313, a front end module 1314 and so forth, and includes devices having relating functions such as a connectivity 1321, a camera 1322, a sensor 1323 and so forth.

A module is a part in which several part functions related to each other are combined such that the part has coherent functions. Although a particular physical configuration is arbitrarily determined, the part may be, for example, an integrated part in which a plurality of processors individually having functions, electronic circuit elements such as resistors and capacitors, other devices and so forth are disposed on a wiring board or the like. Also a new module may be formed by combining a module with a different module, a processor or the like.

In the case of the example of FIG. 27, the video module 1311 is a combination of components having functions relating to image processing and includes an application processor 1331, a video processor 1332, a broadband modem 1333, and a radio frequency (RF) module 1334.

A processor is a semiconductor chip in which components having predetermined functions are integrated by system on a chip (SoC) and is called, for example, system LSI or the like. The components having the predetermined functions may be logic circuits (hardware components) or may be a CPU, a ROM, a RAM and so forth and a program (software component) executed using them, or else may be a combination of both of them. For example, a processor may include logic circuits and a CPU, a ROM, a RAM and so forth such that some of the functions are implemented by the logic circuits (hardware components) and the other functions are implemented by a program (software component) executed by the CPU.

The application processor 1331 of FIG. 27 is a processor that executes an application relating to image processing. The application executed by the application processor 1331 not only can perform an arithmetic operation process in order to implement a predetermined function but also can control components inside and outside the video module 1311 such as, for example, a video processor 1332 as occasion demands.

The video processor 1332 is a processor having a function relating to encoding-decoding (one or both of them) of an image.

The broadband modem 1333 is a processor (or a module) that performs processing relating to wire or wireless (wire and wireless) broadband communication performed through a broadband line such as the Internet or a public telephone network. For example, the broadband modem 1333 converts data to be transmitted (digital signal) into an analog signal by digital modulation or the like or converts a received analog signal into data (digital signal) by demodulation or the like. For example, the broadband modem 1333 can digitally modulate and demodulate arbitrary information such as image data to be processed by the video processor 1332, a stream in which such image data is encoded, an application program, setting data and so forth.

The RF module 1334 is a module that performs frequency conversion, modulation and demodulation, amplification, a filter process and so forth for an RF signal to be transmitted and received through an antenna. For example, the RF module 1334 performs frequency conversion and so forth for a baseband signal generated by the broadband modem 1333 to generate an RF signal. Further, for example, the RF module 1334 performs frequency conversion and so forth for an RF signal received through the front end module 1314 to generate a baseband signal.

It is to be noted that the application processor 1331 and the video processor 1332 may be integrated so as to be configured as one processor as indicated by a broken line 1341 in FIG. 27.

The external memory 1312 is a module provided externally of the video module 1311 and including a storage device utilized by the video module 1311. Although the storage device of the external memory 1312 may be implemented by any physical configuration, since generally it is frequently utilized for storage of data of a large volume like image data of a unit of a frame, it preferably is implemented using a comparatively less expensive semiconductor memory of a large storage capacity like, for example, a dynamic random access memory (DRAM).

The power management module 1313 manages and controls power supply to the video module 1311 (components in the video module 1311).

Figure 28:
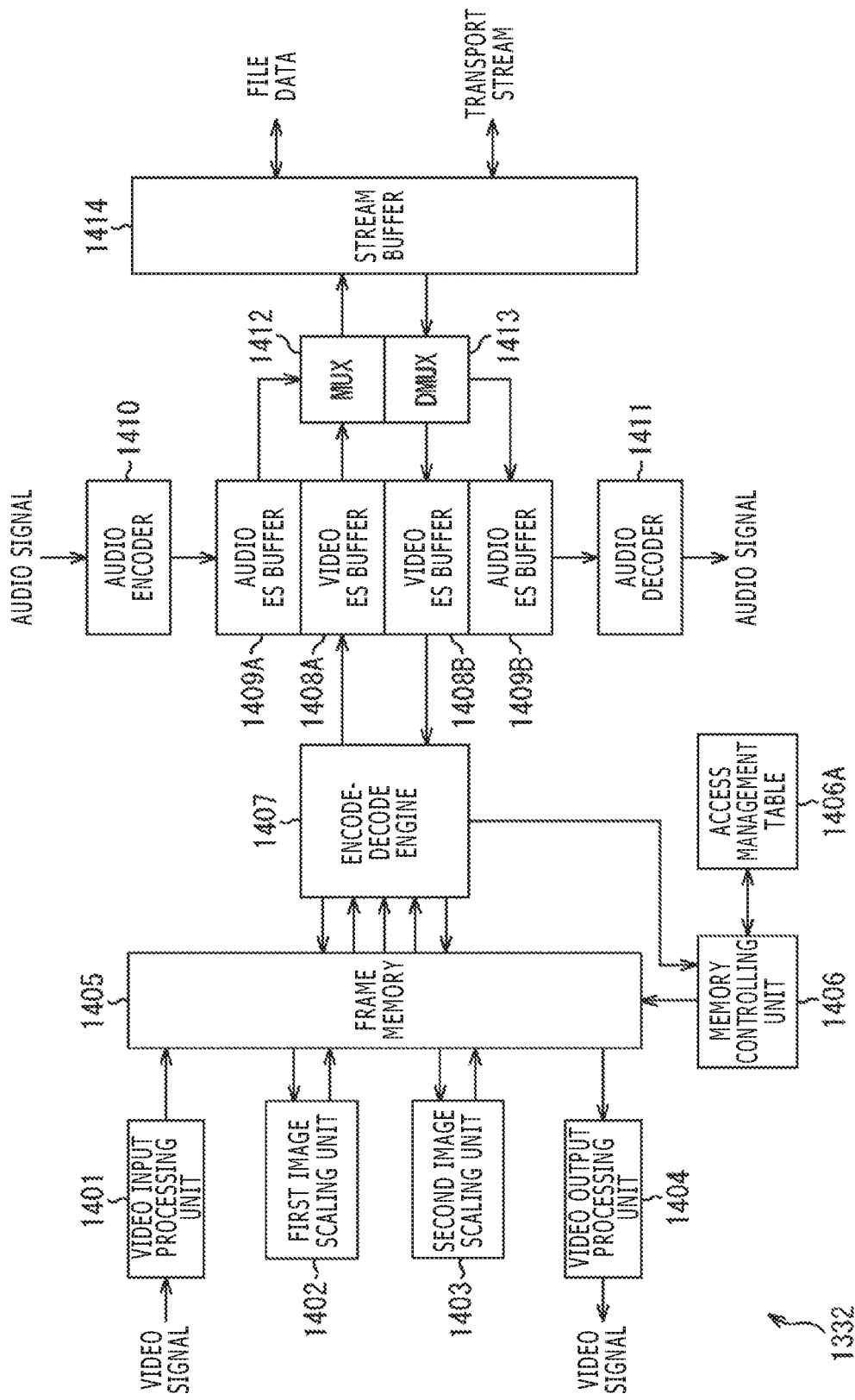
FIG. 28 is a view depicting an example of a general configuration of a video processor to which the present disclosure is applied.

The front end module 1314 is a module that provides a front end function (circuit at transmission and reception ends at the antenna side) to the RF module 1334. As depicted in FIG. 28, the front end module 1314 includes, for example, an antenna unit 1351, a filter 1352, and an amplification unit 1353.

The antenna unit 1351 has an antenna for transmitting and receiving a wireless signal and peripheral components. The antenna unit 1351 transmits a signal supplied thereto from the amplification unit 1353 as a wireless signal and supplies a received wireless signal as an electric signal (RF signal) to the filter 1352. The filter 1352 performs a filter process and so forth for an RF signal received through the antenna unit 1351 and supplies the RF signal after the process to the RF module 1334. The amplification unit 1353 amplifies an RF signal supplied thereto from the RF module 1334 and supplies the amplified RF signal to the antenna unit 1351.

The connectivity 1321 is a module having a function relating to connection to the outside. The connectivity 1321 has an arbitrary physical configuration. For example, the connectivity 1321 has a configuration having a communication function for other than a communication standard with which the broadband modem 1333 is compatible, external input and output terminals and so forth.

For example, the connectivity 1321 may include a module having a communication function that complies with a wireless communication standard such as Bluetooth (registered trademark), IEEE 802.11 (for example, wireless fidelity (Wi-Fi) (registered trademark)), near field communication (NFC), infrared data association (IrDA) or the like, an antenna for transmitting and receiving a signal that complies with the standard and so forth. Further, for example, the connectivity 1321 may include a module having a communication function that complies with such a wire communication standard as USB, high-definition multimedia interface (HDMI) (registered trademark) or the like or a terminal that complies with the standard. Furthermore, the connectivity 1321 may have a data (signal) transmission function and so forth such as analog input and output terminals and so forth.

It is to be noted that the connectivity 1321 may include a device of a transmission destination of data (signal). For example, the connectivity 1321 may include a drive that performs reading out or writing of data from or into a recording medium such as a magnetic disk, an optical disk, a magneto-optical disk, a semiconductor memory or the like (including not only a drive for removable media but also a hard disk, an SSD, a network attached storage (NAS) and so forth). Further, the connectivity 1321 may include an outputting device (monitor, speaker or the like) for an image or sound.

The camera 1322 is a module having a function that picks up an image of an image pickup object to obtain image data of the image pickup object. Image data obtained by image pickup of the camera 1322 is supplied to and encoded, for example, by the video processor 1332.

The sensor 1323 is a module having an arbitrary sensor function such as, for example, a sound sensor, an ultrasonic sensor, an optical sensor, a luminance sensor, an infrared sensor, an image sensor, a rotation sensor, an angle sensor, an angular velocity sensor, a speed sensor, an acceleration sensor, an inclination sensor, a magnetic identification sensor, an impact sensor, or a temperature sensor. Data detected by the sensor 1323 is supplied, for example, to the application processor 1331 and utilized by an application or the like.

Any component described as a module hereinabove may be implemented as a processor, or conversely, any component described as a processor may be implemented as a module.

In the video set 1300 having such a configuration as described above, the present disclosure can be applied to the video processor 1332 as described below. Accordingly, the video set 1300 can be carried out as a set to which the present disclosure is applied.

(Example of Configuration of Video Processor)

FIG. 28 depicts an example of a general configuration of the video processor 1332 (FIG. 28) to which the present disclosure is applied.

In the case of the example of FIG. 28, the video processor 1332 has a function for receiving an input of a video signal and an audio signal and encoding them by a predetermined method and another function for decoding encoded video data and audio data and reproducing and outputting a video signal and an audio signal.

As depicted in FIG. 28, the video processor 1332 includes a video input processing unit 1401, a first image scaling unit 1402, a second image scaling unit 1403, a video output processing unit 1404, a frame memory 1405, and a memory controlling unit 1406. Further, the video processor 1332 includes an encode-decode engine 1407, video elementary stream (ES) buffers 1408A and 1408B, and audio ES buffers 1409A and 1409B. Furthermore, the video processor 1332 includes an audio encoder 1410, an audio decoder 1411, a multiplexing unit (multiplexer (MUX)) 1412, a demultiplexing unit (demultiplexer (DMUX)) 1413, and a stream buffer 1414.

The video input processing unit 1401 acquires a video signal inputted, for example, from the connectivity 1321 (FIG. 27) or the like and converts the video signal into digital image data. The first image scaling unit 1402 performs format conversion for image data, a scaling process for an image and so forth. The second image scaling unit 1403 performs, for image data, a scaling process and so forth for an image in response to a format at the destination of outputting to the video output processing unit 1404 and performs format conversion, a scaling process for an image and so forth similar to those by the first image scaling unit 1402. The video output processing unit 1404 performs format conversion, conversion into an analog signal and so forth for image data and outputs resulting image data as a reproduced image data, for example, to the connectivity 1321 (FIG. 27) and so forth.

The frame memory 1405 is a memory for image data commonly used by the video input processing unit 1401, the first image scaling unit 1402, the second image scaling unit 1403, the video output processing unit 1404, and the encode-decode engine 1407. The frame memory 1405 is implemented as a semiconductor memory such as, for example, a DRAM or the like.

The memory controlling unit 1406 receives a synchronizing signal from the encode-decode engine 1407 and controls accessing for writing and reading out to the frame memory 1405 in accordance with an access schedule to the frame memory 1405 written in an access management table 1406A. The access management table 1406A is updated by the memory controlling unit 1406 in response to a process executed by the encode-decode engine 1407, the first image scaling unit 1402, the second image scaling unit 1403 and so forth.

The encode-decode engine 1407 performs an encoding process for image data and a decoding process for a video stream that is encoded data of image data. For example, the encode-decode engine 1407 encodes image data read out from the frame memory 1405 and successively writes the image data as a video stream into a video ES buffer 1408A. Further, the encode-decode engine 1407 successively read out a video stream, for example, from another video ES buffer 1408B and decodes the video stream and then successively writes the decoded video stream as image data into the frame memory 1405. In such encoding and decoding, the encode-decode engine 1407 uses the frame memory 1405 as a working area. Further, the encode-decode engine 1407 outputs a synchronizing signal to the memory controlling unit 1406, for example, at a timing at which a process for each macro block is to be started.

The video ES buffer 1408A buffers the video stream generated by the encode-decode engine 1407 and supplies the buffered video stream to the multiplexing unit (MUX) 1412. The video ES buffer 1408B buffers a video stream supplied thereto from the demultiplexing unit (DMUX) 1413 and supplies the buffered video stream to the encode-decode engine 1407.

The audio ES buffer 1409A buffers an audio stream generated by the audio encoder 1410 and supplies the buffered audio stream to the multiplexing unit (MUX) 1412. The audio ES buffer 1409B buffers an audio stream supplied thereto from the demultiplexing unit (DMUX) 1413 and supplies the buffered audio stream to the audio decoder 1411.

The audio encoder 1410, for example, digitally converts an audio signal inputted thereto, for example, from the connectivity 1321 (FIG. 27) or the like and encodes the digital audio signal in accordance with a predetermined method such as, for example, an MPEG audio method, an AudioCode number 3 (AC3) method or the like. The audio encoder 1410 successively writes an audio stream that is encoded data of an audio signal into the audio ES buffer 1409A. The audio decoder 1411 decodes an audio stream supplied thereto from the audio ES buffer 1409B, performs, for example, conversion into an analog signal and so forth, and supplies the resulting analog signal as a reproduced audio signal, for example, to the connectivity 1321 (FIG. 28) and so forth.

The multiplexing unit (MUX) 1412 multiplexes a video stream and an audio stream. The method for multiplexing (namely, the format of a bit stream to be generated by the multiplexing) is an arbitrary method. Further, upon such multiplexing, also it is possible for the multiplexing unit (MUX) 1412 to add predetermined header information and so forth to the bit stream. In particular, the multiplexing unit (MUX) 1412 can convert the format of the stream by multiplexing. For example, the multiplexing unit (MUX) 1412 multiplexes a video stream and an audio stream to convert the streams into a transport stream that is a bit stream of a format for transfer. Further, for example, the multiplexing unit (MUX) 1412 converts a video stream and an audio stream into data (file data) of a file format for recording by multiplexing the video stream and the audio stream.

The demultiplexing unit (DMUX) 1413 demultiplexes a bit stream, in which a video stream and an audio stream are multiplexed, by a method corresponding to the multiplexing by the multiplexing unit (MUX) 1412. In particular, the demultiplexing unit (DMUX) 1413 extracts a video stream and an audio stream from a bit stream read out from the stream buffer 1414 (separates a video stream and an audio stream). In particular, the demultiplexing unit (DMUX) 1413 can convert the format of a stream by demultiplexing (reverse conversion to the conversion by the multiplexing unit (MUX) 1412). For example, the demultiplexing unit (DMUX) 1413 can convert a transport stream supplied, for example, from the connectivity 1321, the broadband modem 1333 (both in FIG. 28) or the like into the video stream and the audio stream by acquiring the transport stream through the stream buffer 1414 and demultiplexing the transport stream. Further, for example, the demultiplexing unit (DMUX) 1413 can convert file data read out from various types of recording media, for example, by the connectivity 1321 (FIG. 28) into the video stream and the audio stream by acquiring the file data through the stream buffer 1414 and demultiplexing the file data.

The stream buffer 1414 buffers a bit stream. For example, the stream buffer 1414 buffers a transport stream supplied thereto from the multiplexing unit (MUX) 1412 and supplies the buffered transport stream, for example, to the connectivity 1321, the broadband modem 1333 (both in FIG. 28) and so forth at a predetermined timing or on the basis of a request from the outside or the like.

Further, for example, the stream buffer 1414 buffers file data supplied from the multiplexing unit (MUX) 1412 and supplies the buffered file data, for example, to the connectivity 1321 (FIG. 27) and so forth at a predetermined timing or on the basis of a request from the outside or the like such that the file data is recorded into various types of recording media.

Further, the stream buffer 1414 buffers a transport stream acquired, for example, through the connectivity 1321, the broadband modem 1333 (both in FIG. 27) or the like and supplies the buffered transport stream to the demultiplexing unit (DMUX) 1413 at a predetermined timing or on the basis of a request from the outside or the like.

Further, the stream buffer 1414 buffers file data read out from various types of recording media, for example, by the connectivity 1321 (FIG. 27) or the like and supplies the buffered file data to the demultiplexing unit (DMUX) 1413 at a predetermined timing or on the basis of a request from the outside or the like.

Now, an example of action of the video processor 1332 having such a configuration as described above is described. A video signal inputted, for example, from the connectivity 1321 (FIG. 27) or the like to the video processor 1332 is converted into digital image data of a predetermined method such as a 4:2:2Y/Cb/Cr method or the like by the video input processing unit 1401 and successively written into the frame memory 1405. The digital image data is read out to the first image scaling unit 1402 or the second image scaling unit 1403, by which format conversion to that of a predetermined method such as a 4:2:0Y/Cb/Cr method or the like and a scaling process are performed for the digital image data, whereafter resulting digital image data is written back into the frame memory 1405. The image data is encoded by the encode-decode engine 1407 and written as a video stream into the video ES buffer 1408A.

Meanwhile, an audio signal inputted from the connectivity 1321 (FIG. 27) or the like to the video processor 1332 is encoded by the audio encoder 1410 and written as an audio stream into the audio ES buffer 1409A.

The video stream of the video ES buffer 1408A and the audio stream of the audio ES buffer 1409A are read out and multiplexed by the multiplexing unit (MUX) 1412 and converted into a transport stream, file data or the like. The transport stream generated by the multiplexing unit (MUX) 1412 is buffered into the stream buffer 1414 once and then is outputted to an external network, for example, through the connectivity 1321, the broadband modem 1333 (both in FIG. 28) or the like. Meanwhile, file data generated by the multiplexing unit (MUX) 1412 is buffered into the stream buffer 1414 once and then outputted, for example, to the connectivity 1321 (FIG. 27) or the like, by which it is recorded into various types of recording media.

Meanwhile, a transport stream inputted from the external network to the video processor 1332, for example, through the connectivity 1321, the broadband modem 1333 (both in FIG. 27) or the like is buffered once into the stream buffer 1414 and then demultiplexed by the demultiplexing unit (DMUX) 1413. On the other hand, file data read out from various types of recording media, for example, by the connectivity 1321 (FIG. 27) or the like and inputted to the video processor 1332 is buffered once into the stream buffer 1414 and then demultiplexed by the demultiplexing unit (DMUX) 1413. In particular, a transport stream or file data inputted to the video processor 1332 is demultiplexed into a video stream and an audio stream by the demultiplexing unit (DMUX) 1413.

The audio stream is supplied through the audio ES buffer 1409B to the audio decoder 1411, by which it is decoded to reproduce an audio signal. Meanwhile, the video stream is successively read out and decoded, after the video stream is written into the video ES buffer 1408B, by the encode-decode engine 1407 and written into the frame memory 1405. The decoded image data is subjected to a scaling process by the second image scaling unit 1403 and written into the frame memory 1405. Then, the decoded image data is read out into the video output processing unit 1404, by which the format thereof is converted into a format of a predetermined method such as the 4:2:2Y/Cb/Cr method and then converted into an analog signal to reproduce and output the video signal.

Where the present disclosure is applied to the video processor 1332 configured in such a manner as described above, the present disclosure relating to the embodiments described hereinabove may be applied to the encode-decode engine 1407. In particular, the encode-decode engine 1407 may be provided with the functions of the encoding device and the decoding device according to the first embodiment, for example. By this, the video processor 1332 can achieve effects similar to the effects described hereinabove with reference to FIGS. 1 to 21.

It is to be noted that, in the encode-decode engine 1407, the present disclosure (namely, the functions of the image encoding device and the image decoding device according to the embodiments described hereinabove) may be implemented by hardware such as logic circuits or may be implemented by software such as an embedded program or otherwise may be implemented by both hardware and software.

(Different Example of Configuration of Video Processor)

FIG. 29 depicts a different example of a general configuration of the video processor 1332 (FIG. 27) to which the present disclosure is applied. In the case of the example of FIG. 29, the video processor 1332 has a function for encoding and decoding video data by a predetermined method.

More particularly, as depicted in FIG. 29, the video processor 1332 includes a control unit 1511, a display interface 1512, a display engine 1513, an image processing engine 1514, and an internal memory 1515. Further, the video processor 1332 includes a codec engine 1516, a memory interface 1517, a multiplexing and demultiplexing unit (MUX DMUX) 1518, a network interface 1519, and a video interface 1520.

The control unit 1511 controls action of the respective processing units in the video processor 1332 such as the display interface 1512, the display engine 1513, the image processing engine 1514, the codec engine 1516 and so forth.

As depicted in FIG. 29, the control unit 1511 includes, for example, a main CPU 1531, a sub CPU 1532, and a system controller 1533. The main CPU 1531 executes a program and so forth for controlling action of the respective processing units in the video processor 1332. The main CPU 1531 generates a control signal in accordance with the program and so forth and supplies the control signal to the respective processing units (in short, controls action of the respective processing units). The sub CPU 1532 plays an auxiliary role of the main CPU 1531. For example, the sub CPU 1532 executes a child process, a subroutine of a program or the like to be executed by the main CPU 1531. The system controller 1533 controls action of the main CPU 1531 and the sub CPU 1532 such as to designate a program to be executed by the main CPU 1531 and the sub CPU 1532.

The display interface 1512 outputs image data, for example, to the connectivity 1321 (FIG. 27) and so forth under the control of the control unit 1511. For example, the display interface 1512 converts image data of digital data into an analog signal and outputs the converted analog signal as a reproduced video signal, or outputs the image data of the digital data as it is, to the monitor apparatus of the connectivity 1321 (FIG. 27) or the like.

The display engine 1513 performs various conversion processes such as format conversion, size conversion, color gamut conversion and so forth for image data so as to satisfy hardware specifications of the monitor apparatus or the like on which an image of the image data is to be displayed.

The image processing engine 1514 performs a predetermined image process such as, for example, a filter process or the like for improving the picture quality for image data under the control of the control unit 1511.

The internal memory 1515 is a memory provided in the inside of the video processor 1332 and commonly used by the display engine 1513, the image processing engine 1514, and the codec engine 1516. The internal memory 1515 is utilized for transmission and reception of data performed, for example, between different ones of the display engine 1513, the image processing engine 1514, and the codec engine 1516. For example, the internal memory 1515 stores data supplied thereto from the display engine 1513, the image processing engine 1514, or the codec engine 1516 and supplies the data to the display engine 1513, the image processing engine 1514, or the codec engine 1516 as occasion demands (or in response to a request). Although the internal memory 1515 may be implemented by any storage device, since generally it is frequently utilized for storage of a small amount of data such as image data in a unit of a block, parameters or the like, it is preferably implemented by a semiconductor memory that has a high response speed although it has a comparatively small (for example, in comparison with the external memory 1312) storage capacity.

The codec engine 1516 performs processing relating to encoding and decoding of image data. The encoding and decoding method with which the codec engine 1516 is compatible is an arbitrary method, and the number of such methods may be one or a plural number. For example, the codec engine 1516 may have a codec function of a plurality of encoding and decoding methods such that a selected one of the methods may be used to perform encoding of image data or decoding of encoded data.

In the example depicted in FIG. 29, the codec engine 1516 includes, as function blocks for processing relating to codec, for example, a MPWG-2 Video 1541, an AVC/H.264 1542, an HEVC/H.265 1543, an HEVC/H.265 (Scalable) 1544, an HEVC/H.265 (Multi-view) 1545, and an MPEG-dynamic adaptive streaming over hypertext transfer protocol (HTTP) (MPEG-DASH) 1551.

The MPWG-2 Video 1541 is a function block for encoding and decoding image data by the MPEG-2 method. The AVC/H.264 1542 is a function block for encoding and decoding image data by the AVC method. The HEVC/H.265 1543 is a function block for encoding and decoding image data by the HEVC method. The HEVC/H.265 (Scalable) 1544 is a function block for scalably encoding and scalably decoding image data by the HEVC method. The HEVC/H.265 (Multi-view) 1545 is a function block for multi-view encoding and multi-view decoding image data by the HEVC method.

The MPEG-DASH 1551 is a function block for transmitting and receiving image data by the MPEG-DASH method. The MPEG-DASH is a technology for performing streaming of a video using the HTTP and has one of characteristics in that appropriate coded data is selected and transmitted in a unit of a segment from among a plurality of encoded data prepared in advance which are different from each other in resolution. The MPEG-DASH 1551 performs generation of a stream that complies with the standard, transfer control of the stream and so forth and utilizes, in encoding and decoding of image data, the MPWG-2 Video 1541 to the HEVC/H.265 (Multi-view) 1545 described above.

The memory interface 1517 is an interface for the external memory 1312. Data supplied from the image processing engine 1514 or the codec engine 1516 is supplied to the external memory 1312 through the memory interface 1517. On the other hand, data read out from the external memory 1312 is supplied to the video processor 1332 (image processing engine 1514 or codec engine 1516) through the memory interface 1517.

The multiplexing and demultiplexing unit (MUX DMUX) 1518 performs multiplexing and demultiplexing of various types of data relating to an image such as a bit stream of encoded data, image data, a video signal or the like. The method for such multiplexing and demultiplexing is an arbitrary method. For example, upon multiplexing, the multiplexing and demultiplexing unit (MUX DMUX) 1518 not only can combine a plurality of data into one data but also can add predetermined header information and so forth to the data. On the other hand, upon demultiplexing, the multiplexing and demultiplexing unit (MUX DMUX) 1518 can not only divide one data into a plurality of data but also can add predetermined header information and so forth to each of the divisional data. In other words, the multiplexing and demultiplexing unit (MUX DMUX) 1518 can convert the format of data by multiplexing or demultiplexing. For example, the multiplexing and demultiplexing unit (MUX DMUX) 1518 can multiplex a bit stream to convert the bit stream into a transport stream that is a bit stream of a format for transfer or into data (file data) of a file format for recording. Naturally, reverse conversion can be performed by demultiplexing.

The network interface 1519 is an interface, for example, for the broadband modem 1333, the connectivity 1321 (both in FIG. 27) and so forth. The video interface 1520 is an interface, for example, for the connectivity 1321, the camera 1322 (both in FIG. 27) and so forth.

Now, an example of action of such a video processor 1332 as described above is described. For example, if the video processor 1332 receives a transport stream from an external network through the connectivity 1321, the broadband modem 1333 (both in FIG. 27) or the like, then the transport stream is supplied to the multiplexing and demultiplexing unit (MUX DMUX) 1518 through the network interface 1519 and demultiplexed by the multiplexing and demultiplexing unit (MUX DMUX) 1518 and then decoded by the codec engine 1516. Image data obtained by the decoding of the codec engine 1516 is subjected, for example, to a predetermined image process by the image processing engine 1514 and then to predetermined conversion by the display engine 1513, whereafter it is supplied through the display interface 1512, for example, to the connectivity 1321 (FIG. 27) or the like and an image of the image data is displayed on the monitor. Further, image data obtained, for example, by decoding by the codec engine 1516 is re-encoded by the codec engine 1516 and multiplexed by the multiplexing and demultiplexing unit (MUX DMUX) 1518 so as to be converted into file data. The file data is outputted through the video interface 1520, for example, to the connectivity 1321 (FIG. 27) or the like, by which it is recorded into various recording media.

Furthermore, file data of encoded data obtained by encoding image data and read out from a recording medium not depicted, for example, by the connectivity 1321 (FIG. 27) or the like is supplied through the video interface 1520 to and demultiplexed by the multiplexing and demultiplexing unit (MUX DMUX) 1518 and then is decoded by the codec engine 1516. Image data obtained by the decoding of the codec engine 1516 is subjected to a predetermined image process by the image processing engine 1514 and to predetermined conversion by the display engine 1513, and is supplied through the display interface 1512, for example, to the connectivity 1321 (FIG. 27) or the like, by which an image of the data is displayed on the monitor. Meanwhile, image data obtained by decoding, for example, by the codec engine 1516 is re-encoded by the codec engine 1516, multiplexed by the multiplexing and demultiplexing unit (MUX DMUX) 1518 so as to be converted into a transport stream and supplied to the connectivity 1321, the broadband modem 1333 (both in FIG. 27) or the like through the network interface 1519 and transmitted to a different apparatus.

It is to be noted that transfer of image data and other data between the respective processing units in the video processor 1332 is performed utilizing, for example, the internal memory 1515 or the external memory 1312. Further, the power management module 1313 controls power supply, for example, to the control unit 1511.

Where the present disclosure is applied to the video processor 1332 configured in such a manner as described above, the present disclosure relating to the embodiments described hereinabove may be applied to the codec engine 1516. In other words, the codec engine 1516 may be configured so as to have a function block that implements the encoding device and the decoding device according to the first embodiment, for example. Furthermore, by configuring the codec engine 1516 in this manner, the video processor 1332 can achieve effects similar to the effects described hereinabove with reference to FIGS. 1 to 21.

It is to be noted that, in the codec engine 1516, the present disclosure (namely, functions of the image encoding device or the image decoding device according to the embodiments described hereinabove) may be implemented by hardware such as logic circuits or the like or may be implemented by software such as an embedded program or the like or else may be implemented by both of them.

While the two examples of the configuration of the video processor 1332 are exemplified above, the video processor 1332 may have an arbitrary configuration and have a configuration other than those of the two examples described above. Further, although the video processor 1332 may be configured as one semiconductor chip, the video processor 1332 may otherwise be configured as a plurality of semiconductor chips. For example, the video processor 1332 may be configured as a three-dimensional multilayer LSI in which a plurality of semiconductors are layered. Further, the video processor 1332 may be implemented by a plurality of LSIs.

(Application Example to Apparatus)

The video set 1300 can be incorporated in various types of apparatus for processing image data. For example, the video set 1300 can be incorporated in the television apparatus 900 (FIG. 23), the portable telephone set 920 (FIG. 24), the recording and reproduction apparatus 940 (FIG. 25), the image pickup apparatus 960 (FIG. 26) and so forth. By incorporating the video set 1300 into an apparatus, the apparatus can achieve effects similar to the effects described hereinabove with reference to FIGS. 1 to 21.

It is to be noted that, if even some of the components of the video set 1300 described hereinabove include the video processor 1332, it can be carried out as a component to which the present disclosure is applied. For example, only the video processor 1332 can be carried out as a video processor to which the present disclosure is applied. Further, for example, the processor indicated by a broken line 1341, the video module 1311 or the like described hereinabove can be carried out as a processor, a module or the like to which the present disclosure is applied. Also it is possible to combine, for example, the video module 1311, the external memory 1312, the power management module 1313, and the front end module 1314 so as to carry out the combination as a video unit 1361 to which the present disclosure is applied. In the case of any component, effects similar to the effects described hereinabove with reference to FIGS. 1 to 21 can be achieved.

In other words, if the video processor 1332 is included, then any component can be incorporated into various apparatus for processing image data similarly as in the case of the video set 1300. For example, the video processor 1332, the processor indicated by the broken line 1341, the video module 1311, or the video unit 1361 can be incorporated into the television apparatus 900 (FIG. 23), the portable telephone set 920 (FIG. 24), the recording and reproduction apparatus 940 (FIG. 25), the image pickup apparatus 960 (FIG. 26) and so forth. Further, by incorporating any of the components to which the present disclosure is applied into an apparatus, the apparatus can achieve effects similar to the effects described hereinabove with reference to FIGS. 1 to 21 similarly as in the case of the video set 1300.

Further, in the present specification, the term system signifies an aggregation of a plurality of components (devices, modules (parts) and so forth) and it does not matter whether or not all components are included in the same housing. Accordingly, both of a plurality of apparatus accommodated in separate housings and connected to each other through a network and one apparatus wherein a plurality of modules are accommodated in a single housing are systems.

The effects described in the present specification are exemplary to the end but are not restrictive, and other effects may be achieved.

The embodiment of the present disclosure is not limited to the embodiments described hereinabove and various alterations are possible without departing from the subject matter of the present disclosure.

For example, the present disclosure can be applied also to an encoding device and a decoding device of any other encoding method than the HEVC methods.

Further, the present disclosure can be applied to an encoding device and a decoding device that are used when an encoded stream is received through network medium such as a satellite broadcast, a cable television (TV), the Internet, a portable telephone or the like or when an encoded stream is processed on such recording medium as an optical disk, a magnetic disk or a flash memory.

Furthermore, the present disclosure can assume a configuration for cloud computing in which one function is shared by a plurality of apparatus through a network and processed in collaboration.

Further, the steps described hereinabove in connection with the flow charts can be executed by a single apparatus or can be executed by sharing by a plurality of apparatus.

Further, where one step includes a plurality of processes, the plurality of processes included in the one step can be executed by a single apparatus and also can be executed by sharing by a plurality of apparatus.

While the preferred embodiments of the present disclosure have been described in detail with reference to the accompanying drawings, the present disclosure is not limited to the embodiments described above. It is apparent that those who have common knowledge in the technical field to which the present disclosure pertains could conceive various alterations or modifications without departing from the technical scope described in the claims, and it shall be interpreted that also such alterations and modifications naturally fall within the technical scope of the present disclosure.

It is to be noted that also it is possible for the present technology to have such configurations as described below.

(1) An image encoding device includes a setting unit configured to set a prediction mode to be used when an image is encoded in a state in which types of the prediction mode which become a selection target are limited in response to a picture depth indicative of a reference relationship between pictures of an image, and
an encoding unit configured to encode the image for each of recursively divided encoded blocks in accordance with the prediction mode set by the setting unit.

(2) The image encoding device according to (1), wherein, when the picture depth has a low value, the setting unit sets a prediction mode that is used when an image is encoded in a state in which a prediction mode in which the block size is small is a selection target.

(3) The image encoding device according to (1) or (2), wherein, when the picture depth is equal to or greater than three, the setting unit sets a prediction mode to be used when an image is encoded in a state in which intra prediction modes are limited.

(4) The image encoding device according to any one of (1) to (3), wherein the setting unit sets a prediction mode to be used when an image is encoded in a state in which prediction modes that become a selection target are limited in response to the picture type of the image.

(5) The image encoding device according to (4), wherein, when the picture type of the image is an I picture, the setting unit sets a prediction mode to be used when an image is encoded in a state in which an intra prediction mode is a selection target.

(6) The image encoding device according to (4), wherein, when the picture type of the image is a B picture, the setting unit sets a prediction mode to be used when an image is encoded in a state in which an inter prediction mode is a selection target.

(7) The image encoding device according to any one of (1) to (6), wherein the setting unit sets a prediction mode to be used when an image is encoded in a state in which prediction modes that become a selection target are limited in response to a quantization parameter to be used upon encoding of an image.

(8) The image encoding device according to (7), wherein, when the quantization parameter is to be increased, the setting unit sets a prediction mode to be used when an image is encoded in a state in which prediction modes in which the block size is great are a selection target.

(9) The image encoding device according to any one of (1) to (8), wherein the setting unit changes a correspondence relationship between the quantization parameter and prediction modes that become a selection target in response to statistical information of the image.

(10) The image encoding device according to (9), wherein the setting unit changes, for each CTB that becomes a start point when an encoded block is to be recursively divided, the correspondence relationship between the quantization parameter and prediction modes that become a selection target.

(11) The image encoding device according to (9) or (10), wherein the statistical information of the image is dispersion information or motion information of the image.

(12) The image encoding device according to any one of (7) to (9), wherein the setting unit changes the correspondence relationship between the quantization parameter and prediction modes that become a selection target in response to an application.

(13) The image encoding device according to (12), wherein the setting unit changes the number of prediction modes that become a selection target in response to the application.

(14) The image encoding device according to (12) or (13), wherein the setting unit changes the type of prediction modes that become a selection target in response to the application.

(15) The image encoding device according to any one of (1) to (14), further includes a memory configured to store correspondence relationships between the picture depths and prediction modes that become a selection target in the form of a table. The setting unit sets a prediction mode using the table stored in the memory.

(16) The image encoding device according to any one of (1) to (14), further includes a learning unit configured to learn a pattern of prediction modes to be limited in response to the prediction mode set by the setting unit. The setting unit sets a prediction mode in accordance with the pattern learned by the learning unit.

(17) The image encoding device according to (16), wherein the learning unit learns a pattern of prediction modes to be limited in response to the picture depth of the image or the picture type of the image.

(18) An image encoding method by an image encoding device, includes setting a prediction mode to be used when an image is encoded in a state in which types of the prediction mode which become a selection target are limited in response to a picture depth indicative of a reference relationship between pictures of an image, and
encoding the image for each of recursively divided encoded blocks in accordance with the set prediction mode.

REFERENCE SIGNS LIST

12 Encoding device, 32 Screen sort buffer, 46 Intra prediction unit, 47 Motion prediction-compensation unit, 49 Rate controlling unit, 50 Mode table setting unit, 61 Statistical information calculation unit, 62 Table selection unit, 63 Table storage unit, 100 Cloud computing system, 101 Server, 102 Client, 111 Database, 121 Table selection unit, 123 Learning unit

The invention claimed is:
1. An image encoding device, comprising:
a setting unit configured to:
set a prediction mode to be used for an image that is encoded in a state in which types of the prediction mode which are a selection target are limited, wherein
the prediction mode is set based on a picture depth indicative of a reference relationship between a plurality of pictures of the image,
a first picture of the plurality of pictures and a second picture of the plurality of pictures have a first picture depth,
the second picture refers to the first picture in the first picture depth, and
the second picture is referred to by a third picture of the plurality of pictures in a second picture depth;
change a correspondence relationship between the picture depth and prediction modes as the selection target based on a combination of an application of the image and a picture type, wherein the application of the image is associated with a picture quality of the image and a processing speed for the application; and set the prediction mode based on: the correspondence relationship, and the picture depth equal to or smaller than two, wherein a prediction mode of a first block size is set as the selection target and a prediction mode of a second block size is limited, and the first block size is smaller than the second block size; and an encoding unit configured to encode the image for each of recursively divided encoded blocks of the image based on the prediction mode set by the setting unit.

2. The image encoding device according to claim 1, wherein, based on the picture depth equal to or greater than three, the setting unit is further configured to set the prediction mode to be used for the image in a state in which intra prediction modes are limited.

3. The image encoding device according to claim 1, wherein, based on the picture type of the image that is an intra picture, the setting unit is further configured to set the prediction mode to be used for the image in a state in which an intra prediction mode is the selection target.

4. The image encoding device according to claim 1, wherein, based on the picture type of the image that is a bidirectionally picture, the setting unit is further configured to set the prediction mode to be used for the image in a state in which an inter prediction mode is the selection target.

5. The image encoding device according to claim 1, wherein the setting unit is further configured to set the prediction mode to be used for the image in a state in which the prediction modes that are the selection target are limited, the prediction mode is set based on a quantization parameter, and the image is encoded based on the quantization parameter.

6. The image encoding device according to claim 5, wherein the setting unit is further configured to set the prediction mode to be used for the image in a state in which prediction modes of the second block size are the selection target.

7. The image encoding device according to claim 1, wherein the setting unit is further configured to change, for each coding tree block that corresponds to a start point of a recursively divided encoded block, the correspondence relationship between the picture depth and the prediction modes that are the selection target.

8. The image encoding device according to claim 1, wherein the setting unit is further configured to change a number of prediction modes that are the selection target based on the application.

9. The image encoding device according to claim 1, wherein the setting unit is further configured to change a type of prediction modes that are the selection target based on the application.

10. The image encoding device according to claim 1, further comprising:

a memory configured to store correspondence relationships between a plurality of picture depths and a plurality of prediction modes that are the selection target in a form of a table, wherein the setting unit is further configured to set the prediction mode based on the table stored in the memory.

11. The image encoding device according to claim 1, further comprising:

a learning unit configured to learn a pattern of limited prediction modes based on the prediction mode set by the setting unit, wherein the setting unit is further configured to set the prediction mode based on the pattern learned by the learning unit.

12. The image encoding device according to claim 11, wherein the learning unit is further configured to learn the pattern of the limited prediction modes based on one of the picture depth of the image or the picture type of the image.

13. The image encoding device according to claim 1, wherein the reference relationship of the first picture of the plurality of pictures is similar to the reference relationship of the second picture of the plurality of pictures.

14. The image encoding device according to claim 1, further comprising a processing unit configured to eliminate noise in the image based on application of a filter to neighboring pixels of each of the recursively divided encoded blocks of the image.

15. An image encoding method, comprising:

in an image encoding device:

setting a prediction mode to be used for an image that is encoded in a state in which types of the prediction mode which are a selection target are limited, wherein the prediction mode is set based on a picture depth indicative of a reference relationship between a plurality of pictures of the image, a first picture of the plurality of pictures and a second picture of the plurality of pictures have a first picture depth, the second picture refers to the first picture in the first picture depth, and the second picture is referred to by a third picture of the plurality of pictures in a second picture depth;

changing a correspondence relationship between the picture depth and prediction modes as the selection target based on a combination of an application of the image and a picture type, wherein the application of the image is associated with a picture quality of the image and a processing speed for the application;

setting the prediction mode based on: the correspondence relationship, and the picture depth equal to or smaller than two, wherein a prediction mode of a first block size is set as the selection target and a prediction mode of a second block size is limited, and the first block size is smaller than the second block size; and encoding the image for each of recursively divided encoded blocks of the image based on the set prediction mode.

* * * * *